US012728512B2

(12) United States Patent
Eggers et al.

(10) Patent No.: US 12,728,512 B2
(45) Date of Patent: Sep. 8, 2026

(54) CHISEL

(71) Applicant: DREBO WERKZEUGFABRIK GMBH, Altshausen (DE)

(72) Inventors: Rainer Eggers, Altshausen (DE); Carsten Fuchsloch, Altshausen (DE)

(73) Assignee: DREBO WERKZEUGFABRIK GMBH, Altshausen (DE)

( * ) Notice: Subject to any disclaimer, the term of this patent is extended or adjusted under 35 U.S.C. 154(b) by 250 days.

(21) Appl. No.: 18/453,368

(22) Filed: Aug. 22, 2023

(65) Prior Publication Data

US 2024/0058934 A1 Feb. 22, 2024

Related U.S. Application Data

(60) Provisional application No. 63/400,082, filed on Aug. 23, 2022, provisional application No. 63/399,914, filed on Aug. 22, 2022.

(51) Int. Cl.
*B25D 17/02* (2006.01)

(52) U.S. Cl.
CPC .......... *B25D 17/02* (2013.01); *B25D 2222/42* (2013.01); *B25D 2250/111* (2013.01)

(58) Field of Classification Search
CPC ........................ B25D 2222/42; B25D 2250/11
See application file for complete search history.

(56) References Cited

U.S. PATENT DOCUMENTS

| | | | | |
|---|---|---|---|---|
| 3,027,953 A * | 4/1962 | Coski | B25D 17/02 175/425 |
| 3,130,762 A * | 4/1964 | Kerr | B25D 1/02 81/19 |
| 3,268,259 A | 8/1966 | Snipe | |
| 3,268,260 A | 8/1966 | Snipe | |
| 3,336,081 A * | 8/1967 | Ericsson | B25D 17/02 175/414 |
| 3,356,418 A | 12/1967 | Healey et al. | |
| 3,655,244 A * | 4/1972 | Swisher | B25D 17/02 403/334 |
| 3,807,804 A | 4/1974 | Kniff | |
| 4,005,906 A | 2/1977 | McKenry et al. | |
| 4,202,420 A | 5/1980 | Peetz et al. | |
| 4,258,808 A | 3/1981 | Peetz et al. | |

(Continued)

FOREIGN PATENT DOCUMENTS

| | | |
|---|---|---|
| DE | 592580 C | 2/1934 |
| DE | 1965606 A1 | 7/1971 |

(Continued)

*Primary Examiner* — Omar Flores Sanchez
(74) *Attorney, Agent, or Firm* — Michael Best & Friedrich LLP

(57) ABSTRACT

A chisel including a body formed of a first material, the body including a first end having a shank, a second end having a protrusion, and a longitudinal axis extending through the first end and the second end. The chisel includes a head formed of a second material that is harder than the first material and including a first end coupled to the second end of the body and defining a recess that receives the protrusion, a second end that is opposite the first end of the head, a cylindrical portion that defines the first end of the head, and a conular portion that extends from the cylindrical portion and toward the second end of the head.

14 Claims, 60 Drawing Sheets

(56) References Cited

U.S. PATENT DOCUMENTS

| | | | | | |
|---|---|---|---|---|---|
| 4,907,928 | A | | 3/1990 | Beck et al. | |
| 4,941,711 | A | | 7/1990 | Stiffler | |
| 5,083,839 | A | | 1/1992 | Younger | |
| 5,141,289 | A | * | 8/1992 | Stiffler | E21C 35/183<br>299/111 |
| 5,265,989 | A | | 11/1993 | Stock | |
| 5,632,527 | A | | 5/1997 | Halder | |
| 6,113,195 | A | | 9/2000 | Mercier et al. | |
| 6,257,673 | B1 | * | 7/2001 | Markham | B25D 17/02<br>299/37.3 |
| 6,640,914 | B2 | | 11/2003 | Wisser et al. | |
| 6,712,163 | B2 | | 3/2004 | Kleine et al. | |
| 7,204,560 | B2 | | 4/2007 | Mercier et al. | |
| 7,320,505 | B1 | | 1/2008 | Hall et al. | |
| 7,347,292 | B1 | | 3/2008 | Hall et al. | |
| 7,353,893 | B1 | | 4/2008 | Hall et al. | |
| 7,396,086 | B1 | | 7/2008 | Hall et al. | |
| 7,401,863 | B1 | | 7/2008 | Hall et al. | |
| 7,445,294 | B2 | | 11/2008 | Hall et al. | |
| 7,455,129 | B2 | | 11/2008 | Widmann et al. | |
| 7,464,993 | B2 | | 12/2008 | Hall et al. | |
| 7,503,628 | B2 | | 3/2009 | Hall et al. | |
| 7,549,491 | B2 | | 6/2009 | Hoeggerl et al. | |
| 7,588,102 | B2 | | 9/2009 | Hall et al. | |
| 7,661,765 | B2 | * | 2/2010 | Hall | E21C 35/197<br>299/113 |
| 7,665,552 | B2 | | 2/2010 | Hall et al. | |
| 7,669,938 | B2 | | 3/2010 | Hall et al. | |
| 7,950,746 | B2 | | 5/2011 | Hall et al. | |
| 7,997,661 | B2 | | 8/2011 | Hall et al. | |
| 8,028,774 | B2 | | 10/2011 | Hall et al. | |
| 8,038,223 | B2 | * | 10/2011 | Hall | E21C 35/197<br>299/105 |
| 8,104,199 | B2 | * | 1/2012 | Calderwood | E02F 9/2858<br>37/453 |
| 8,109,349 | B2 | | 2/2012 | Hall et al. | |
| 8,123,302 | B2 | * | 2/2012 | Hall | E21B 10/633<br>299/113 |
| 8,365,845 | B2 | | 2/2013 | Hall et al. | |
| 8,449,040 | B2 | | 5/2013 | Hall et al. | |
| 8,485,609 | B2 | * | 7/2013 | Hall | E21C 35/183<br>299/113 |
| 8,919,567 | B2 | | 12/2014 | Tieu et al. | |
| 8,960,337 | B2 | | 2/2015 | Hall et al. | |
| 8,998,346 | B2 | * | 4/2015 | Hall | E02F 9/2808<br>299/110 |
| 9,085,074 | B2 | | 7/2015 | Quinn et al. | |
| 9,103,208 | B2 | * | 8/2015 | Macintyre | E21C 35/183 |
| 9,333,635 | B2 | | 5/2016 | Quinn et al. | |
| 9,540,886 | B2 | | 1/2017 | Hall et al. | |
| 9,593,577 | B2 | * | 3/2017 | Lachmann | C22C 26/00 |
| 9,975,231 | B2 | | 5/2018 | Jones | |
| 10,029,391 | B2 | | 7/2018 | Hall et al. | |
| 10,352,104 | B2 | | 7/2019 | Akhmadi Eko et al. | |
| 10,428,652 | B2 | | 10/2019 | Ries et al. | |
| 10,654,157 | B2 | | 5/2020 | Jones | |
| 11,186,901 | B2 | | 11/2021 | Amada et al. | |
| 2002/0020566 | A1 | * | 2/2002 | Hauptmann | E21B 7/24<br>175/419 |
| 2003/0222496 | A1 | * | 12/2003 | Broom | B28D 1/28<br>299/100 |
| 2004/0035007 | A1 | | 2/2004 | Burgess | |
| 2004/0047757 | A1 | | 3/2004 | Takayama | |
| 2004/0131436 | A1 | * | 7/2004 | Rompel | B25D 17/088<br>408/226 |
| 2006/0254830 | A1 | | 11/2006 | Radtke | |
| 2007/0187452 | A1 | | 8/2007 | Budzisz | |
| 2008/0030066 | A1 | | 2/2008 | Mercier et al. | |
| 2008/0106138 | A1 | | 5/2008 | Yang | |
| 2008/0149399 | A1 | | 6/2008 | Koch et al. | |
| 2009/0056407 | A1 | * | 3/2009 | Greene | B25D 3/00<br>72/481.1 |
| 2009/0058174 | A1 | | 3/2009 | Hall et al. | |
| 2009/0133890 | A1 | | 5/2009 | Duggan | |
| 2010/0065339 | A1 | | 3/2010 | Hall et al. | |
| 2010/0071964 | A1 | | 3/2010 | Hall et al. | |
| 2011/0135414 | A1 | | 6/2011 | Pfeiffer et al. | |
| 2012/0025592 | A1 | | 2/2012 | Hall et al. | |
| 2018/0087137 | A1 | | 3/2018 | Amada et al. | |
| 2018/0133881 | A1 | * | 5/2018 | Schley | B25B 13/08 |
| 2019/0277094 | A1 | | 9/2019 | Clesen et al. | |
| 2020/0156163 | A1 | | 5/2020 | Bohn et al. | |
| 2020/0215674 | A1 | * | 7/2020 | Bohn | B25D 17/02 |
| 2020/0282582 | A1 | | 9/2020 | Hofmann et al. | |
| 2021/0101030 | A1 | | 4/2021 | Schnell | |
| 2021/0252686 | A1 | | 8/2021 | Redondi | |
| 2023/0219206 | A1 | * | 7/2023 | Schley | B25D 17/005<br>173/90 |
| 2024/0058933 | A1 | * | 2/2024 | Greaney | B25D 3/00 |

FOREIGN PATENT DOCUMENTS

| | | | |
|---|---|---|---|
| DE | 2158628 | B1 | 5/1973 |
| DE | 2423510 | A1 | 11/1975 |
| DE | 2423511 | A1 | 11/1975 |
| DE | 2521111 | A1 | 11/1975 |
| DE | 2756990 | A1 | 6/1979 |
| DE | 7903012 | U1 | 6/1980 |
| DE | 3342135 | A1 | 5/1985 |
| DE | 3342137 | A1 | 5/1985 |
| DE | 3344688 | A1 | 6/1985 |
| DE | 3344720 | A1 | 6/1985 |
| DE | 3403480 | A1 | 8/1985 |
| DE | 3439475 | A1 | 4/1986 |
| DE | 19745164 | A1 | 4/1999 |
| DE | 69604090 | T2 | 4/2000 |
| DE | 10131358 | A1 | 1/2003 |
| DE | 102005042663 | A1 | 3/2006 |
| DE | 102010031313 | A1 | 1/2012 |
| DE | 102011010322 | A1 | 10/2012 |
| DE | 102011054384 | A1 | 4/2013 |
| DE | 102012224434 | A1 | 7/2014 |
| EP | 0925881 | A1 | 6/1999 |
| EP | 1661660 | A1 | 5/2006 |
| EP | 2305433 | A1 | 4/2011 |
| JP | 2002317442 | A | 10/2002 |
| WO | 2004056534 | A1 | 7/2004 |
| WO | 2008104249 | A1 | 9/2008 |
| WO | 2008105915 | A2 | 9/2008 |
| WO | 2011089739 | A1 | 7/2011 |
| WO | 2013053811 | A2 | 4/2013 |
| WO | 2013068152 | A1 | 5/2013 |
| WO | 2016153364 | A2 | 9/2016 |
| WO | 2017076760 | A1 | 5/2017 |
| WO | 2018149746 | A1 | 8/2018 |
| WO | 2020151929 | A1 | 7/2020 |

* cited by examiner

CHISEL

CROSS-REFERENCE TO RELATED APPLICATION

This application claims priority to U.S. Provisional Patent Application No. 63/399,914, filed Aug. 22, 2022, and U.S. Provisional Patent Application No. 63/400,082, filed Aug. 23, 2022, the entire contents of both of which are incorporated by reference herein.

FIELD OF THE INVENTION

The present invention relates to chisels.

SUMMARY OF THE INVENTION

The present invention provides, in one aspect, a chisel including a body formed of a first material, the body including a first end having a shank, a second end having a protrusion, and a longitudinal axis extending through the first end and the second end. The chisel includes a head formed of a second material that is harder than the first material. The head includes a first end coupled to the second end of the body and defining a recess that receives the protrusion. The head includes a second end that is opposite the first end of the head, a cylindrical portion that defines the first end of the head, and a conular portion that extends from the cylindrical portion and toward the second end of the head.

The present invention provides, in another aspect, a chisel including a body formed of a first material, the body including a first end having a shank, a second end including a first portion, a second portion, and a channel therebetween, the channel having a length and a wall extending along the length between the first and second portions. The body includes a longitudinal axis extending through the first end and the second end. The chisel includes a head formed of a second material that is harder than the first material. The head extends from the first portion to the second portion of the second end and includes a first end including a recess that receives the wall, a second end that is opposite the first end of the head and includes a working edge, and a first surface and a second surface. The first and second surfaces extend from the working edge toward the first end of the head.

The present invention provides, in yet another aspect, a chisel including a body formed of a first material, the body including a first end having a shank, a second end having a first side, a second side that is opposite the first side, a third side extending between the first side and the second side, and a fourth side that is opposite the third side and extending between the first side and the second side. The body includes a channel formed in an edge of the second end between the first side and the second side. The channel extends from the third side to the fourth side. The body includes a longitudinal axis extending through the first end and the second end. The chisel includes a head formed of a second material that is harder than the first material. The head is received in the channel, extending continuously between the third side and the fourth side, and defines a working edge of the chisel. The head includes a first convex surface, a second convex surface coupled together at the working edge of the chisel, a first concave surface extending from the first convex surface, and a second concave surface extending from the first convex surface.

The present invention provides, in yet another aspect, a chisel including a body formed of a first material, the body including a first end having a shank and a second end having a first planar side, a second planar side that is opposite the first planar side, a third side extending between the first planar side and the second planar side, and a fourth side that is opposite the third side and extending between the first planar side and the second planar side. The body includes a channel formed in an edge of the second end between the first planar side and the second planar side. The channel extends from the third side to the fourth side. The body includes a longitudinal axis extending through the first end and the second end. The chisel includes a head formed of a second material that is harder than the first material, the head includes a plurality of plates received in the channel. The plurality of plates are arranged adjacent to one another between the third side and the fourth side to define a working surface of the chisel.

The present invention provides, in yet another aspect, a chisel including a body formed of a first material, the body including a first end having a shank and a second end having a first planar side, a second planar side that is opposite the first planar side, a third side extending between the first planar side and the second planar side, and a fourth side that is opposite the third side and extending between the first planar side and the second planar side. The body includes a plurality of channels formed in an edge of the second end between the third planar side and the fourth planar side, the plurality of channels extending from the first planar side to the second planar side. The body includes a longitudinal axis extending through the first end and the second end. The chisel includes a head formed of a second material that is harder than the first material, the head includes a plurality of plates received in the plurality of channels. Each of the plurality of plates extend from the first planar side to the second planar side and define a working surface of the chisel.

The present invention provides, in yet another aspect, a chisel including a body formed of a first material, the body including a first end having a shank and a second end having a first planar side, a second planar side that is opposite the first planar side, a third side extending between the first planar side and the second planar side, and a fourth side that is opposite the third side and extending between the first planar side and the second planar side. The body includes a channel formed in an edge of the second end between the first planar side and the second planar side, the channel extending from the third side to the fourth side. The body includes a plurality of recesses formed in the edge of the second end between the third side and the fourth side, each of the plurality of recesses extending from the first planar side or the second planar side to the channel. The body includes a longitudinal axis extending through the first end and the second end. The chisel includes a head formed of a second material that is harder than the first material, the head received in the channel and the plurality of recesses. The head extends continuously between the third side and the fourth side to define a working edge of the chisel.

The present invention provides, in yet another aspect, a chisel including a body formed of a first material, the body including a first end having a shank and a second end having a first planar side, a second planar side that is opposite the first planar side, a third side extending between the first planar side and the second planar side, and a fourth side that is opposite the third side and extending between the first planar side and the second planar side. The body includes a longitudinal axis extending through the first end and the second end. The chisel includes a plurality of projections extending from the first planar side and formed of a second material that is harder than the first material.

Other features and aspects of the invention will become apparent by consideration of the following detailed description and accompanying drawings.

BRIEF DESCRIPTION OF THE DRAWINGS

FIG. 120 is another perspective view of the head of FIG. 115.

FIG. 121 is a perspective view of a chisel according to another embodiment, the chisel including a body and a head coupled to the body.

FIG. 122 is an exploded view of the chisel of FIG. 121.

FIG. 123 is another exploded view of the chisel of FIG. 121.

FIG. 124 is a perspective view of a chisel according to another embodiment, the chisel including a body and a head coupled to the body.

FIG. 125 is a detailed perspective view of the chisel of FIG. 124.

FIG. 126 is an exploded view of the chisel of FIG. 124.

FIG. 127 is another exploded view of the chisel of FIG. 124.

FIG. 128 is a side view of the head of FIG. 124.

FIG. 129 is a perspective view of a chisel according to another embodiment, the chisel including a body and a head coupled to the body.

FIG. 130 is a detailed perspective view of the chisel of FIG. 129.

FIG. 131 is another detailed perspective view of the chisel of FIG. 129.

Figure 132:
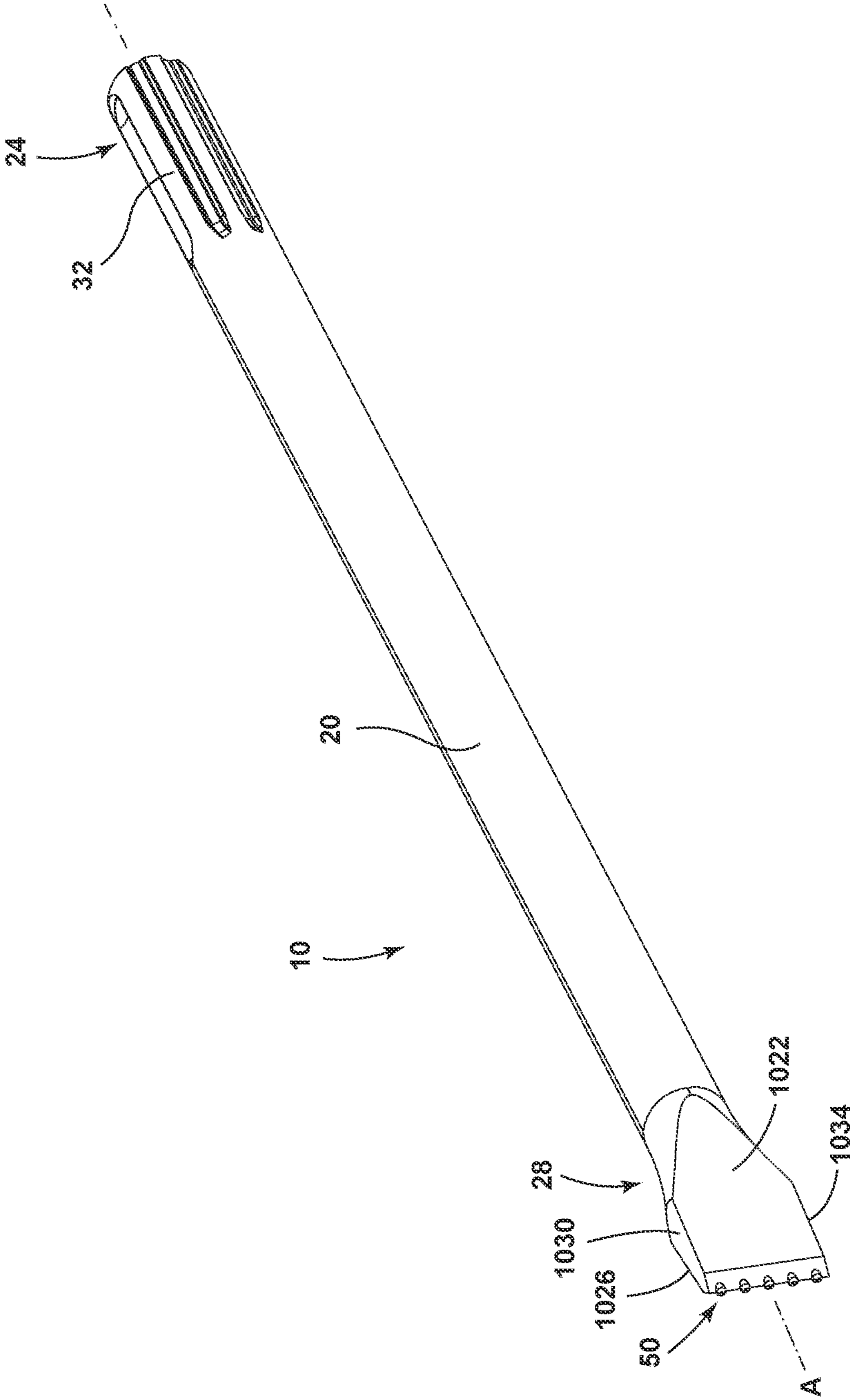

FIG. 132 is a perspective view of a chisel according to another embodiment, the chisel including a body and a head coupled to the body.

Figure 133:
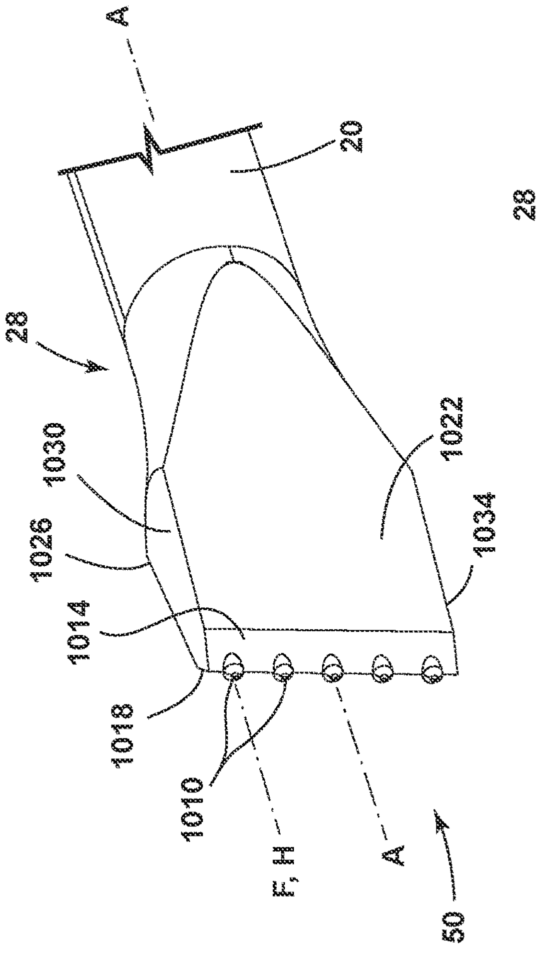

FIG. 133 is a detailed perspective view of the chisel of FIG. 132.

Figure 134:
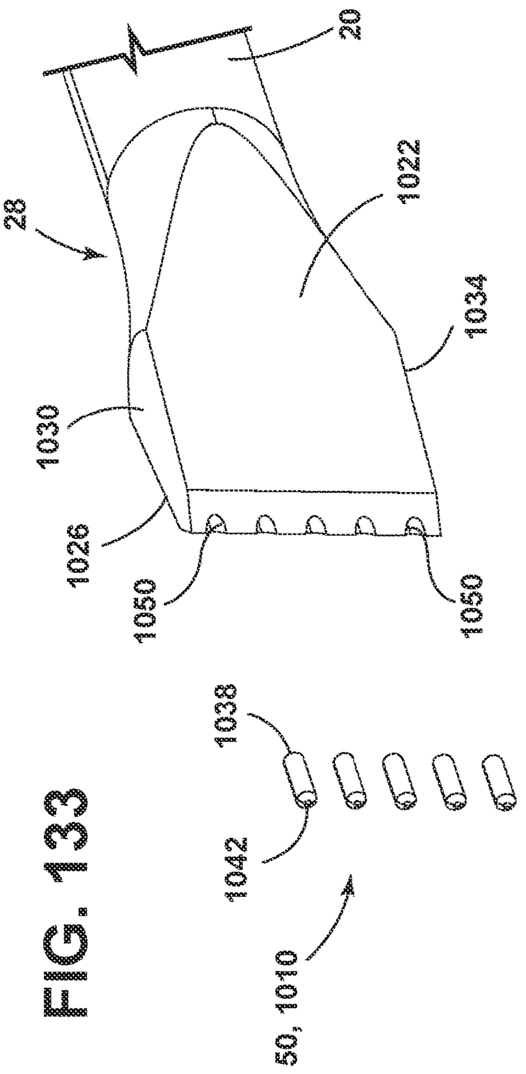

FIG. 134 is an exploded view of the chisel of FIG. 132.

Figure 135:
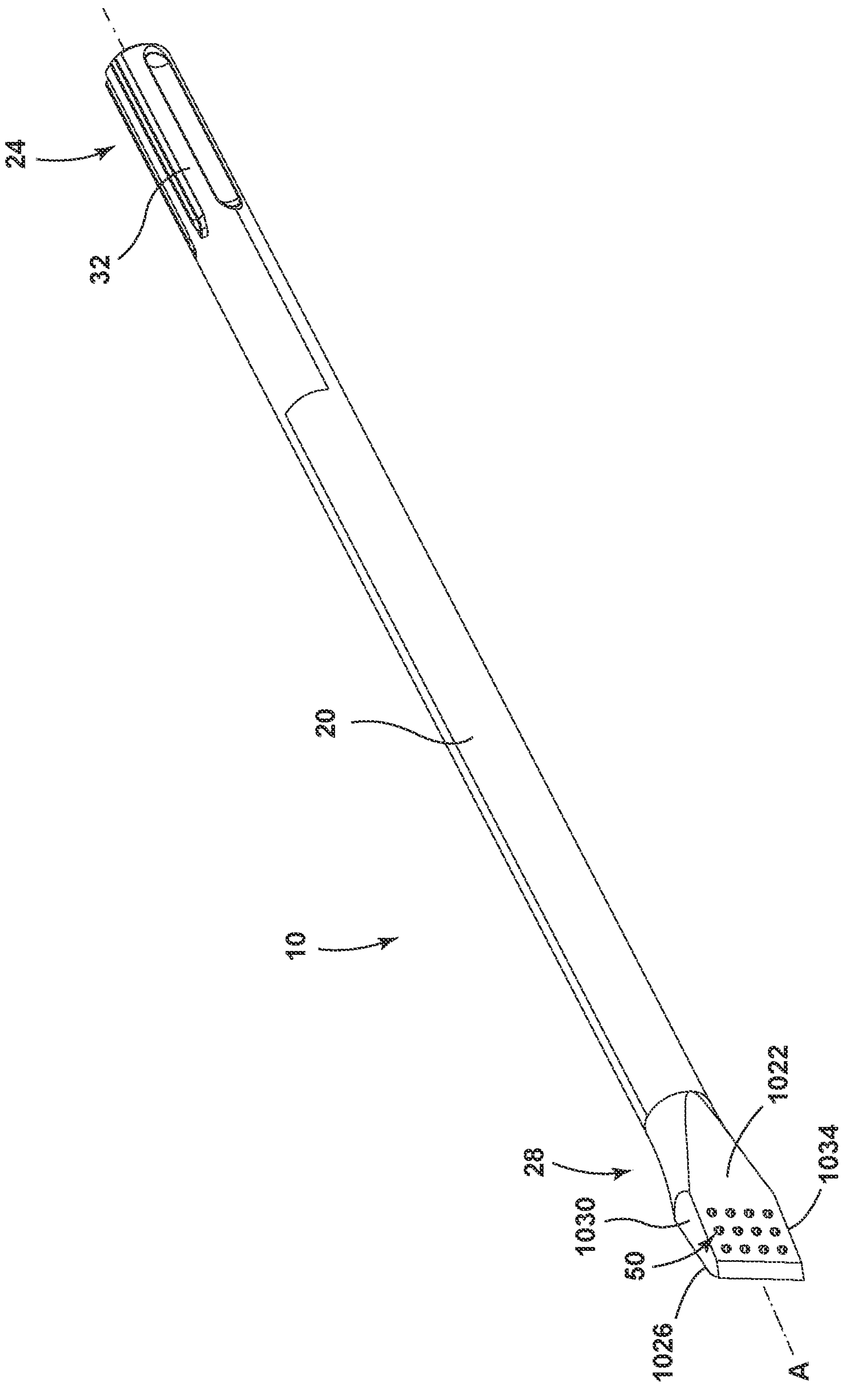

FIG. 135 is a perspective view of a chisel according to another embodiment, the chisel including a body and a head coupled to the body.

Figure 136:
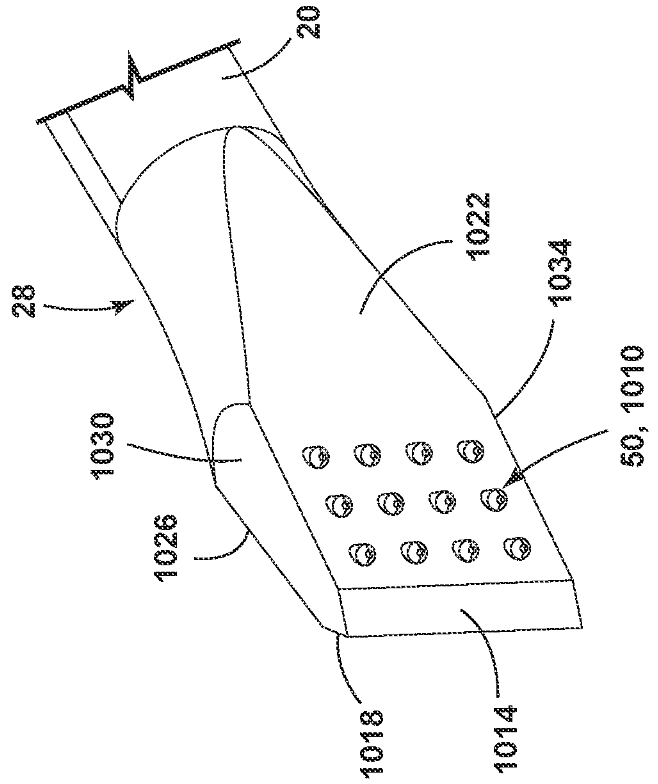

FIG. 136 is a detailed perspective view of the chisel of FIG. 135.

Figure 137:
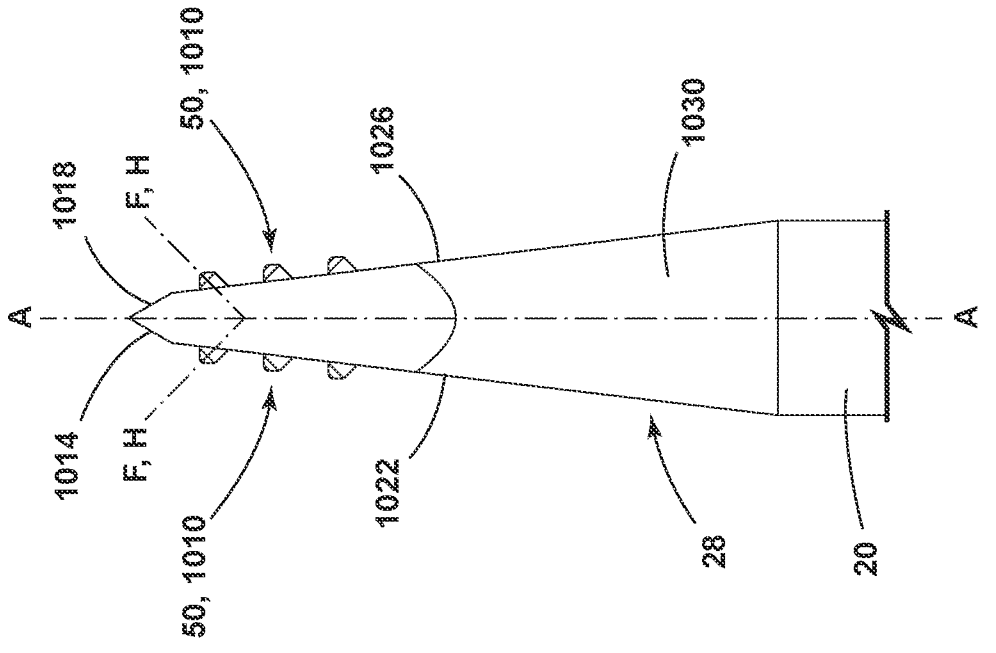

FIG. 137 is a side view of the chisel of FIG. 135.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 17:
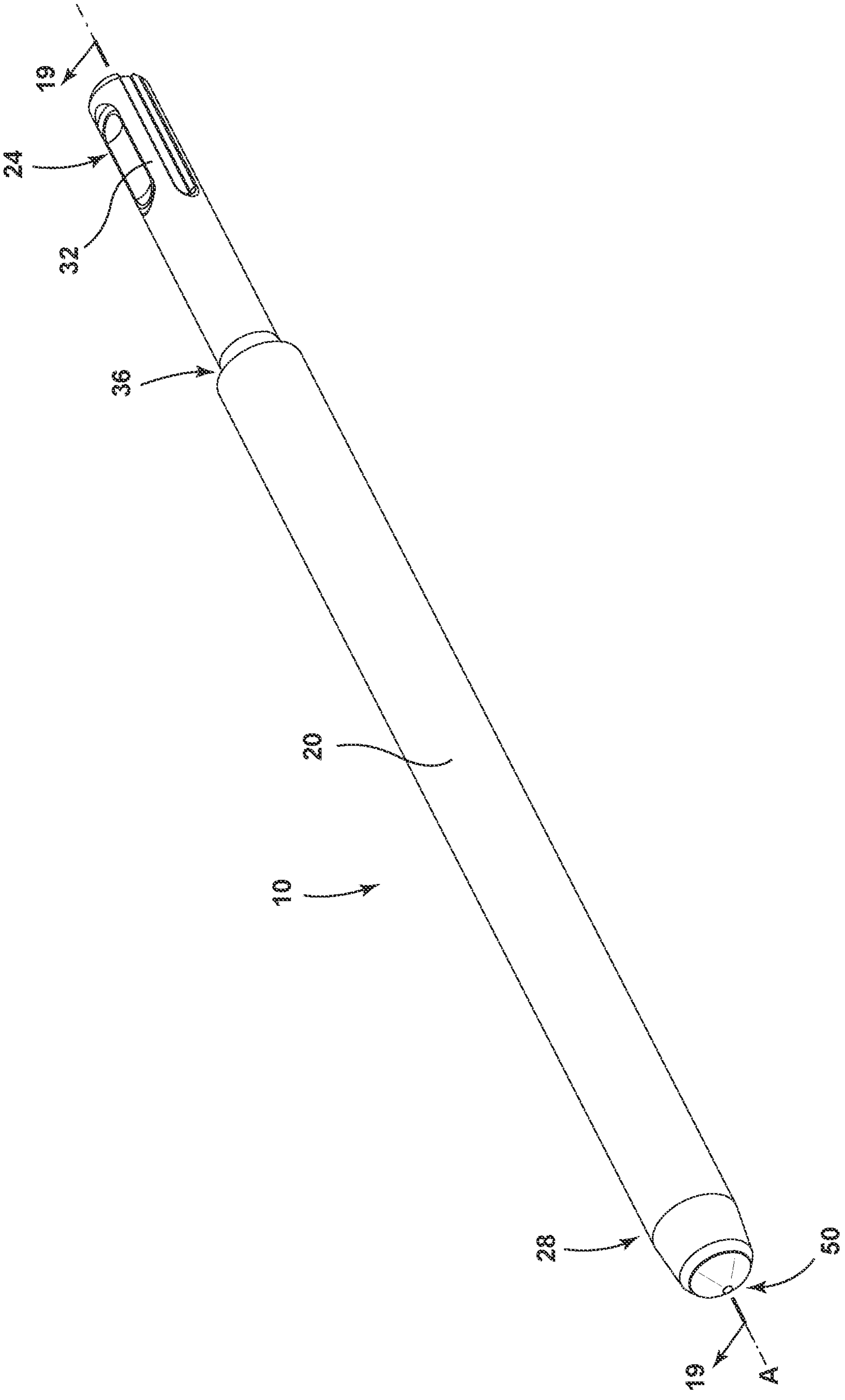
FIG. 17 is a perspective view of a chisel according to another embodiment, the chisel including a body and a head coupled to the body.
Figure 18:
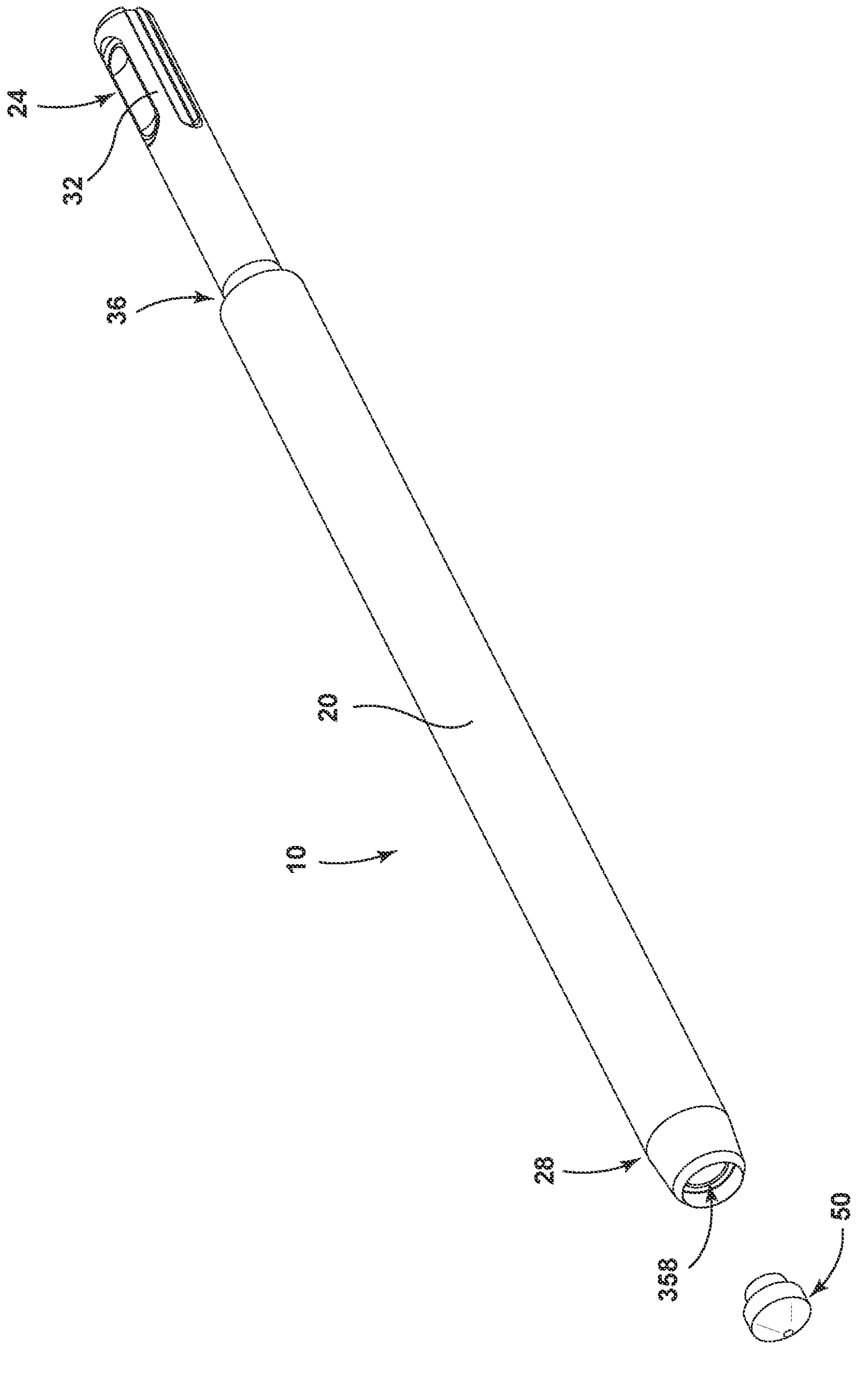
FIG. 18 is an exploded view of the chisel of FIG. 17.
Figure 19:
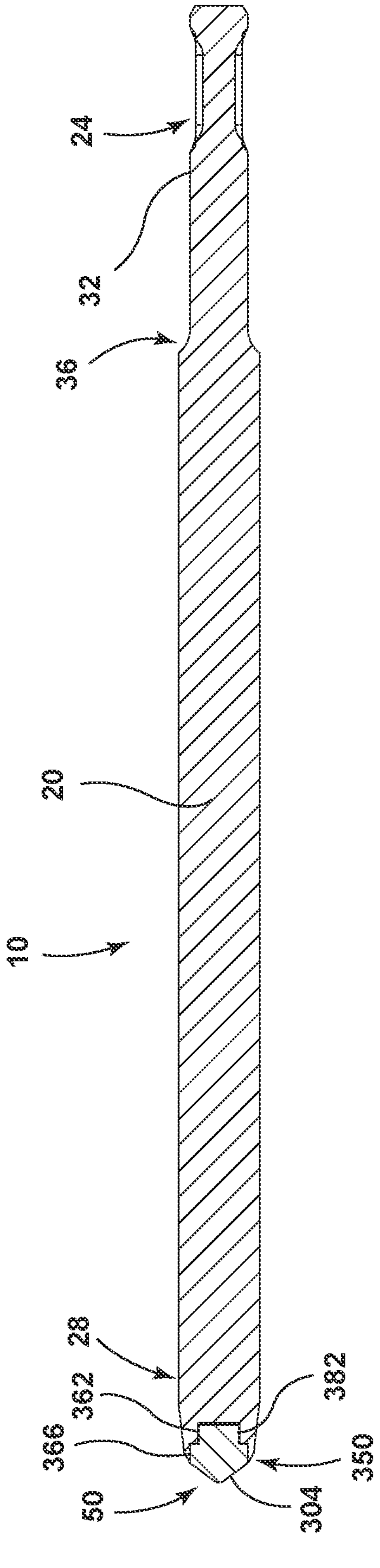
FIG. 19 is a cross-sectional view of the chisel of FIG. 17 along the line 19-19 of FIG. 17.
Figure 20:
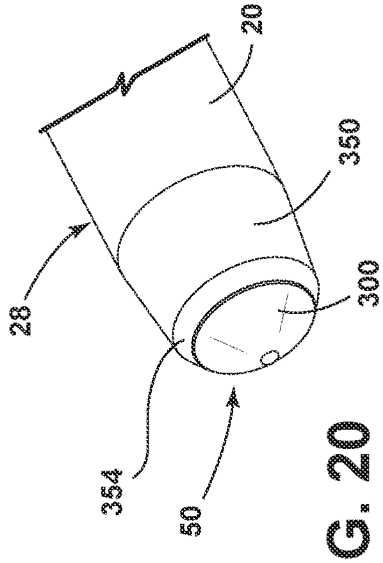
FIG. 20 is a detailed perspective view of the chisel of FIG. 17.
Figure 21:
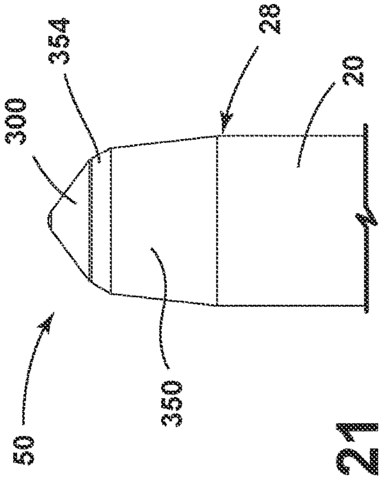
FIG. 21 is a detailed side view of the chisel of FIG. 17.
Figure 22:
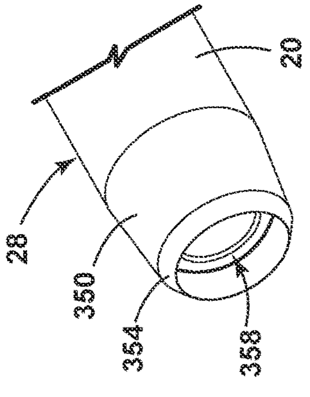
FIG. 22 is a detailed perspective view of the body of FIG. 17.
Figure 23:
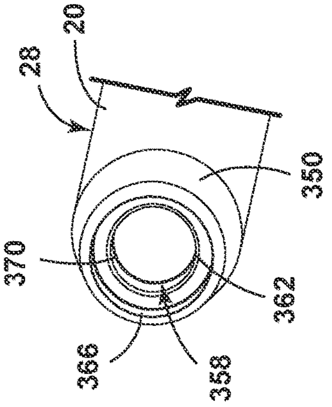
FIG. 23 is another detailed perspective view of the body of FIG. 17.
Figure 24:
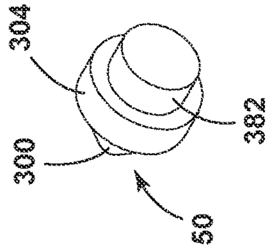
FIG. 24 is a detailed perspective view of the head of the chisel of FIG. 17.
Figure 25:
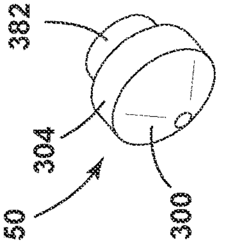
FIG. 25 is another detailed perspective view of the head of the chisel of FIG. 17.
Figure 26:
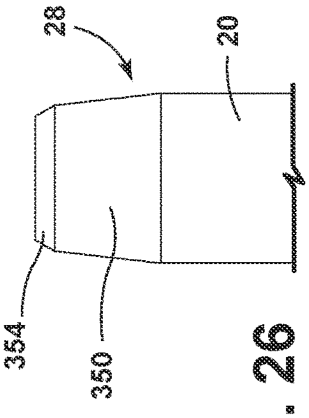
FIG. 26 is a detailed side view of the body of FIG. 17.
Figure 27:
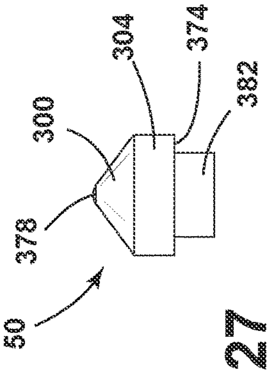
FIG. 27 is a detailed side view of the head of FIG. 17.
Figure 28:
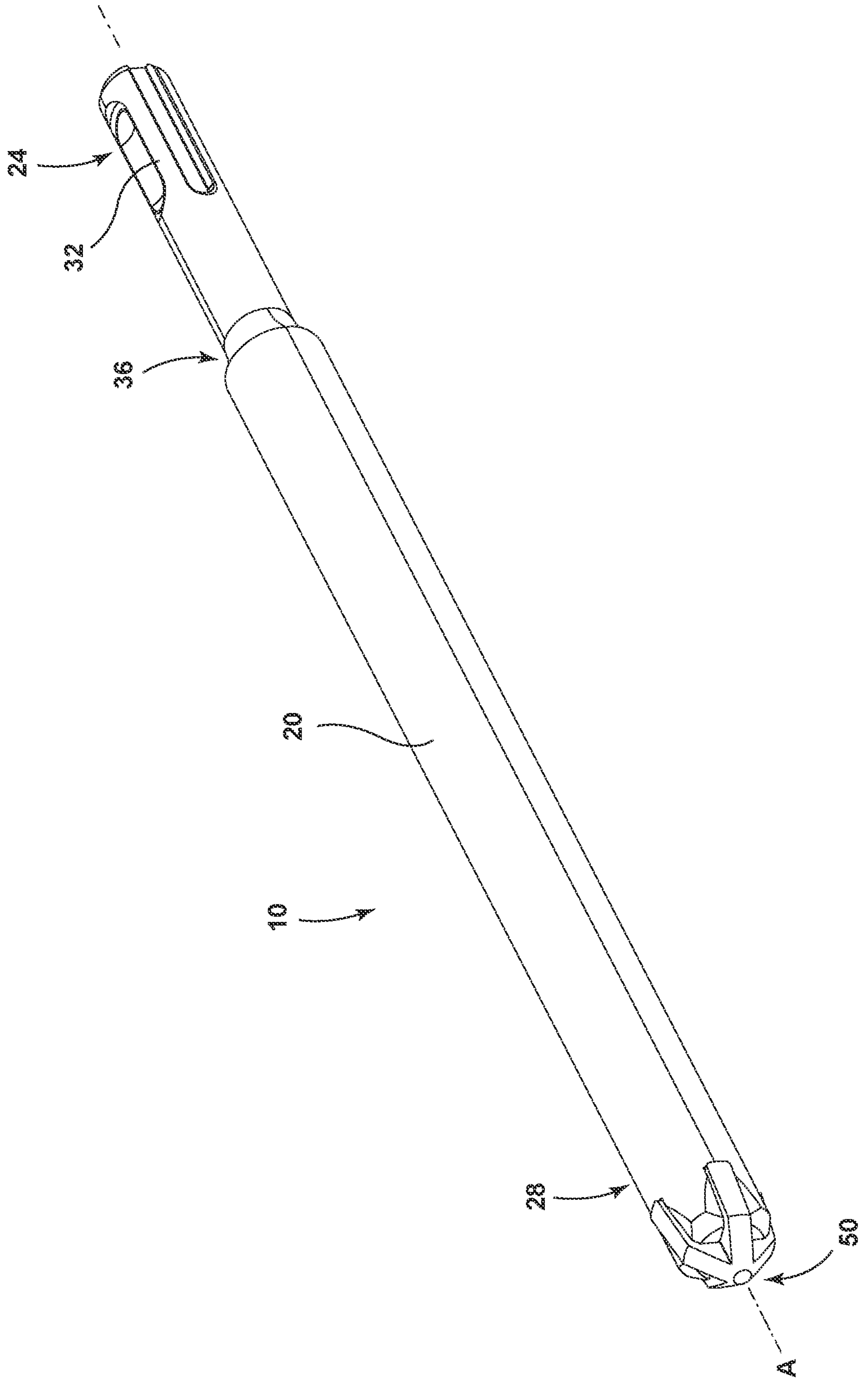
FIG. 28 is a perspective view of a chisel according to another embodiment, the chisel including a body and a head coupled to the body.
Figure 29:
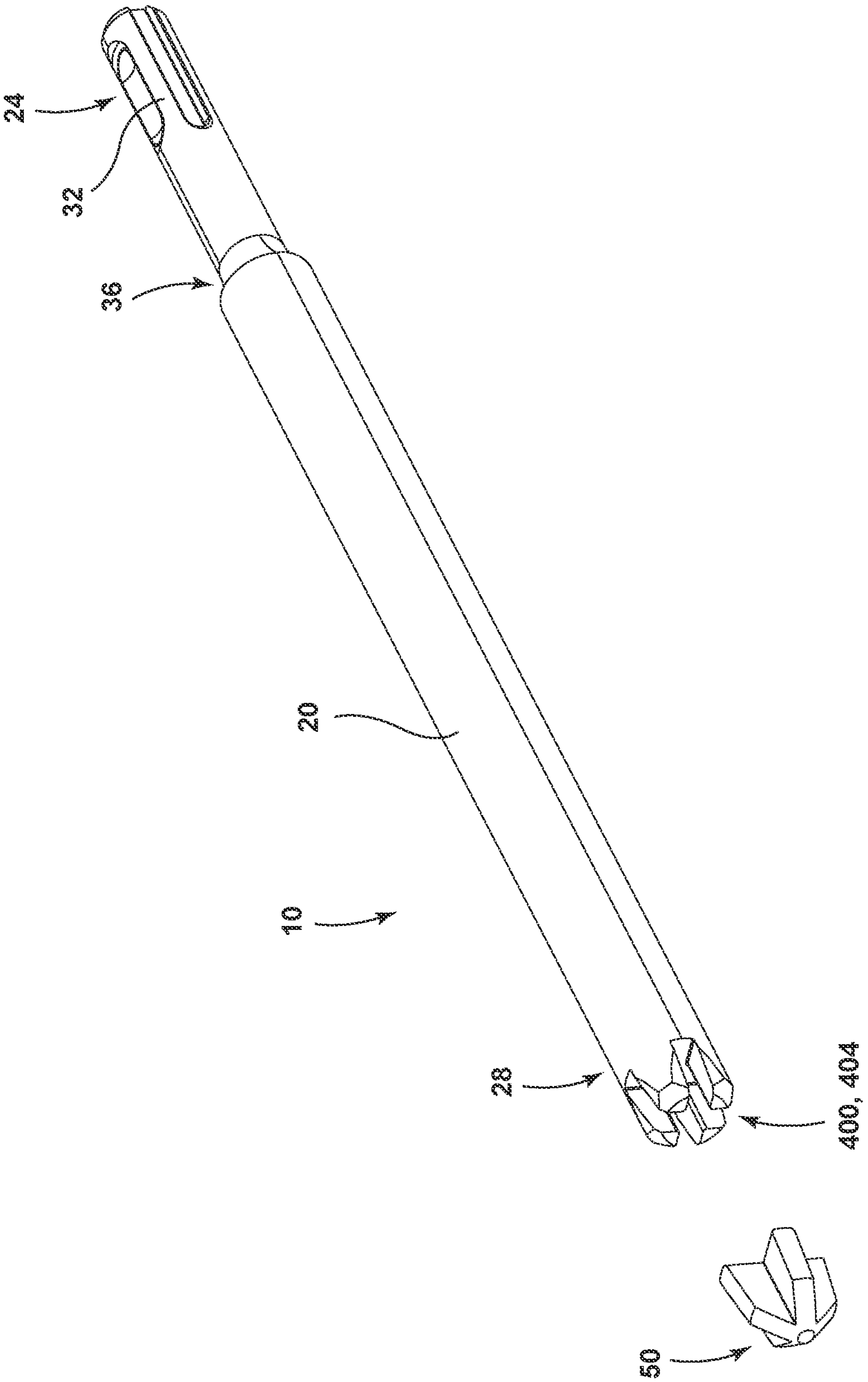
FIG. 29 is an exploded view of the chisel of FIG. 28.
Figure 30:
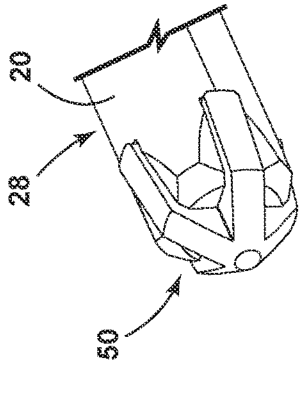
FIG. 30 is a detailed perspective view of the chisel of FIG. 28.
Figure 31:
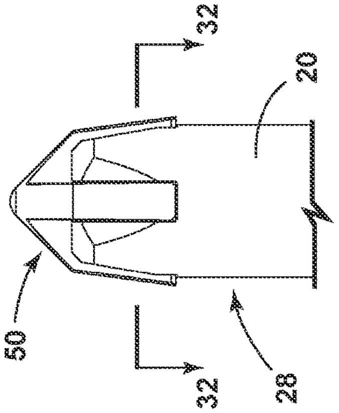
FIG. 31 is a detailed side view of the chisel of FIG. 28.
Figure 32:
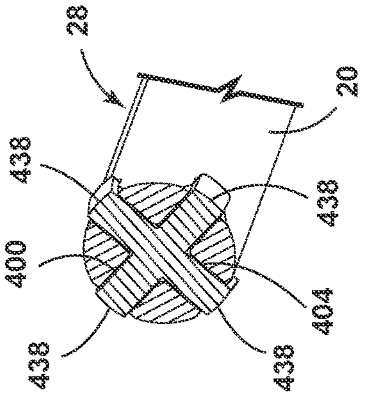
FIG. 32 is a cross-sectional view of the chisel of FIG. 28 along the line 32-32 of FIG. 31.
Figure 33:
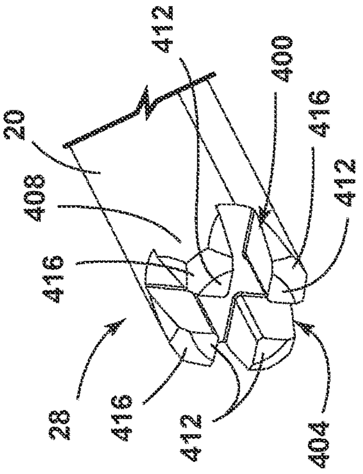
FIG. 33 is a detailed perspective view of the body of FIG. 28.
Figure 34:
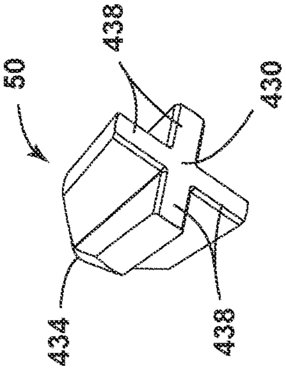
FIG. 34 is a detailed perspective view of the head of the chisel of FIG. 28.
Figure 35:
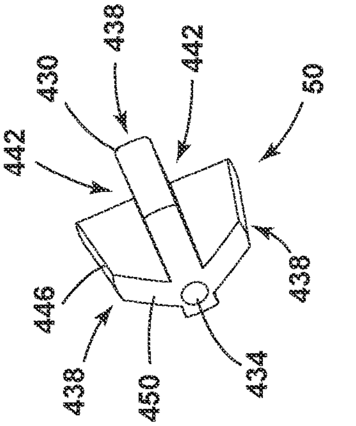
FIG. 35 is another detailed perspective view of the head of the chisel of FIG. 28.
Figure 36:
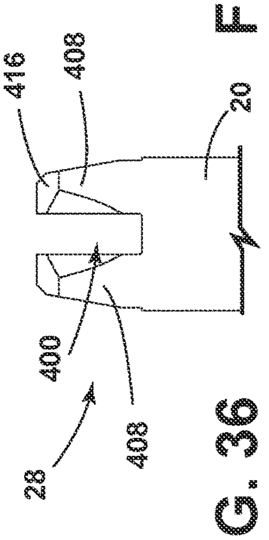
FIG. 36 is a detailed side view of the body of FIG. 28.
Figure 37:
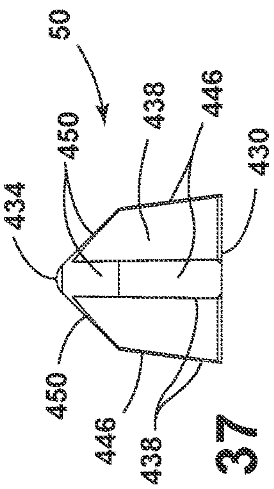
FIG. 37 is a detailed side view of the head of FIG. 28.
Figure 38:
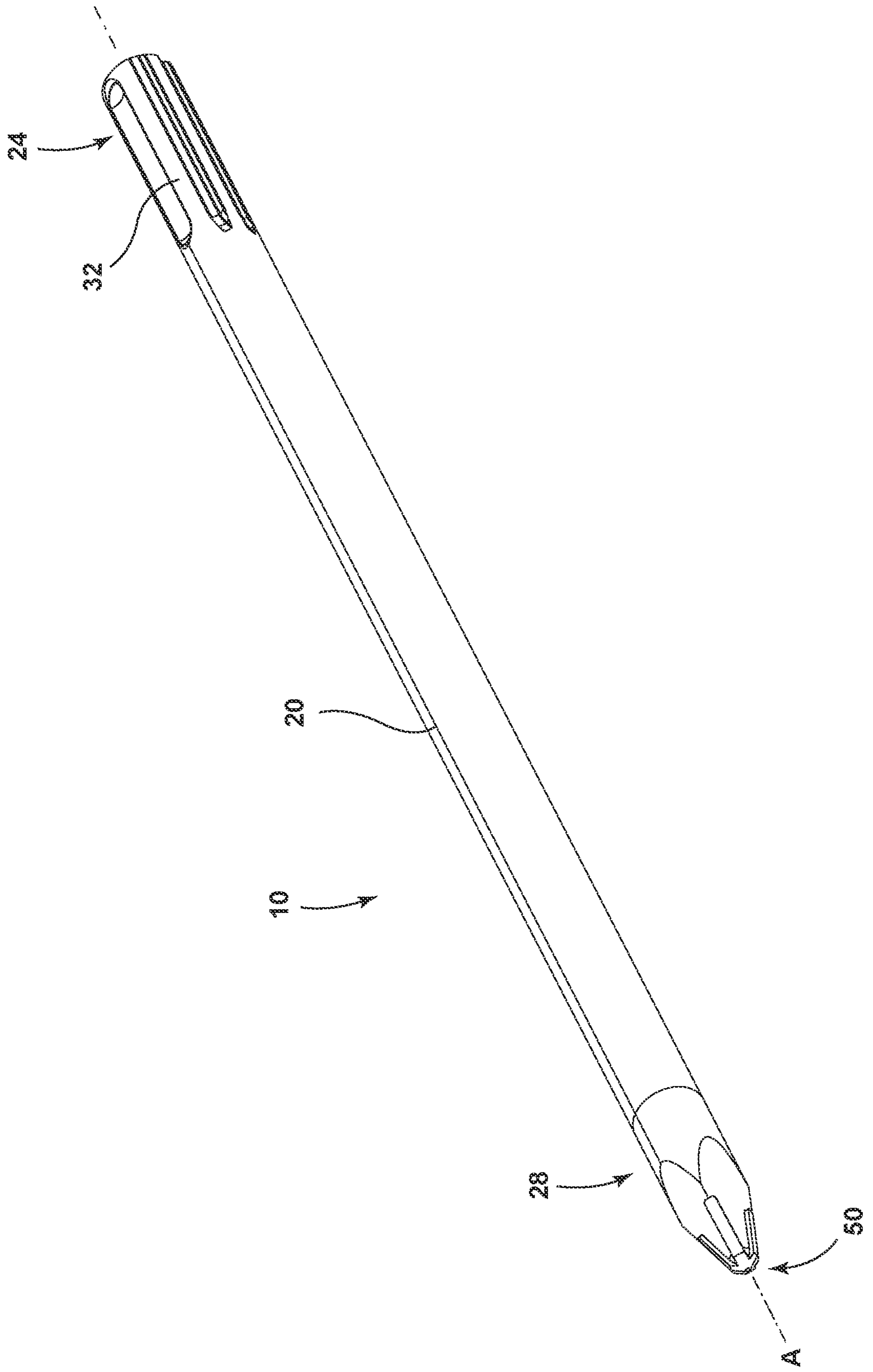
FIG. 38 is a perspective view of a chisel according to another embodiment, the chisel including a body and a head coupled to the body.
Figure 39:
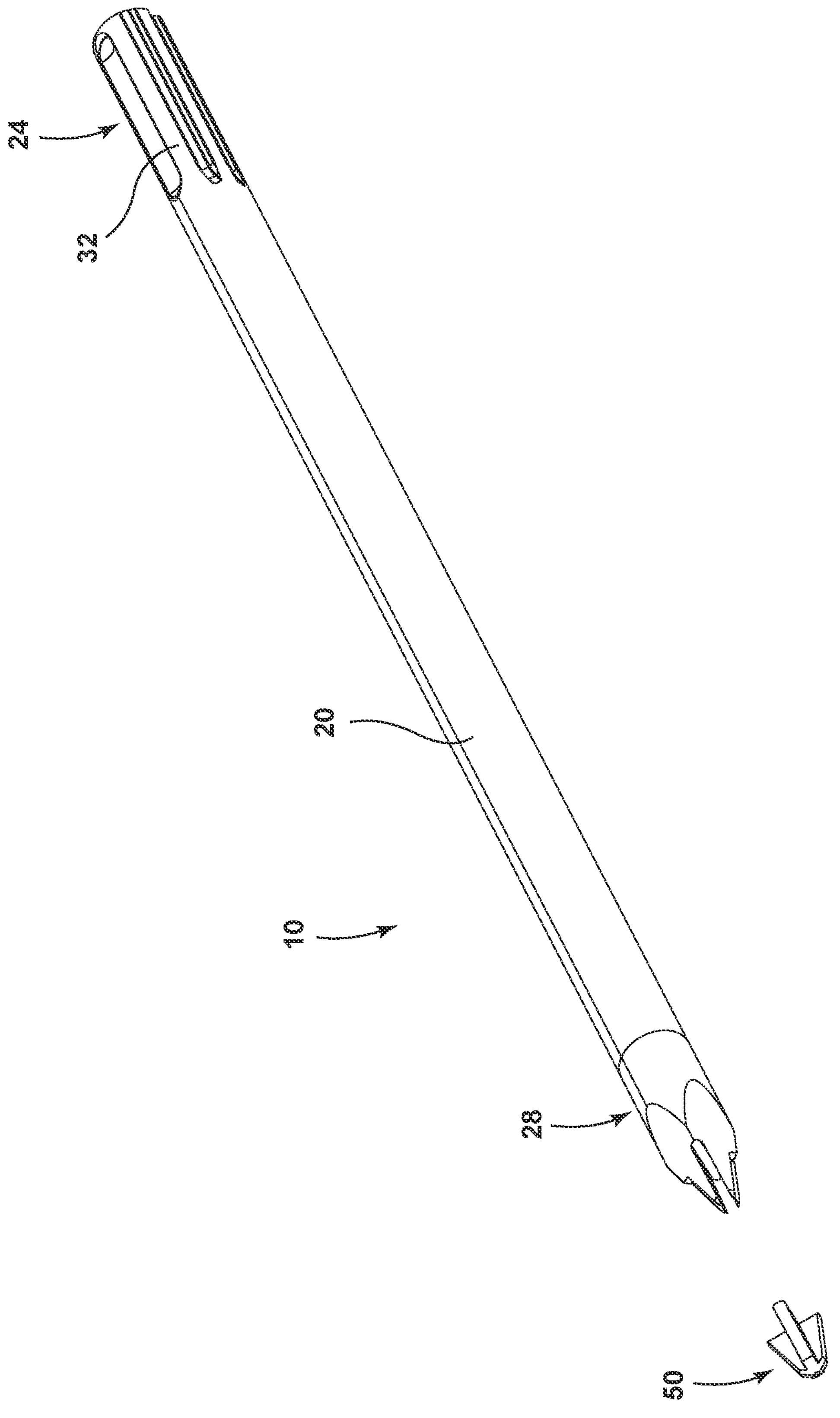
FIG. 39 is an exploded view of the chisel of FIG. 38.
Figure 40:
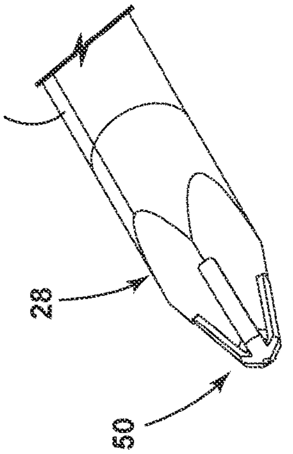
FIG. 40 is a detailed perspective view of the chisel of FIG. 38.
Figure 41:
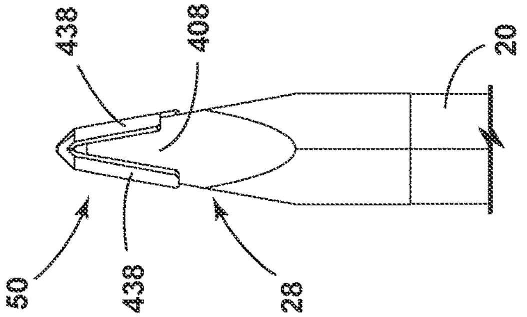
FIG. 41 is a detailed side view of the chisel of FIG. 38.
Figure 42:
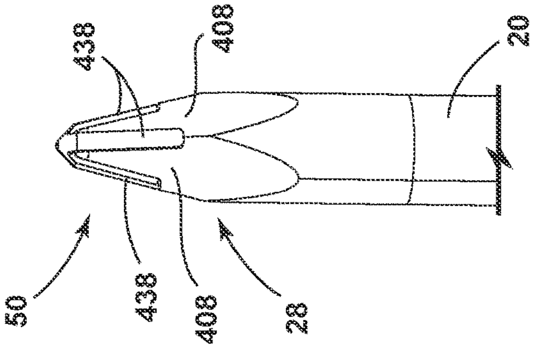
FIG. 42 is another detailed side view of the chisel of FIG. 38.
Figure 43:
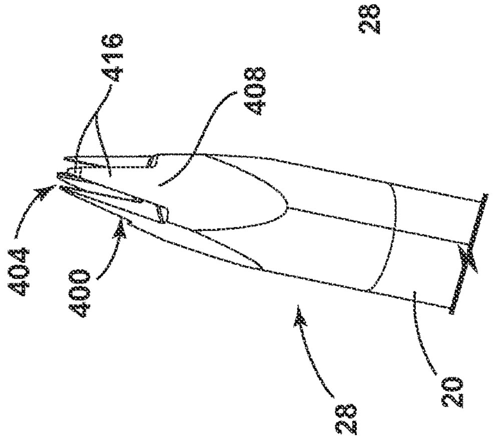
FIG. 43 is a detailed perspective view of the body of FIG. 38.
Figure 44:
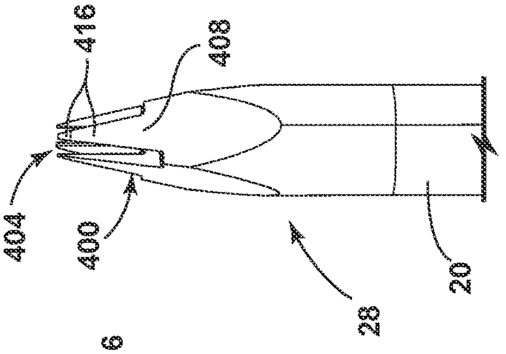
FIG. 44 is a detailed side view of the body of FIG. 38.
Figure 45:
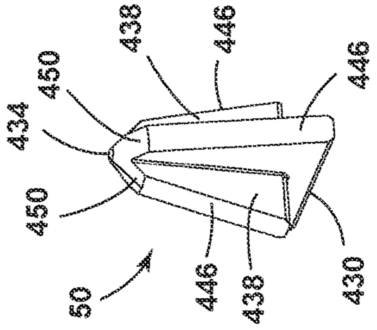
FIG. 45 is a perspective view of the head of FIG. 38.
Figure 46:
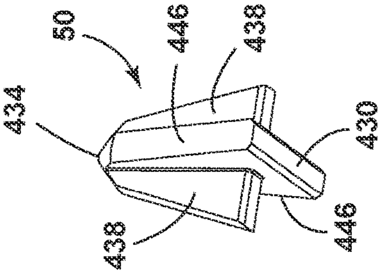
FIG. 46 is another perspective view of the head of FIG. 38.
Figure 47:
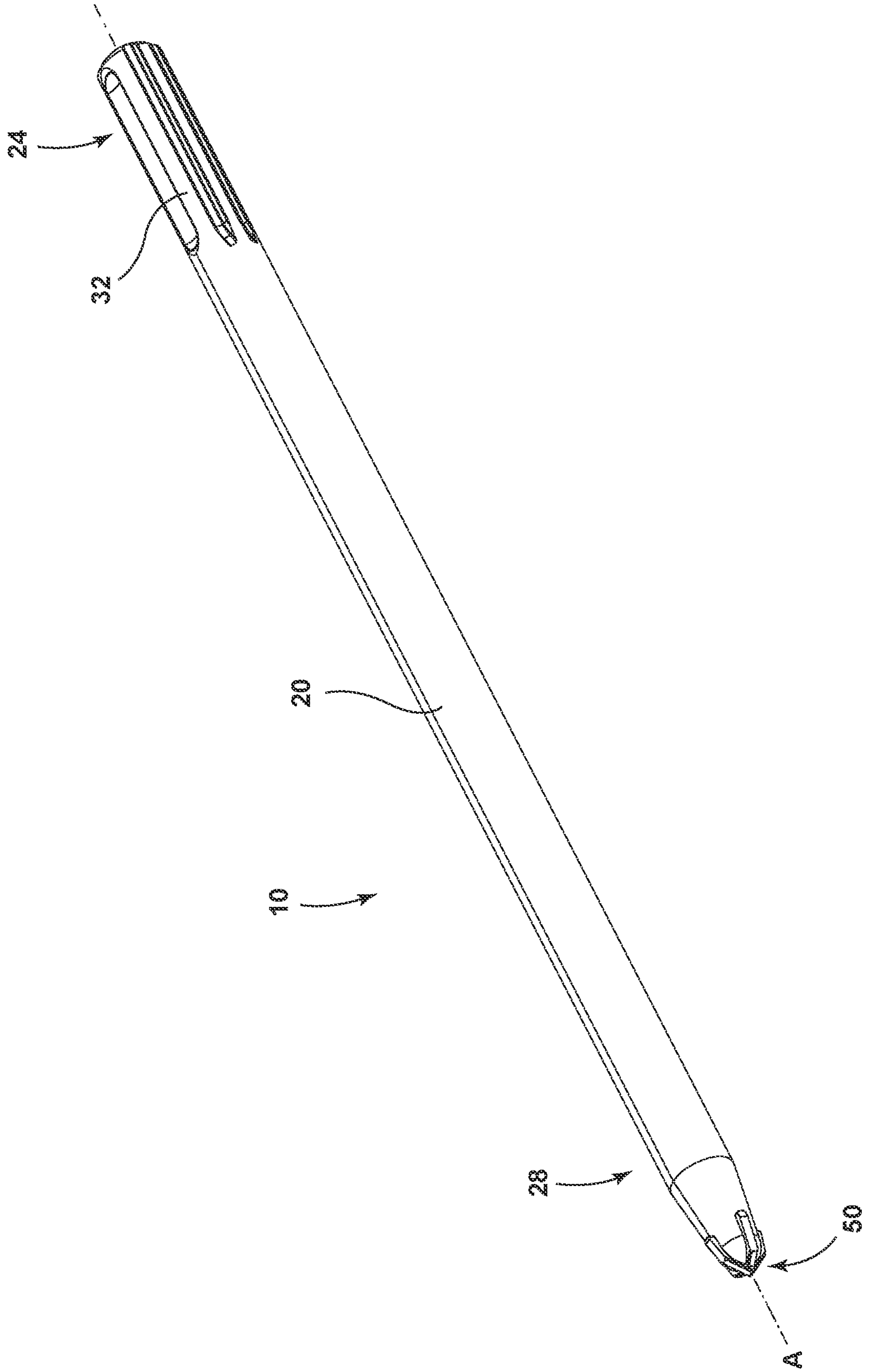
FIG. 47 is a perspective view of a chisel according to another embodiment, the chisel including a body and a head coupled to the body.
Figure 48:
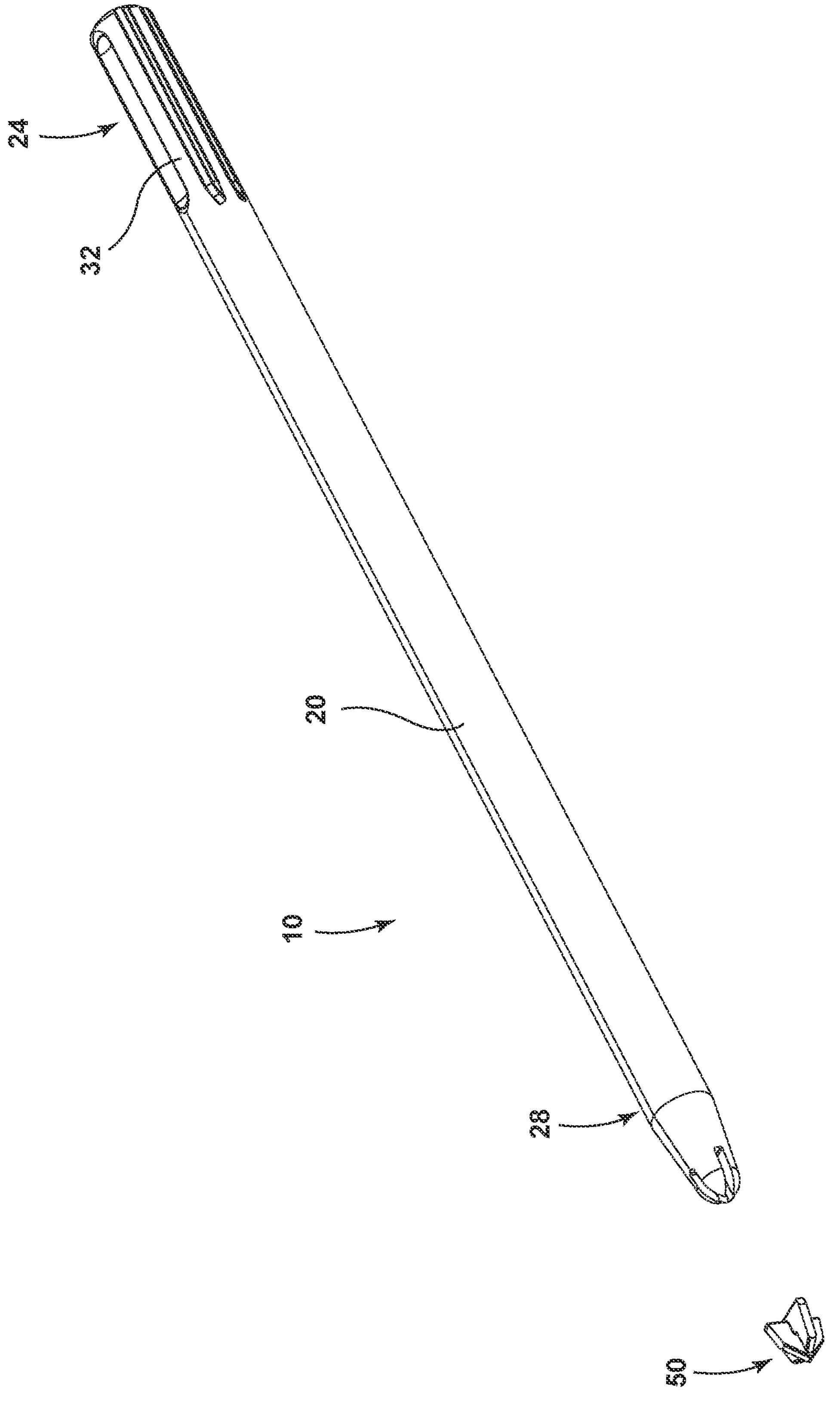
FIG. 48 is an exploded view of the chisel of FIG. 47.
Figure 49:
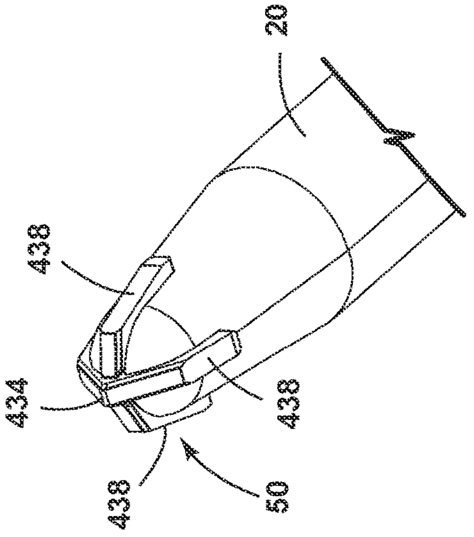
FIG. 49 is a detailed perspective view of the chisel of FIG. 47.

This application discloses various embodiments for a chisel 10. The chisel 10 in each embodiment includes a body 20 including a first end 24, a second end 28 opposite the first end 24, and an axis A extending from the first end 24 to the second end 28. The axis A may also be referred to as a longitudinal axis or a central longitudinal axis. The body 20 has a shank 32 that extends along the axis A and is positioned at the first end 24. The shank 32 is configured to be operably coupled to a chuck of a power tool (e.g., a drill, a rotary hammer etc.). In the illustrated embodiments, the body 20 is substantially cylindrical. In some embodiments, the shank 32 has substantially the same diameter as rest of the body 20. In some embodiments, the shank 32 has a smaller diameter than the rest of the body 20 thereby creating a transition region 36 (see, for example, FIG. 17) between the shank 32 and the rest of the body 20.

Additionally, the chisel 10 of each of the embodiments includes a head 50 that is coupled to the body 20 at the second end 28 and at least partially defines a working edge of the chisel 10. The head 50 may be coupled to the body 20 by any suitable means. For example, the head 50 may be coupled to the body 20 by brazing, welding, soldering, and the like. The body 20 is formed of a first material, and the head 50 is formed of a second material that is harder than the first material. In the illustrated embodiments, the body 20 is formed of tool steel, and the head 50 is formed of a carbide or high-speed steel (HSS). In other embodiments the body 20 may be formed of other suitable materials. In other embodiment, the body 20 may be formed of suitable materials having a hardness value of 45 HRC to 65 HRC and the head 50 may be formed of other suitable materials having a hardness value of 55 HRC to 80 HRC.

Although features of the chisels are described below with reference to particular chisels, various features of the chisels may be used in combination with one another. In particular, features of one head may be applicable to or alternatively usable with another head.

With reference to embodiments of FIGS. 1-27, the head 50 includes a conular, or conical, portion 300 and a cylindrical portion 304. The conular portion 300 extends from the cylindrical portion 304. Either the conular portion 300 or the cylindrical portion 304 defines a continuous surface with the body 20.

In one embodiment, shown in FIGS. 1-10, the body 20 includes a mating surface at the second end 28 thereof. The mating surface includes a protrusion 308 (e.g., projection) extending from the second end 28 (see FIGS. 2, 3, 6, and 9). The protrusion 308 is substantially semi-spherical in the illustrated embodiment and defines a diameter and circumference that are smaller than the diameter and circumference of the body 20. Accordingly, a flat, planar surface 312 is defined between the protrusion 308 and an edge of the body 20. The planar surface 312 is annular.

Figure 1:
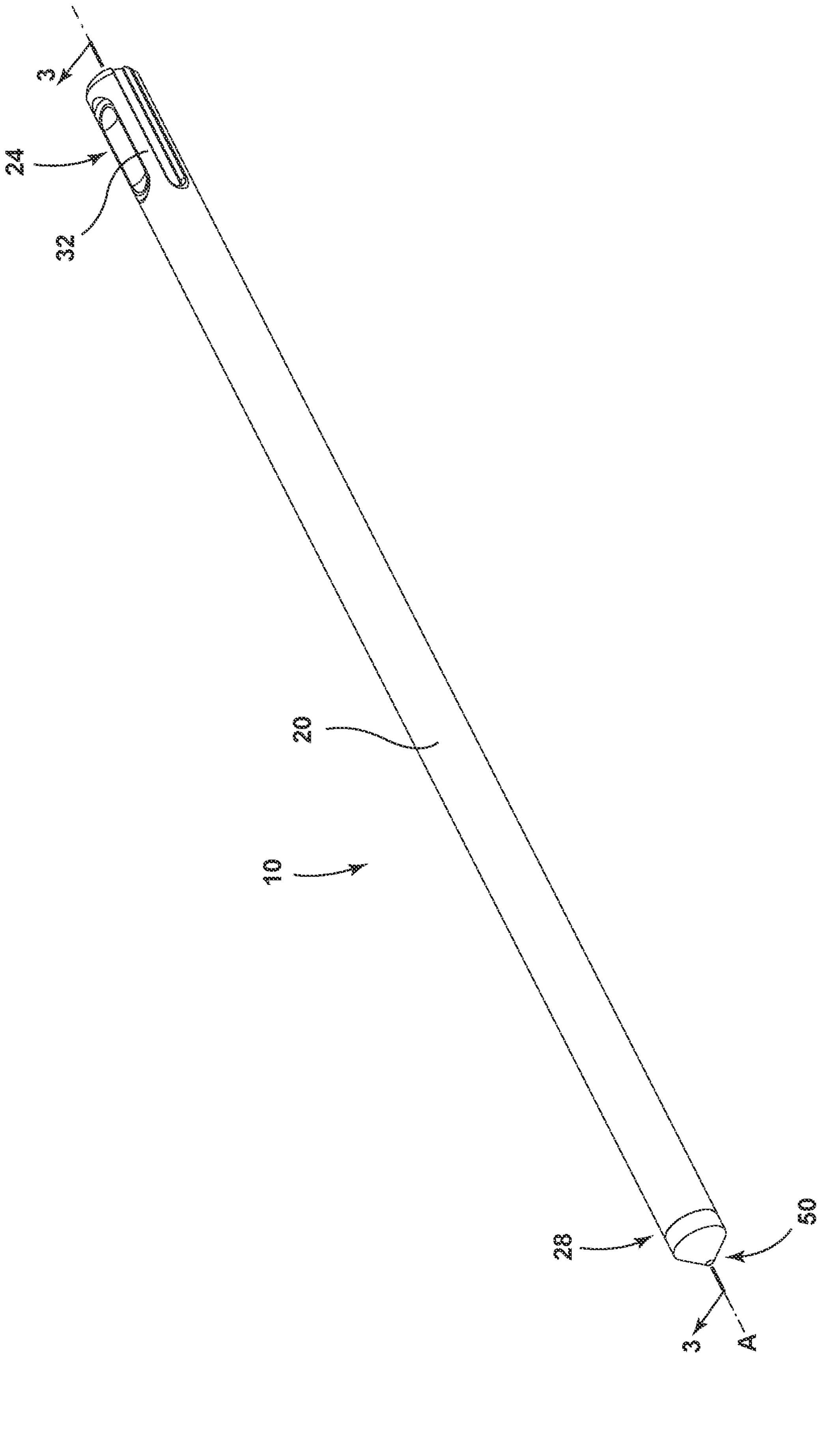
FIG. 1 is a perspective view of a chisel according to an embodiment, the chisel including a body and a head coupled to the body.
Figure 2:
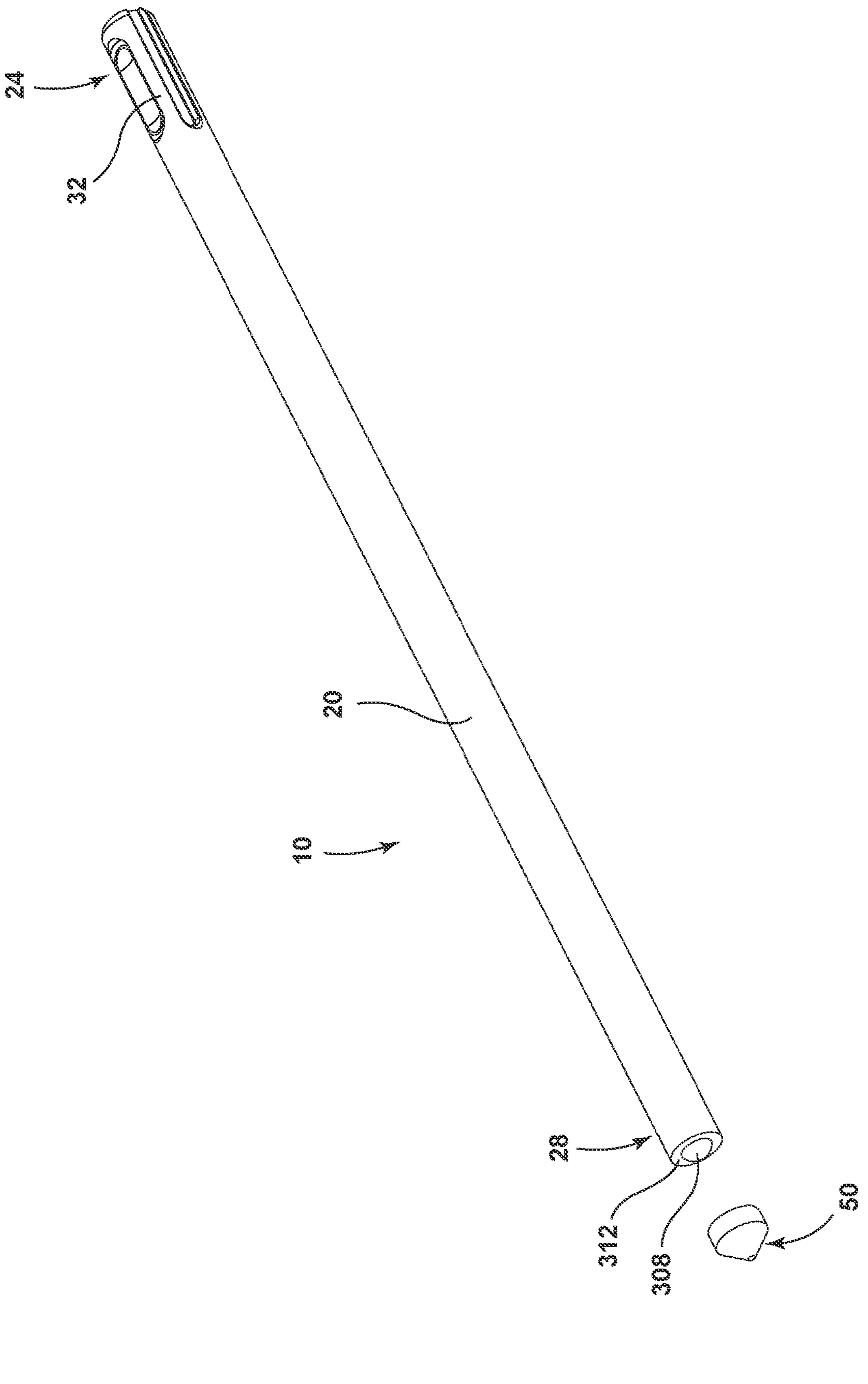
FIG. 2 is an exploded view of the chisel of FIG. 1.
Figure 3:
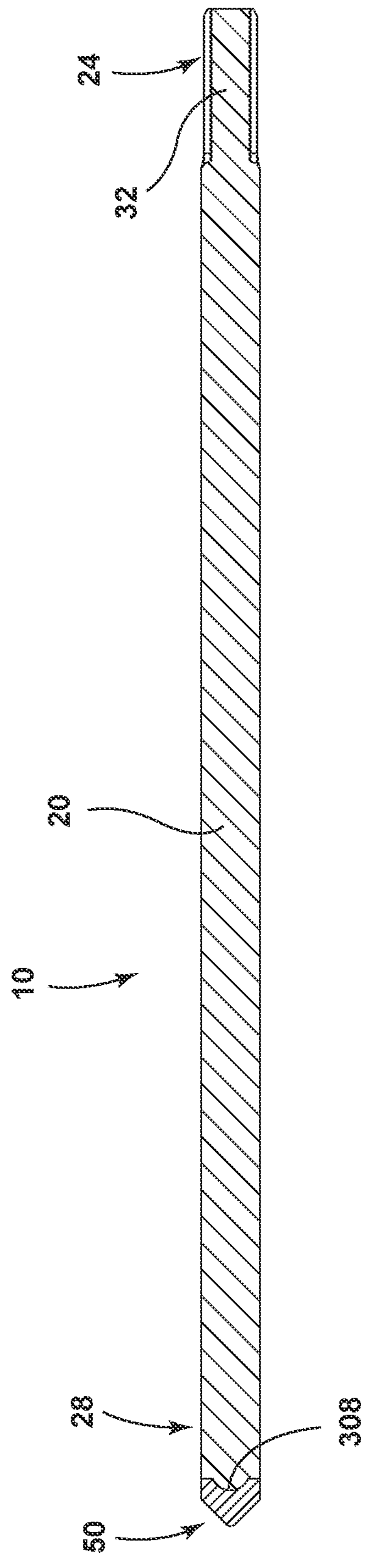
FIG. 3 is a cross-sectional view of the chisel of FIG. 1 along the line 3-3 of FIG. 1.
Figure 4:
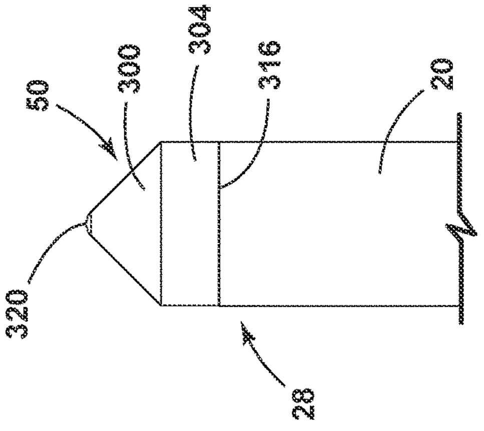
FIG. 4 is a detailed side view of the chisel of FIG. 1.
Figure 5:
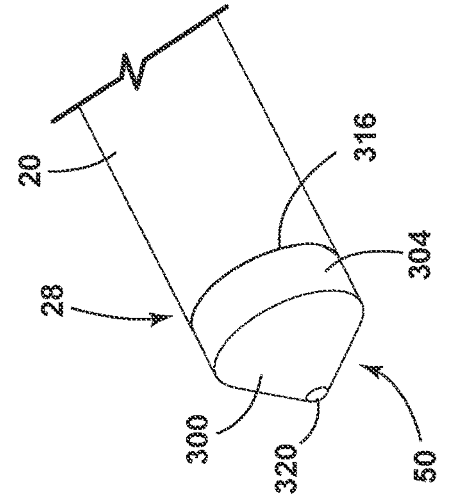
FIG. 5 is a detailed perspective view of the chisel of FIG. 1.
Figure 6:
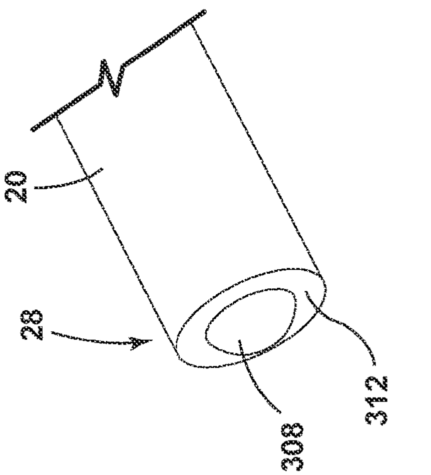
FIG. 6 is a detailed perspective view of the body of FIG. 1.
Figure 7:
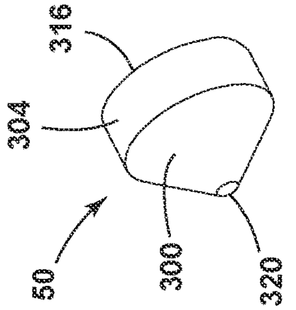
FIG. 7 is a detailed perspective view of the head of the chisel of FIG. 1.
Figure 8:
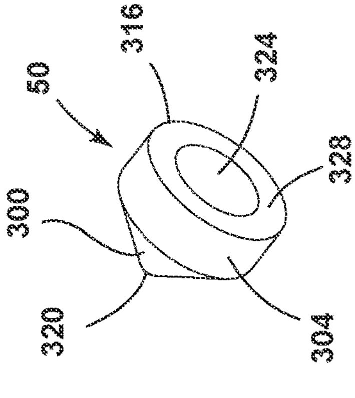
FIG. 8 is another detailed perspective view of the head of the chisel of FIG. 1.
Figure 9:
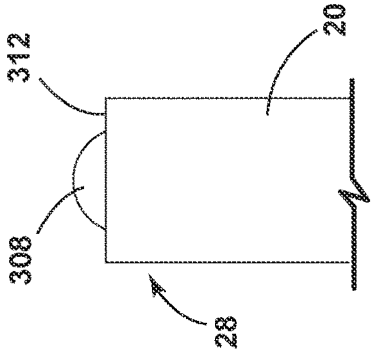
FIG. 9 is a detailed side view of the body of FIG. 1.
Figure 10:
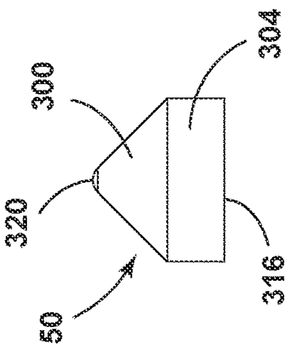
FIG. 10 is a detailed side view of the head of FIG. 1.
Figure 11:
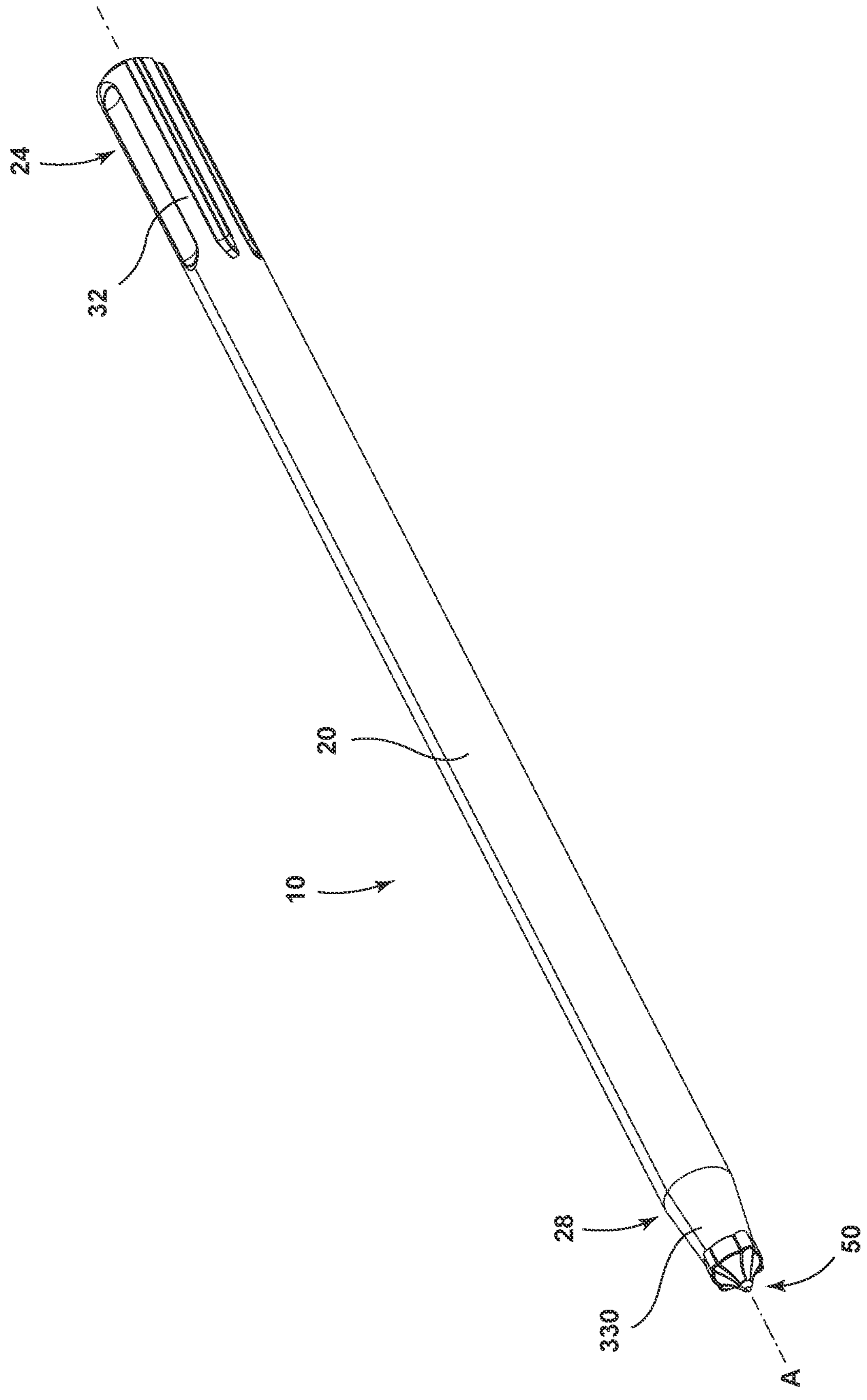
FIG. 11 is a perspective view of a chisel according to another embodiment, the chisel including a body and a head coupled to the body.
Figure 12:
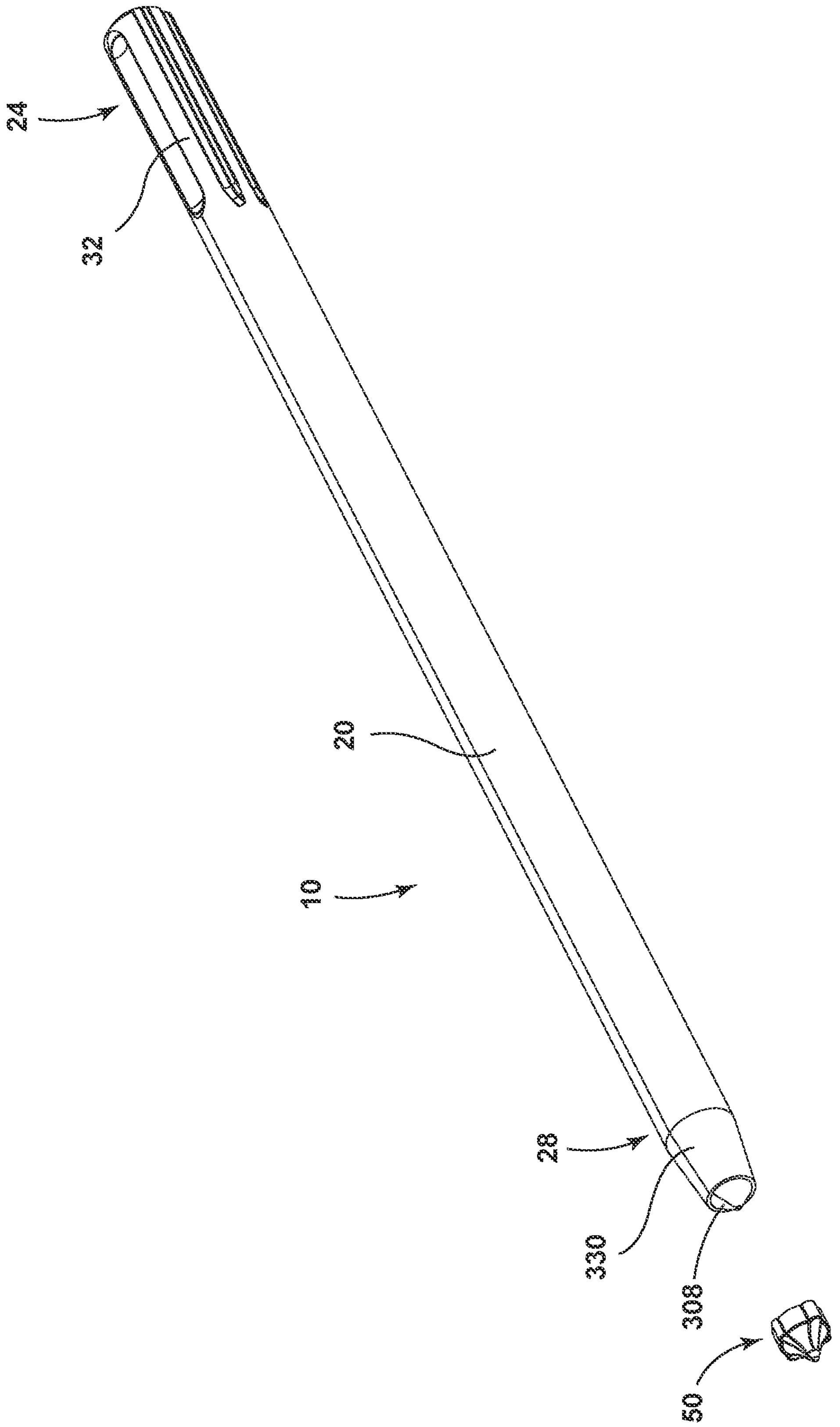
FIG. 12 is an exploded view of the chisel of FIG. 11.
Figure 14:
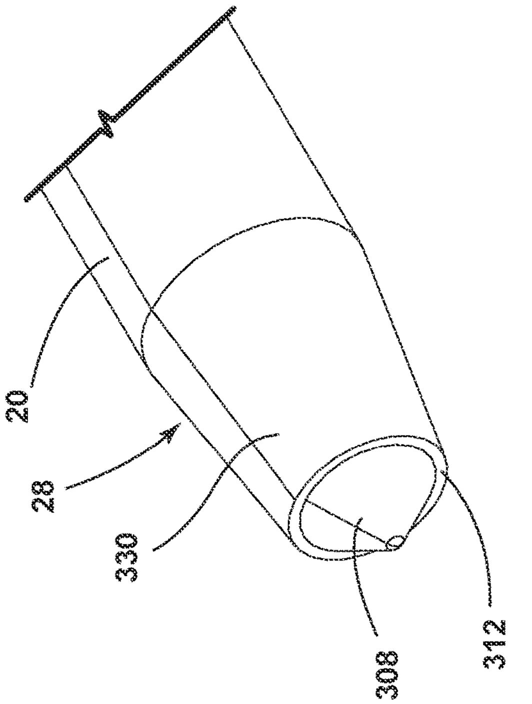
FIG. 14 is a detailed perspective view of the body of FIG. 11.

As shown in FIG. 10, the head 50 includes a first end 316 that is configured to be positioned on the body 20 and a second end 320 opposite the first end 316. The cylindrical portion 304 extends from the first end 316 towards the second end 320. The cylindrical portion 304 is coupled to the second end 28 of the body 20 and defines the continuous surface with the body 20. Therefore, the cylindrical portion 304 defines a mating surface that is complementary to the mating surface of the second end 28 of the body 20. The mating surface of the head 50 defines a recess 324 that extends into the cylindrical portion 304 from the first end 316. The recess 324 is complementary to the protrusion 308. A flat surface 328 is defined between the recess 324 and an edge of the cylindrical portion 304. Therefore, the illustrated recess 324 is substantially semi-spherical and includes substantially the same diameter and circumference as the protrusion 308. In other embodiments, the protrusion 308 and the recess 324 may have other complementary shapes (e.g., conular (see below), cuboidal, pyramidal, etc.). Additionally, the illustrated cylindrical portion 304 includes the same diameter and circumference as the body 20. The conular portion 300 extends from the cylindrical portion 304 to the second end 320. The conular portion 300 defines an angled surface the extends from the cylindrical portion 304. In the illustrated embodiment, a height of the cylindrical portion 304 is smaller than a height of the conular portion 300. In other embodiments, the height of the cylindrical portion 304 may be the same as or larger than the height of the conular portion 300.

The embodiment of FIGS. 11-16 is similar to the embodiment of FIGS. 1-10, but the second end 28 and the protrusion 308 have different configurations and the head 50 has a different configuration. As shown, the second end 320 has a conular portion 330 that narrows from a location between the first end 24 and the second 28 towards the second end 28. Also, the protrusion 308 is substantially conular, rather than semi-spherical, in the illustrated embodiment of FIGS. 11-16. The protrusion 308 defines a diameter and circumference that are smaller than the diameter and circumference of the body 20. Accordingly, the flat, planar surface 312 is still defined between the protrusion 308 and an edge of the body 20 and is annular, but the planar surface 312 is smaller in the embodiment of FIGS. 11-16 than the embodiment of FIGS. 1-10.

Figure 16:
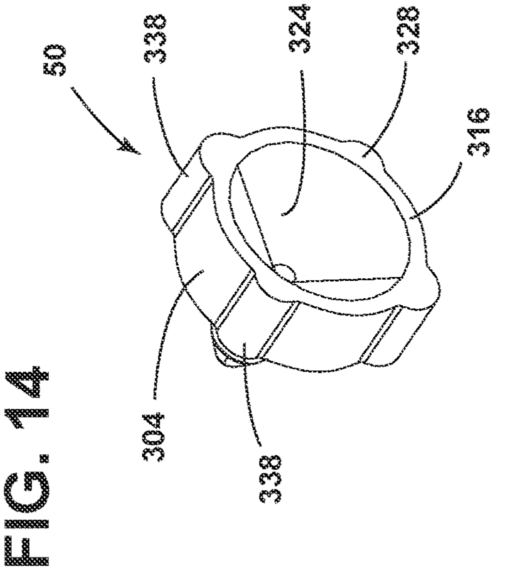
FIG. 16 is another perspective view of the head of FIG. 11.
Figure 13:
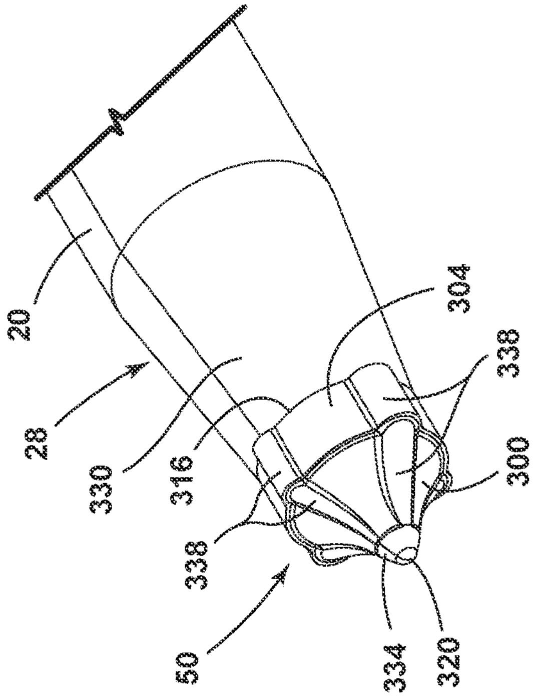
FIG. 13 is a detailed perspective view of the chisel of FIG. 11.
Figure 15:
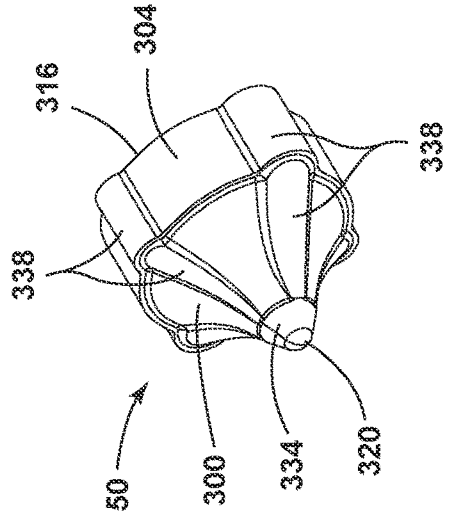
FIG. 15 is a perspective view of the head of FIG. 11.

As shown in FIGS. 15 and 16, the cylindrical portion 304 defines a mating surface that is complementary to the mating surface of the second end 28 of the body 20. The mating surface of the head 50 includes a recess 324 that extends into the cylindrical portion 304 from the first end 316. The recess 324 is complementary to the protrusion 308. A flat surface 328 is defined between the recess 324 and an edge of the cylindrical portion 304. Therefore, the illustrated recess 324 is substantially conular and includes substantially the same diameter and circumference as the protrusion 308. In other embodiments, the protrusion 308 and the recess 324 may have other complementary shapes (e.g., cuboidal, pyramidal, etc.). In the illustrated embodiment of FIGS. 11-16, the cylindrical portion 304 includes a larger diameter than a circumference as the body 20. The conular portion 300 defines an angled surface the extends from the cylindrical portion 304. Rather than being linear, as in FIGS. 1-10, the angled surface is curved or arcuate in FIGS. 11-16. Additionally, a tip 334 of the conular portion 300 defines an angled surface that is different than the angled surface of the rest of the conular portion 300. As shown, a plurality of ribs 338 extend from a location adjacent the second end 320 (e.g., a location adjacent the tip 334) to the first end 316. Each of the ribs 338 extends outwardly from the angled surface of the conular portion 300 and an outer surface of the cylindrical portion 304. The ribs 338 get gradually wider and thicker in a direction from the location adjacent the second end 320 to the first end 316. In the illustrated there are four ribs 338 that are spaced equally relative to one another but in other embodiments, there may be more or fewer ribs 338 that may have equal or unequal spacing relative to one another.

In another embodiment, shown in FIGS. 17-27, the body 20 includes a tapered portion 350 extending from a location between the first end 24 and the second end 28 towards the second end 28 and a chamfered or angled surface 354 extending from the tapered portion 350 to the second end 28. In the illustrated embodiment, the tapered portion 350 and the chamfered edge 354 are annular surfaces. Additionally, with respect to FIGS. 18, 19, 22, and 23, the body 20 includes a bore 358 extending from the second end 28 towards the first end 24 along the axis A. The bore 358 includes a first portion 362 that has a first diameter and a second portion 366 that has a second diameter that is larger than the first diameter. A lip 370 is defined between the first portion 362 and the second portion 366 of the bore 358. As shown, the head 50 is configured to be positioned in the bore 358. To this end, the head 50 includes a first end 374 configured to be positioned in the bore 358 and a second end 378 opposite the first end 374. The cylindrical portion 304 extends from the first end 374 towards the second end 378. A cylindrical projection 382 extends from the first end 374 (e.g., the cylindrical portion 304) in a direction opposite the second end 378 and has a diameter that is smaller than a diameter of the cylindrical portion 304. The projection 382 is configured to be received in the first portion 362 of the bore 358, while the cylindrical portion 304 is configured to be received in the second portion 366 of the bore 358. Accordingly, the diameter of the projection 382 is smaller than a diameter of the first portion 362 of the bore 358, and the diameter of the cylindrical portion 304 is smaller than a diameter of the second portion 366 of the bore 358. The first end 374 abuts the lip 370 of the bore 358. In the illustrated embodiment, the cylindrical portion 304 extends from the second end 28 of the body 20, such that the cylindrical portion 304 of the head 50 defines the continuous surface with the body 20 (i.e., the chamfered edge 354 of the body 20). The conular portion 300 extends from the cylindrical portion 304 to the second end 378. The conular portion 300 defines an angled surface that extends from the cylindrical portion 304. In other embodiments, the cylindrical portion 304 may be entirely positioned within the second portion 366 of the bore 358 such that an edge of the conular portion 300 may be positioned adjacent to the second end 28 of the body 20 (e.g., the chamfered edge 354) thereby defining the continuous edge of the body 20.

With reference to FIGS. 28-74, the head 50 is an X-shaped head 50 that is coupled to the second end 28 of the body 20.

Figure 50:
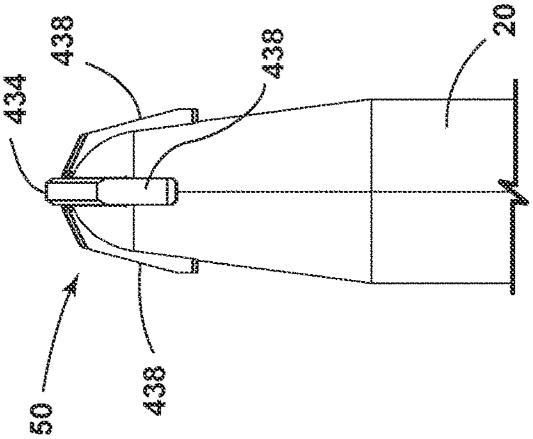
FIG. 50 is a detailed side view of the chisel of FIG. 47.
Figure 51:
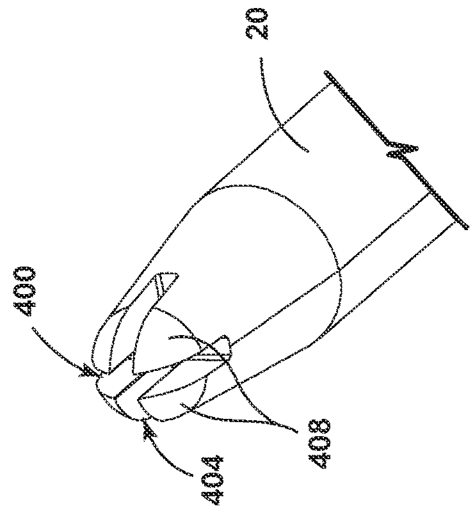
FIG. 51 is a detailed perspective view of the body of FIG. 47.
Figure 52:
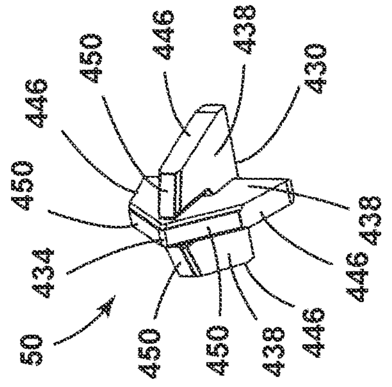
FIG. 52 is a perspective view of the head of FIG. 47.
Figure 53:
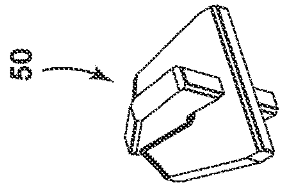
FIG. 53 is another perspective view of the head of FIG. 47.
Figure 54:
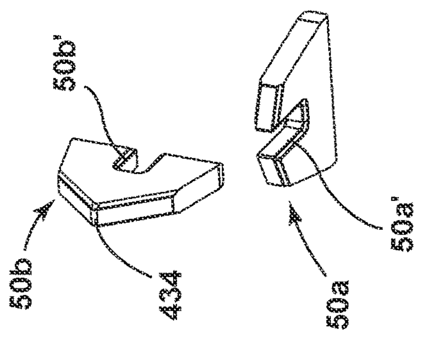
FIG. 54 is an exploded view of the head of FIG. 47.
Figure 55:
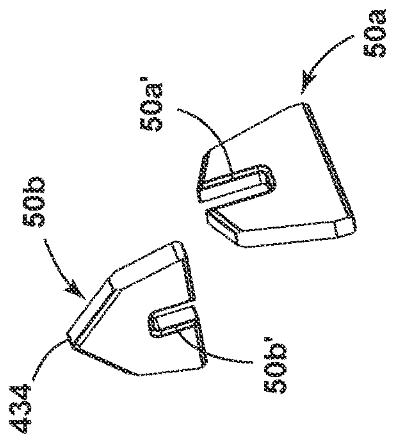
FIG. 55 is another exploded view of the head of FIG. 47.
Figure 56:
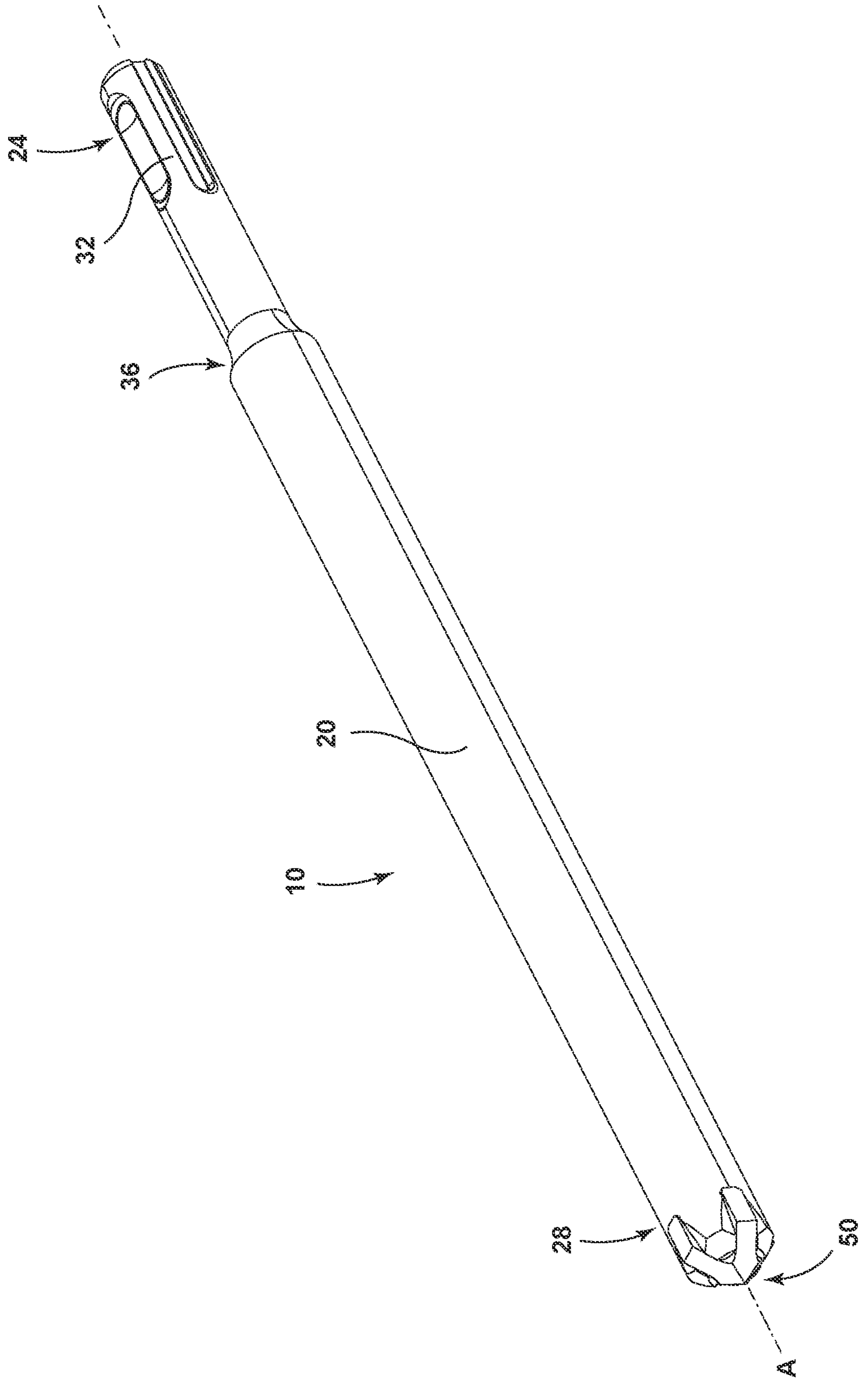
FIG. 56 is a perspective view of a chisel according to another embodiment, the chisel including a body and a head coupled to the body.
Figure 57:
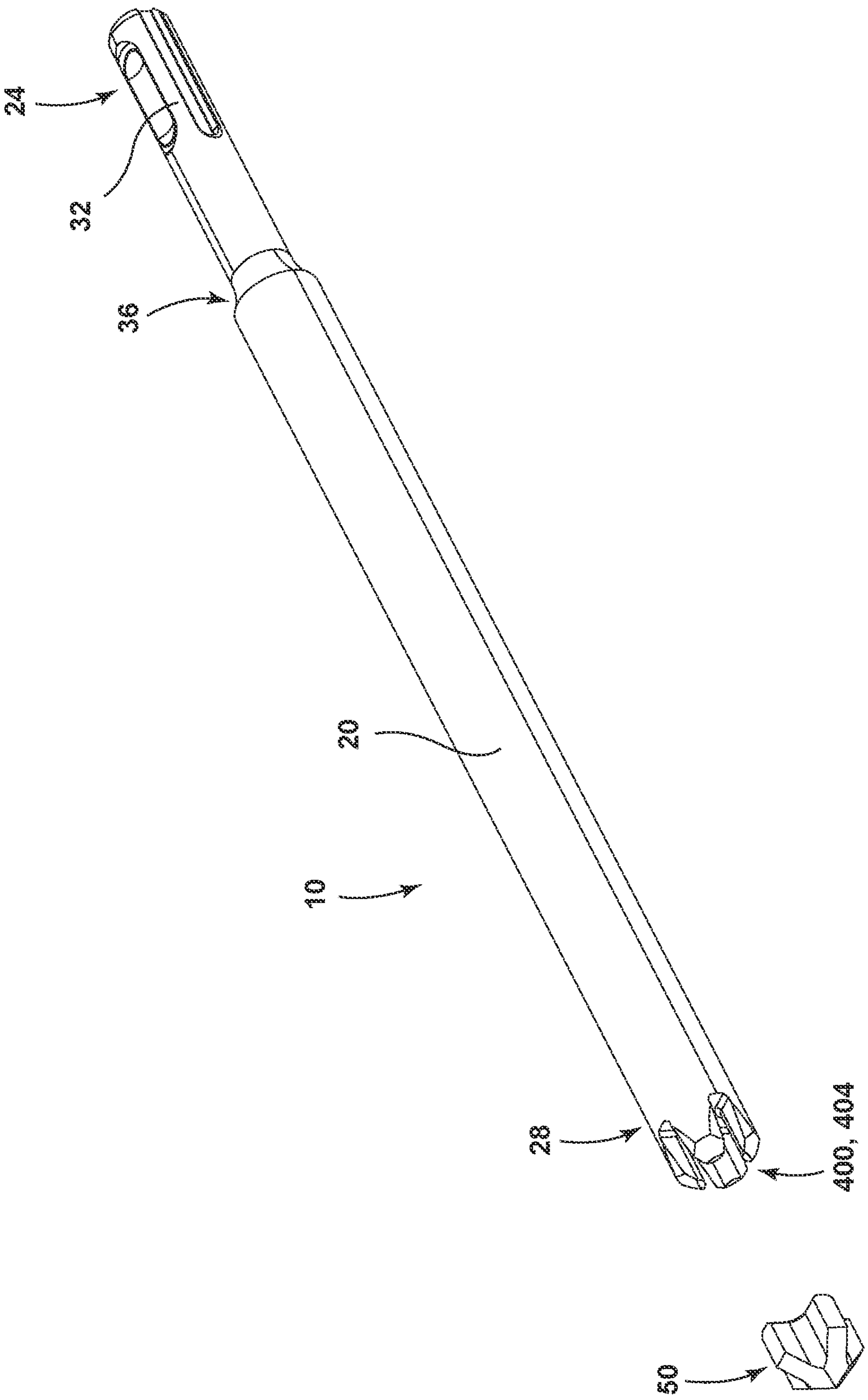
FIG. 57 is an exploded view of the chisel of FIG. 56.
Figure 58:
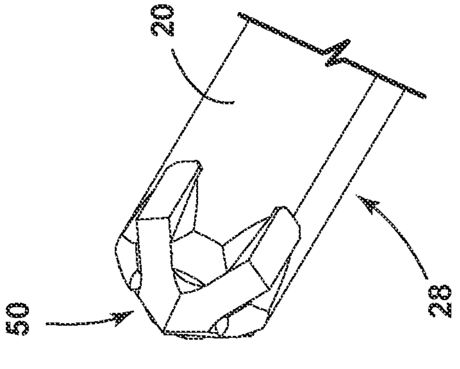
FIG. 58 is a detailed perspective view of the chisel of FIG. 56.
Figure 59:
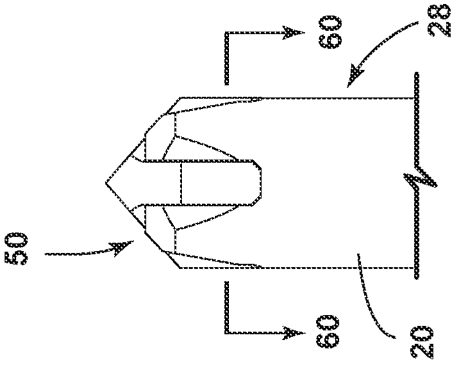
FIG. 59 is a detailed side view of the chisel of FIG. 56.
Figure 60:
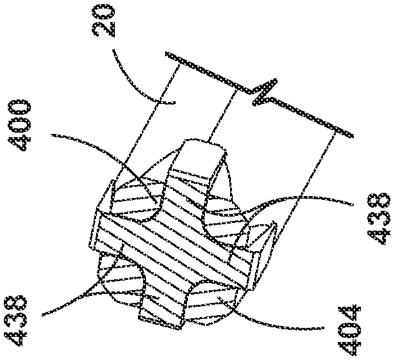
FIG. 60 is a cross-sectional view of the chisel of FIG. 56 along the line 60-60 of FIG. 59.
Figure 61:
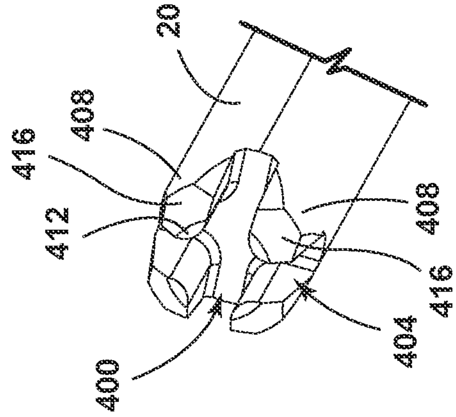
FIG. 61 is a detailed perspective view of the body of FIG. 56.
Figure 62:
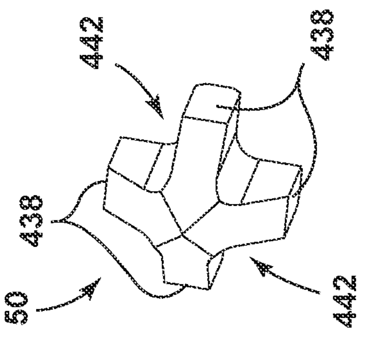
FIG. 62 is a detailed perspective view of the head of the chisel of FIG. 56.
Figure 63:
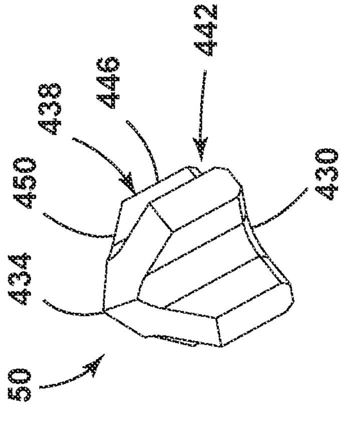
FIG. 63 is another detailed perspective view of the head of the chisel of FIG. 56.
Figure 64:
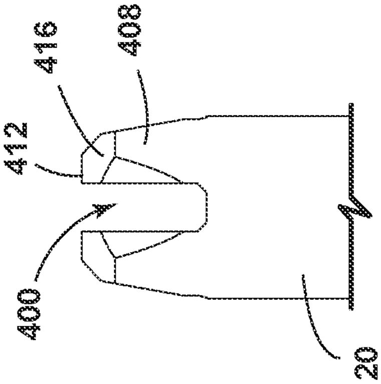
FIG. 64 is a detailed side view of the body of FIG. 56.
Figure 65:
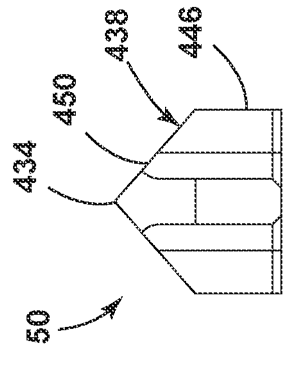
FIG. 65 is a detailed side view of the head of FIG. 56.
Figure 66:
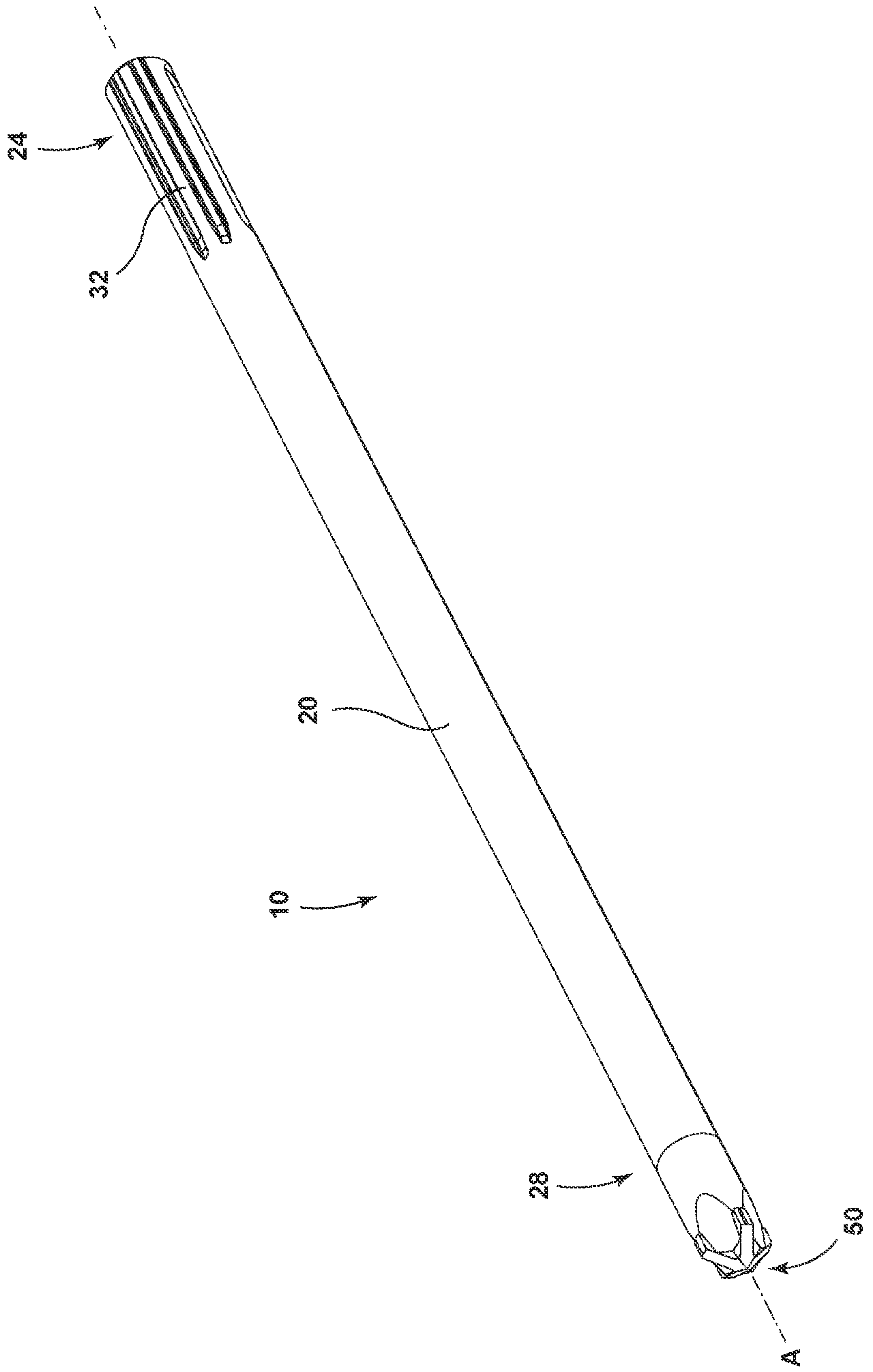
FIG. 66 is a perspective view of chisel according to another embodiment, the chisel including a body and a head coupled to the body.
Figure 67:
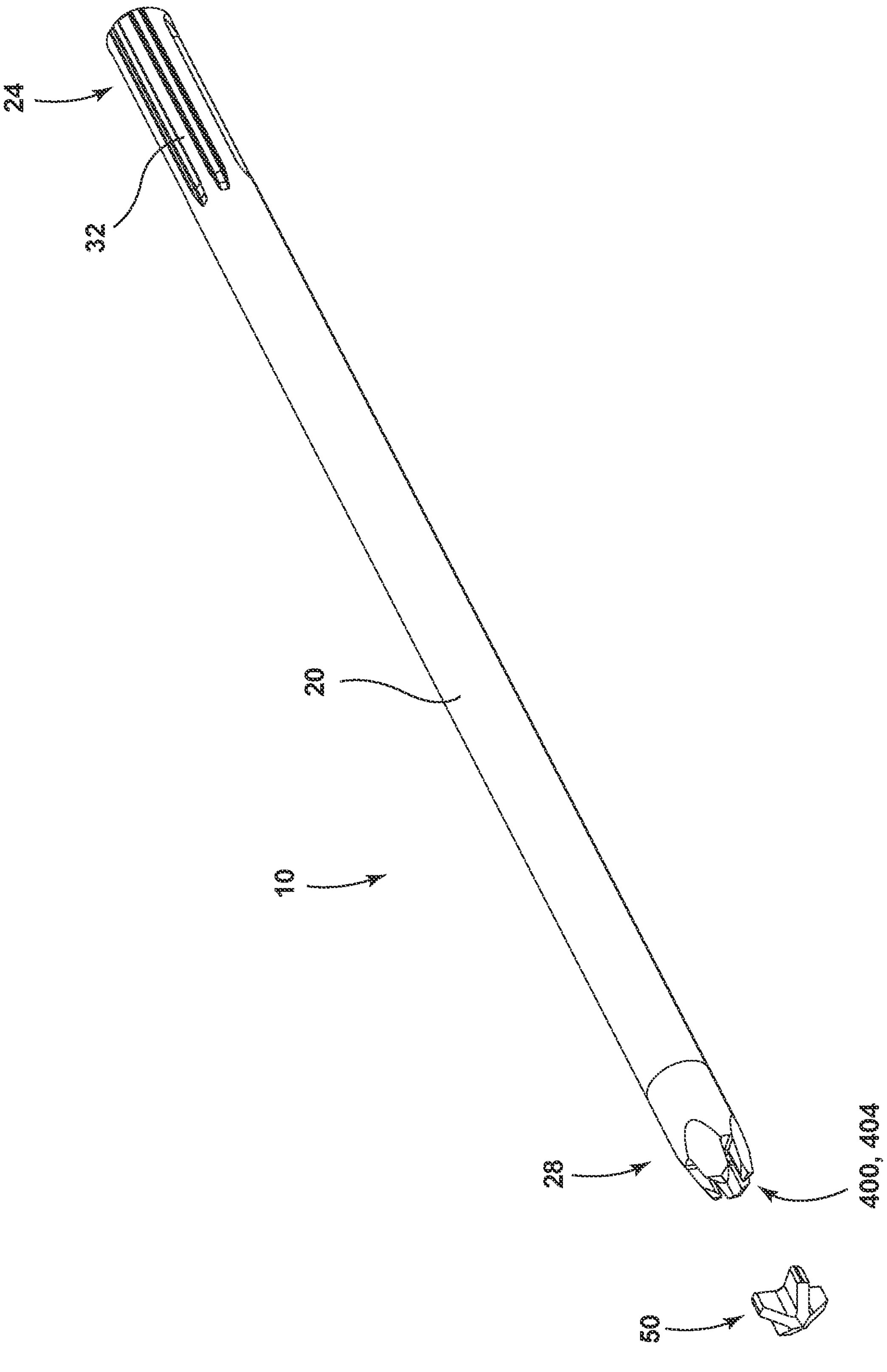
FIG. 67 is an exploded view of the chisel of FIG. 66.
Figure 68:
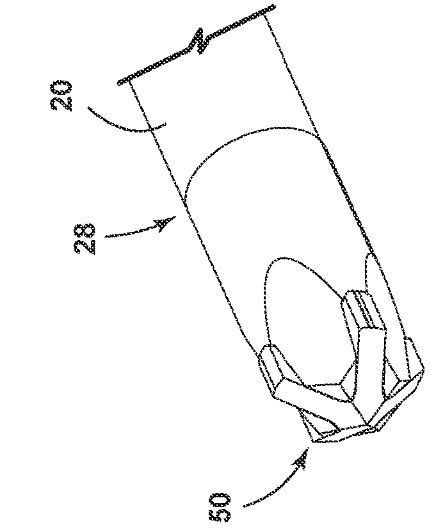
FIG. 68 is a detailed perspective view of the chisel of FIG. 66.
Figure 69:
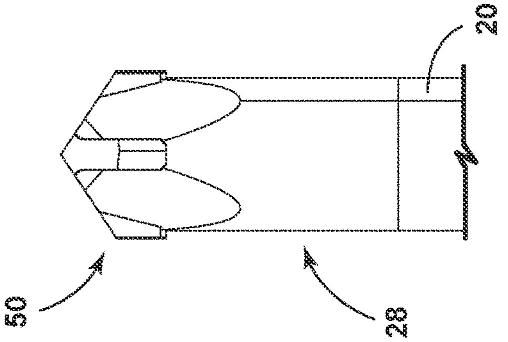
FIG. 69 is a detailed side view of the chisel of FIG. 66.
Figure 70:
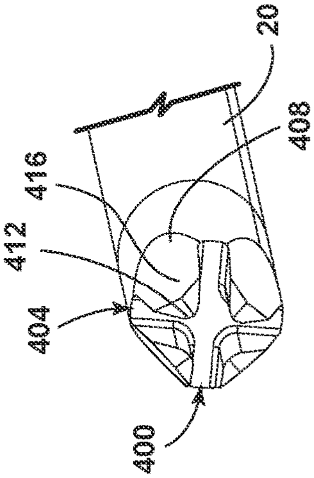
FIG. 70 is a detailed perspective view of the body of FIG. 66.
Figure 71:
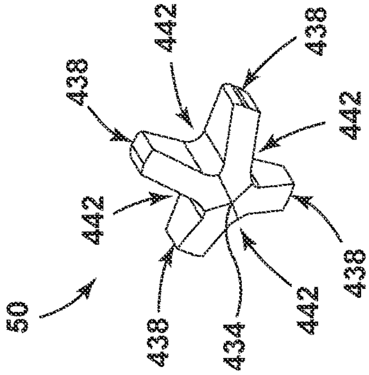
FIG. 71 is a detailed perspective view of the head of the chisel of FIG. 66.
Figure 72:
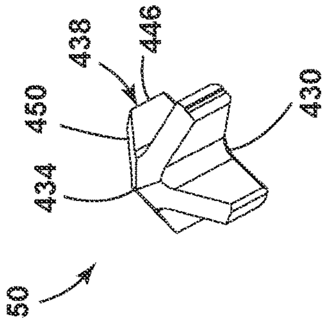
FIG. 72 is another detailed perspective view of the head of the chisel of FIG. 66.
Figure 73:
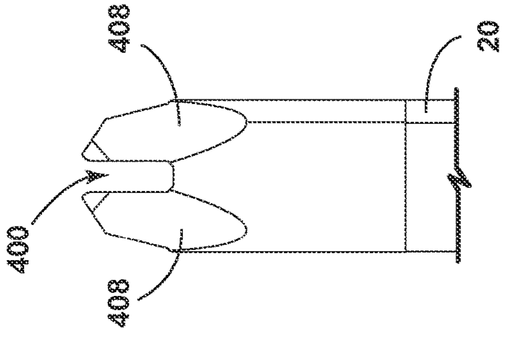
FIG. 73 is a detailed side view of the body of FIG. 66.
Figure 74:
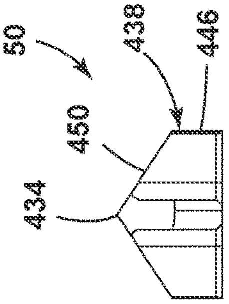
FIG. 74 is a detailed side view of the head of FIG. 66.
Figure 75:
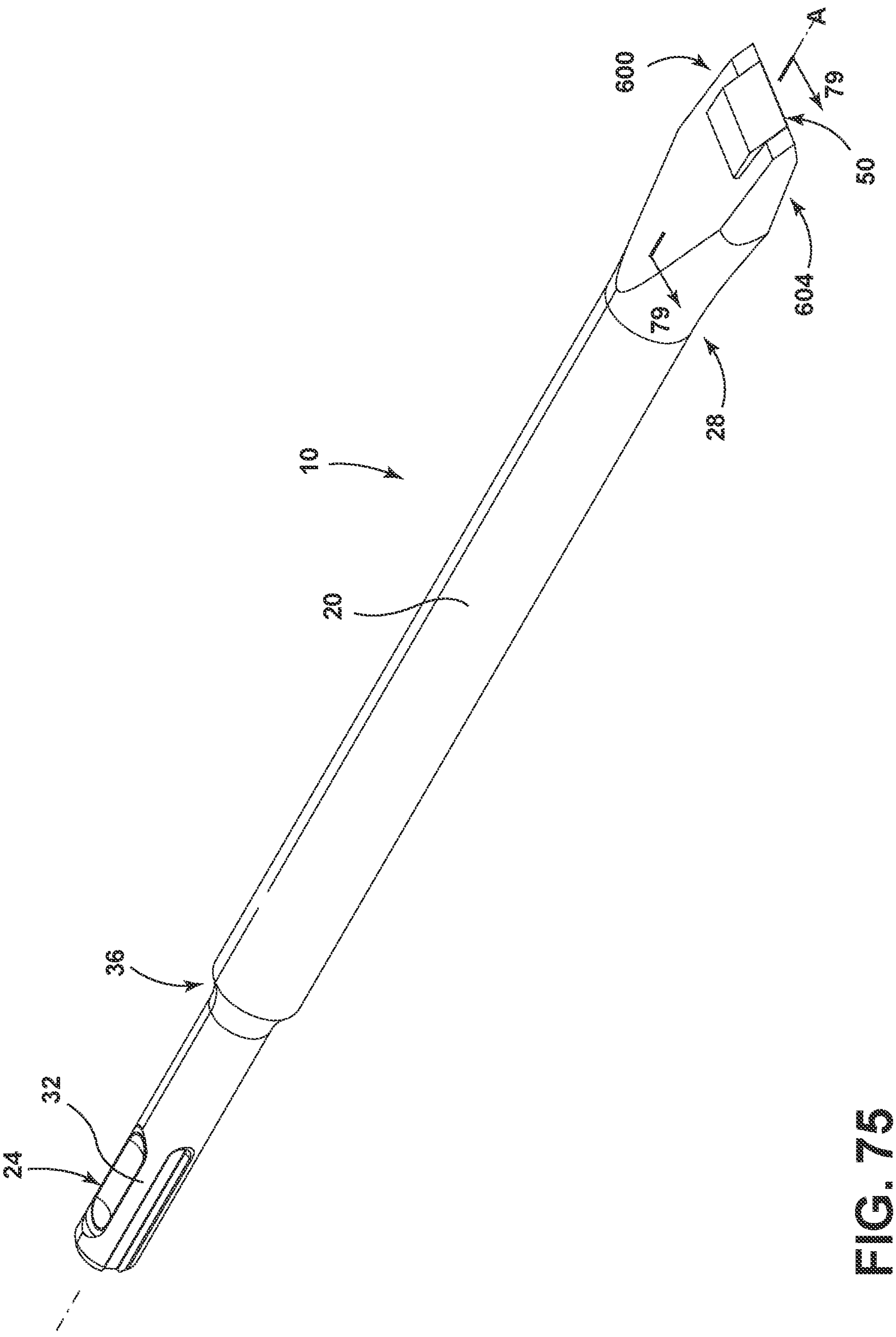
FIG. 75 is a perspective view of a chisel according to another embodiment, the chisel including a body and a head coupled to the body.
Figure 76:
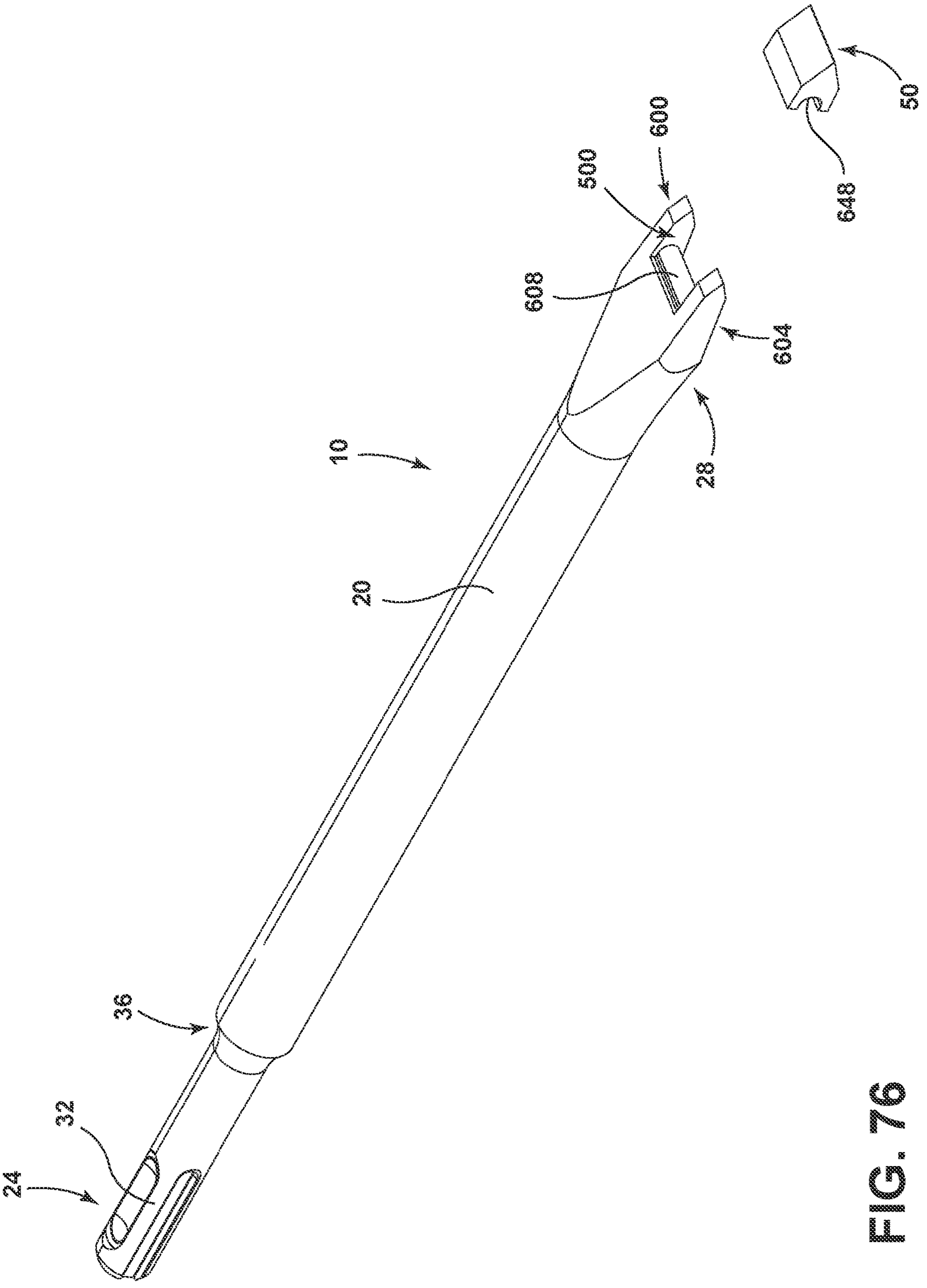
FIG. 76 is an exploded view of the chisel of FIG. 75.
Figure 77:
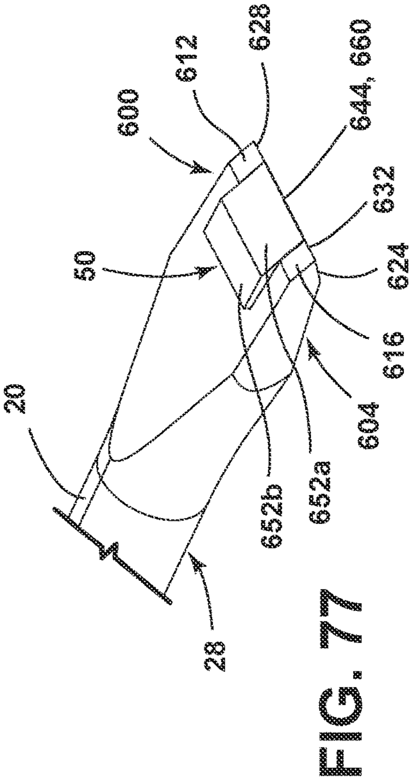
FIG. 77 is a detailed perspective view of the chisel of FIG. 75.

As shown in FIGS. 33, 43, 50, 61, and 70 at the second end 28, the body 20 includes a first channel 400 and a second channel 404 that intersects the first channel 400. The first and second channels 400, 404 are oriented at a perpendicular angle relative to one another. In other embodiments, the first and second channels 400, 404 may be oriented near perpendicular to one another. In still other embodiments, the first and second channels 400, 404 may be non-perpendicular to one another. The second end 28 further includes a plurality of prongs 408, which are defined between respective portions of the first and second channels 400, 404. In some embodiments, such as FIGS. 33, 61, and 70, each of the prongs 408 defines a substantially flat surface 412 positioned at the second end 28 and an angled surface 416 extending from the flat surface 412 toward the first end 24. The angled surface 416 extends from the flat surface 412 at an oblique angle. The prongs 408 may have other configurations. For example, the prongs 408 may have two angled surface 416 (FIG. 43-44) or they may have a curved outer surface (FIGS. 50 and 51).

As shown in FIGS. 34-35, 37, 45-46, 51-54, 62-63, 65, 71-72, and 74, the X-shaped head 50 includes a first end 430, a second end 434 opposite the first end 430, a plurality of legs 438 coupled to one another, and a plurality of gaps or spaces 442, one of the gaps 442 positioned between each pair of adjacent legs 438. The legs 438 collectively define an X-shape, or cross-shape, at the first end 430. Each of the legs 438 includes a first peripheral surface 446 extending from a first end 430 towards the second end 434 and a second peripheral surface 450 extending from the first peripheral surface 446 to the second end 434. The second peripheral surface 450 of each of the legs 438 is positioned at an oblique angle relative to the respective first peripheral surface 446. Additionally, in some embodiments, the second peripheral surfaces 450 of each of the legs 438 intersect at the second end 434 to define a substantially pointed second end 434, as shown in FIGS. 37, 45, 65, 74. In some embodiments, the substantially pointed end may be slightly rounded, while in some embodiments, the pointed end may not be slightly rounded. Regardless, in these embodiments, at least a portion of each of the plurality of legs 438 (e.g., the second peripheral surfaces 450 of the legs 438) collectively define the working edge of the chisel 10. As shown in FIGS. 37, 45, 65, 74, the head may be integrally formed as one piece.

The head 50 may have other configurations. For example, with respect to FIGS. 53-55, the head 50 may be constructed from two connected pieces 50*a*, 50*b*. That is, a first piece may include a body that has two legs 438 and a slot 50*a*', and the second piece 50*b* may include two legs 438 and a slot 50*b*'. As shown, the slot 50*a*' of the first piece 50*a* is configured to receive the slot 50*b*' of the second piece 50*b*. Accordingly, the legs 438 of the first piece 50*a* are spaced apart from and below the legs 438 of the second piece 50*b*. As a result, the first piece 50*a* defines the first end 430, while the second piece 50*b* defines the second end 434. Moreover, in this embodiment, the second peripheral surfaces 450 of only two of the legs 438 (of the second piece 50*b*) intersect at the second end 434 to define a substantially pointed second end 434, while the second peripheral surfaces 450 of the legs 438 of the second piece 50*a* are spaced apart from the pointed second end 434. Also, in this embodiment as well as the embodiment of FIGS. 45-46, the first peripheral surfaces 446 do not have the same length and the second peripheral surfaces 450 do not have the same length. For example, two of the first peripheral surfaces 446 may have a first length and two of the first peripheral surfaces 446 may have a second length that is different than the first length. Similarly, two of the second peripheral surfaces 450 may have a third length and two of the first peripheral surfaces 450 may have a fourth length that is different than the third length.

Figure 78:
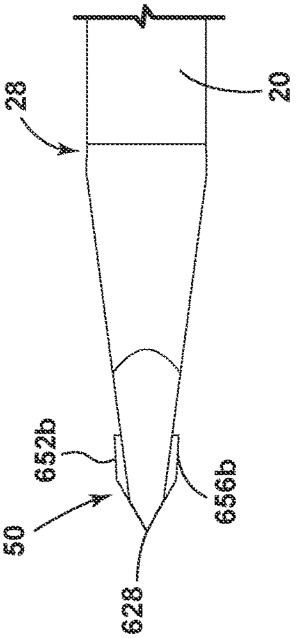
FIG. 78 is a detailed side view of the chisel of FIG. 75.
Figure 79:
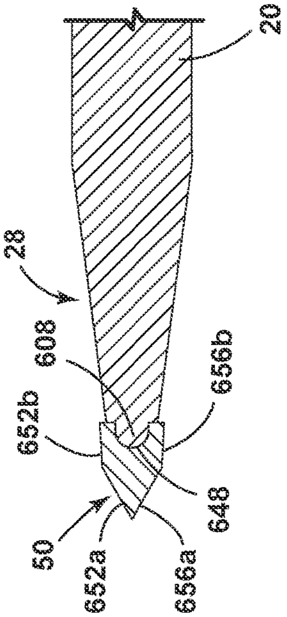
FIG. 79 is a cross-sectional side view of the chisel of FIG. 75 along the line 79-79 of FIG. 75.
Figure 80:
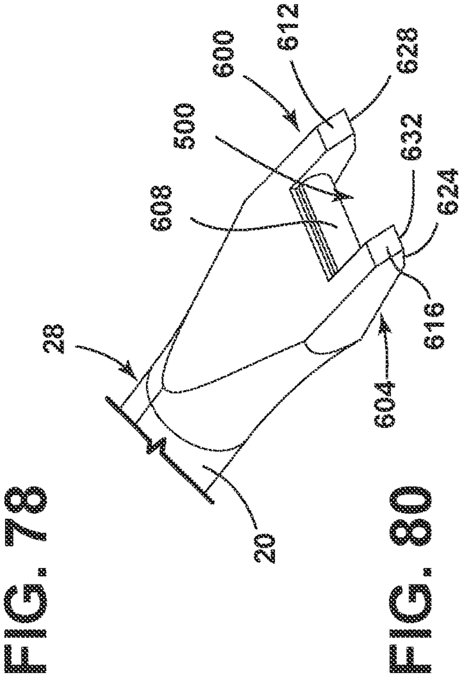
FIG. 80 is a detailed perspective view of the body of FIG. 75.
Figure 81:
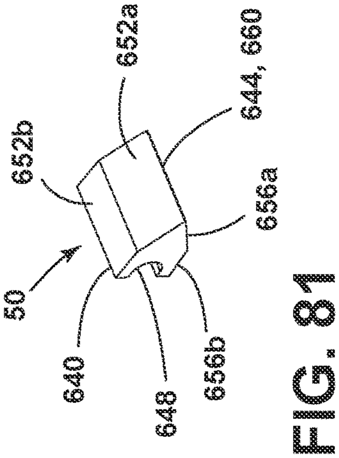
FIG. 81 is a perspective view of the head of FIG. 75.
Figure 82:
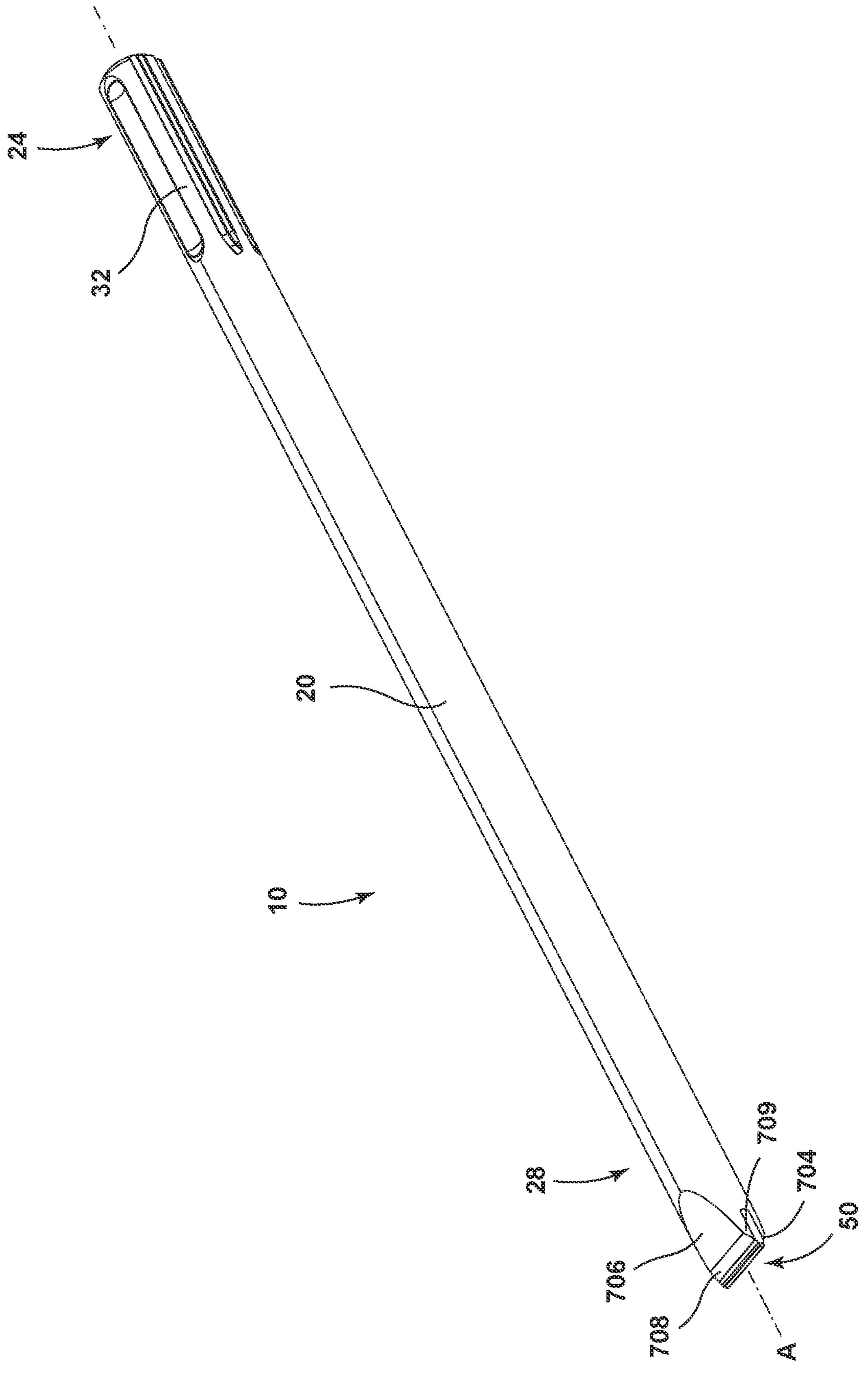
FIG. 82 is a perspective view of a chisel according to another embodiment, the chisel including a body and a head coupled to the body.
Figure 83:
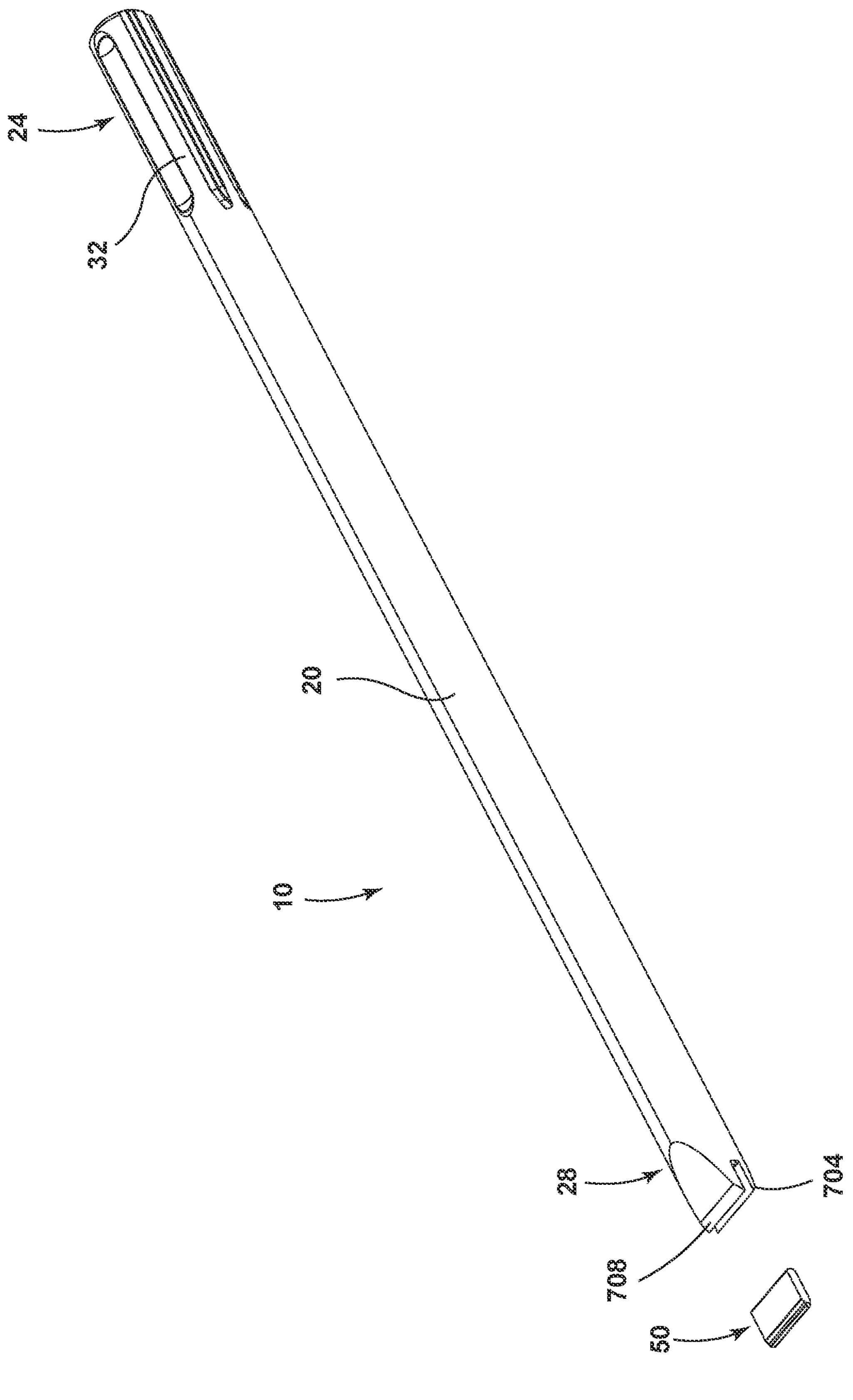
FIG. 83 is an exploded view of the chisel of FIG. 82.
Figure 85:
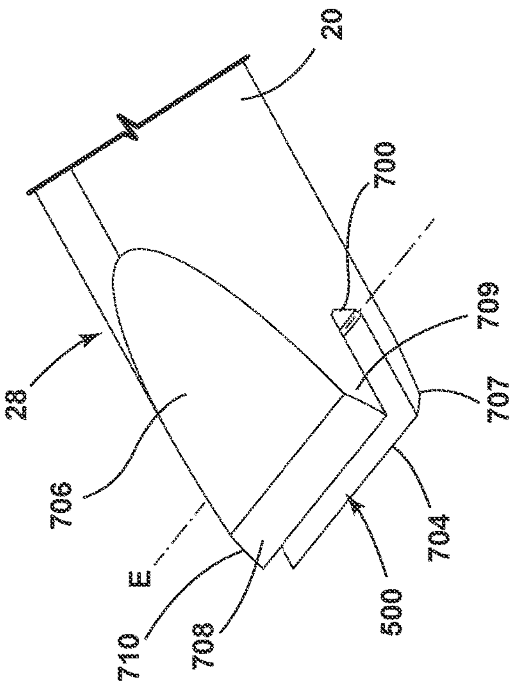
FIG. 85 is a detailed perspective view of the body of FIG. 82.
Figure 84:
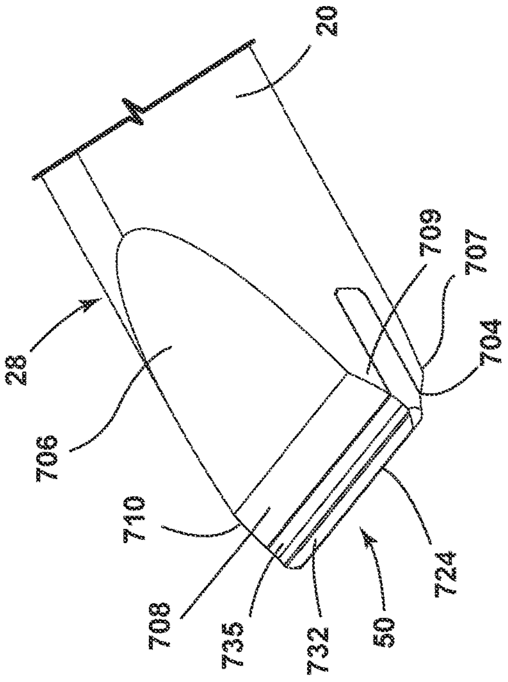
FIG. 84 is a detailed perspective view of the chisel of FIG. 82.
Figure 87:
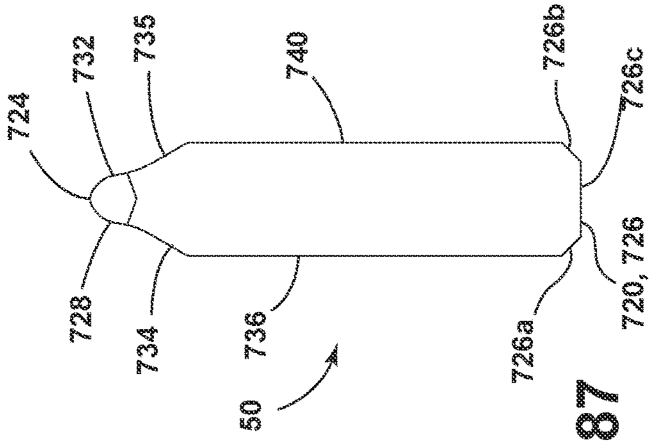
FIG. 87 is a side view of the head of FIG. 82.
Figure 86:
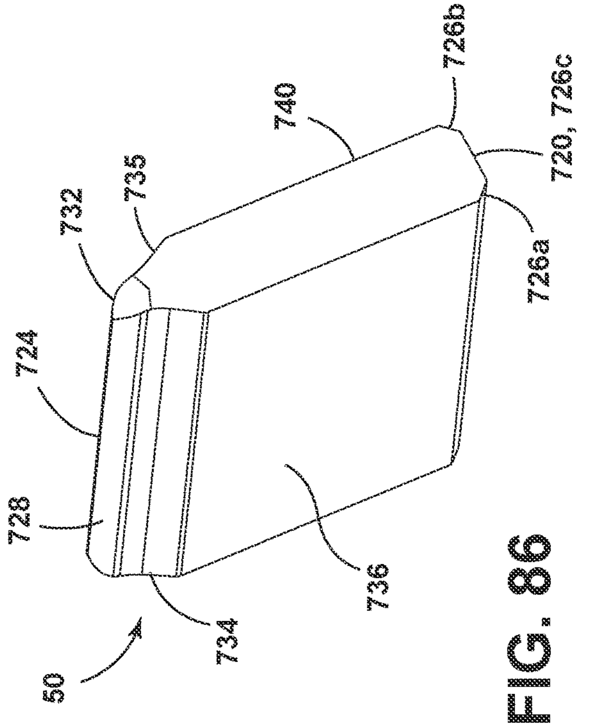
FIG. 86 is a perspective view of the head of FIG. 82.
Figure 88:
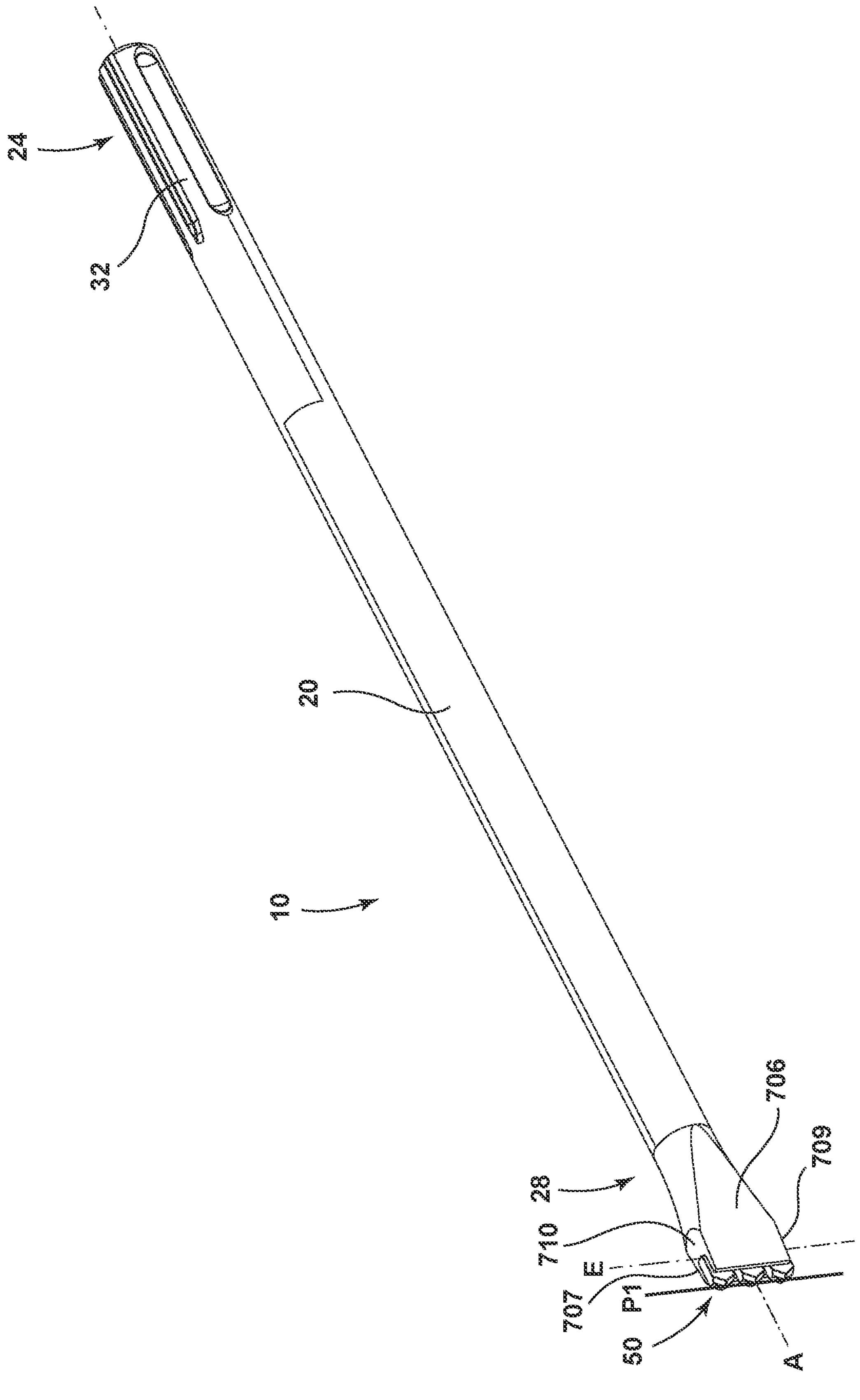
FIG. 88 is a perspective view of a chisel according to another embodiment, the chisel including a body and a head coupled to the body.
Figure 89:
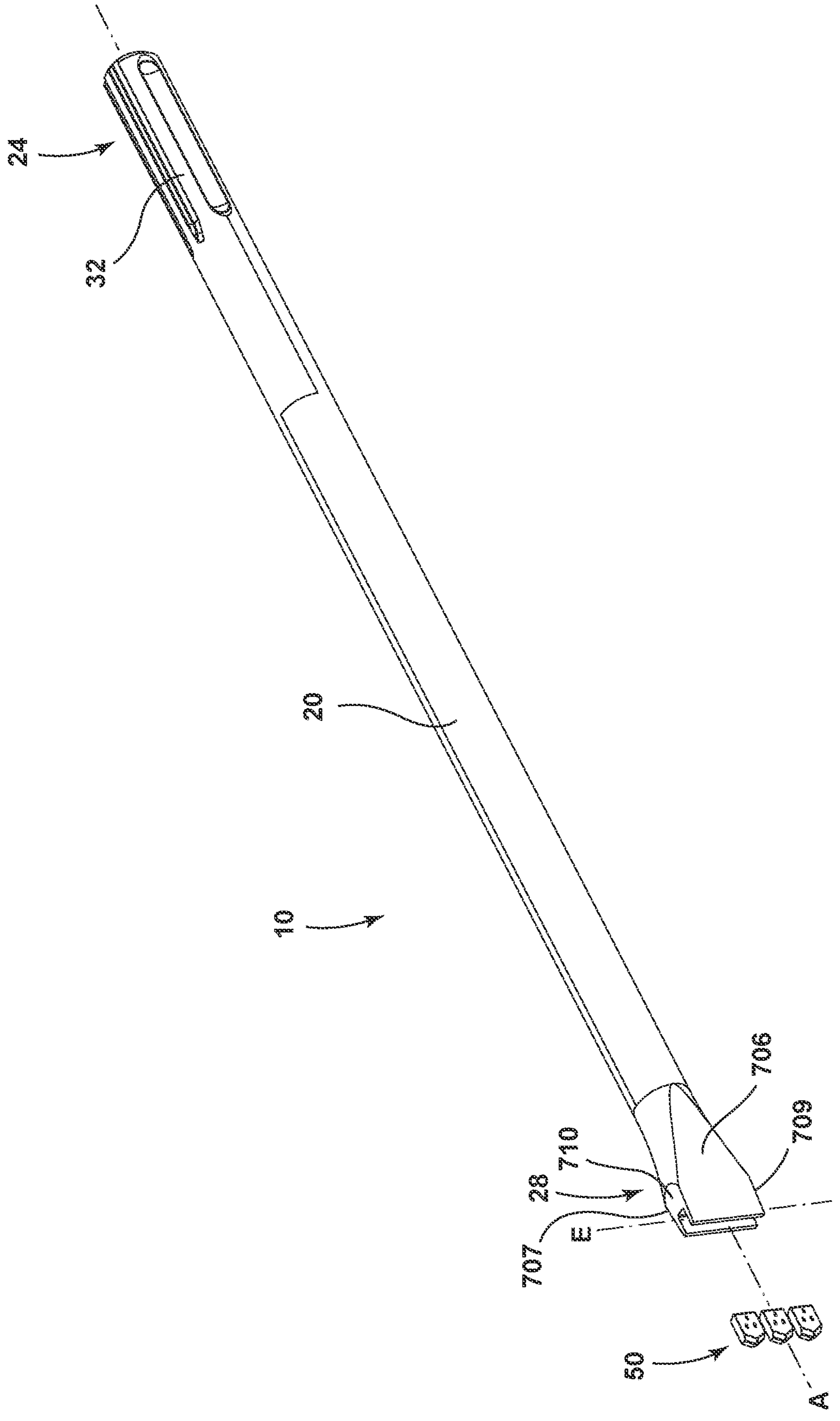
FIG. 89 is an exploded view of the chisel of FIG. 88.
Figure 90:
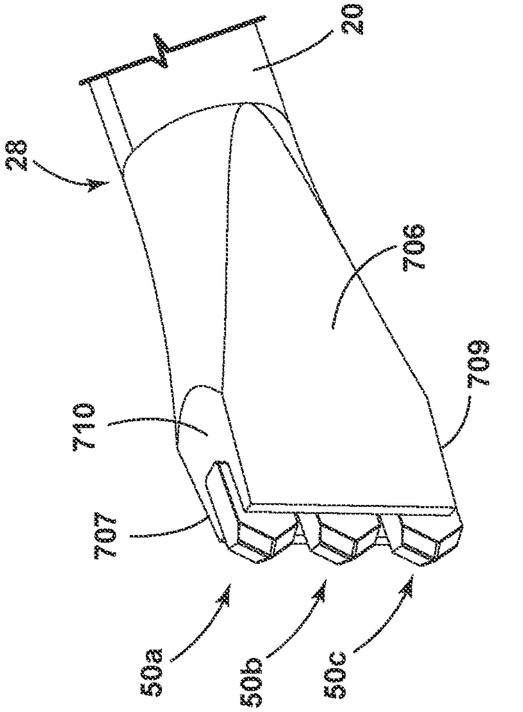
FIG. 90 is a detailed perspective view of the chisel of FIG. 88.
Figure 91:
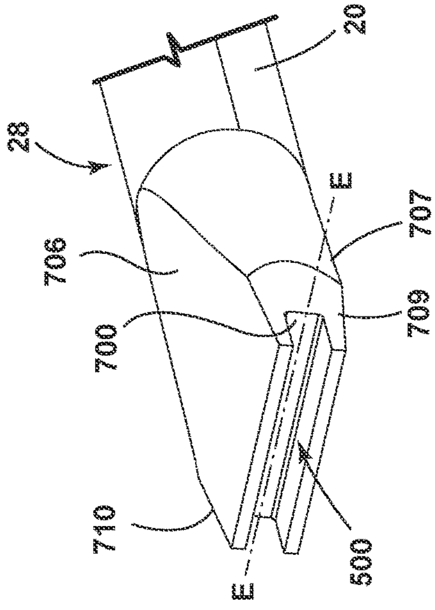
FIG. 91 is a detailed perspective view of the body of FIG. 88.
Figure 92:
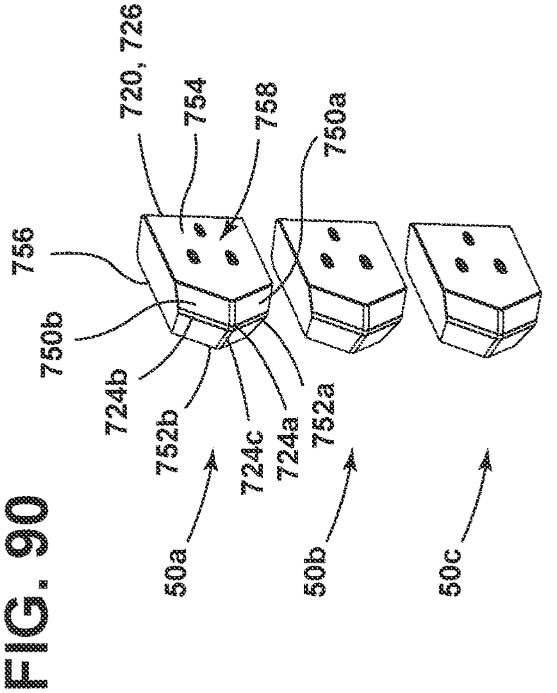
FIG. 92 is a perspective view of the head of FIG. 88.
Figure 93:
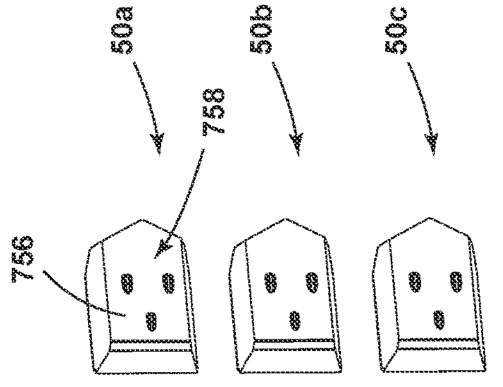
FIG. 93 is another perspective view of the head of FIG. 88.
Figure 94:
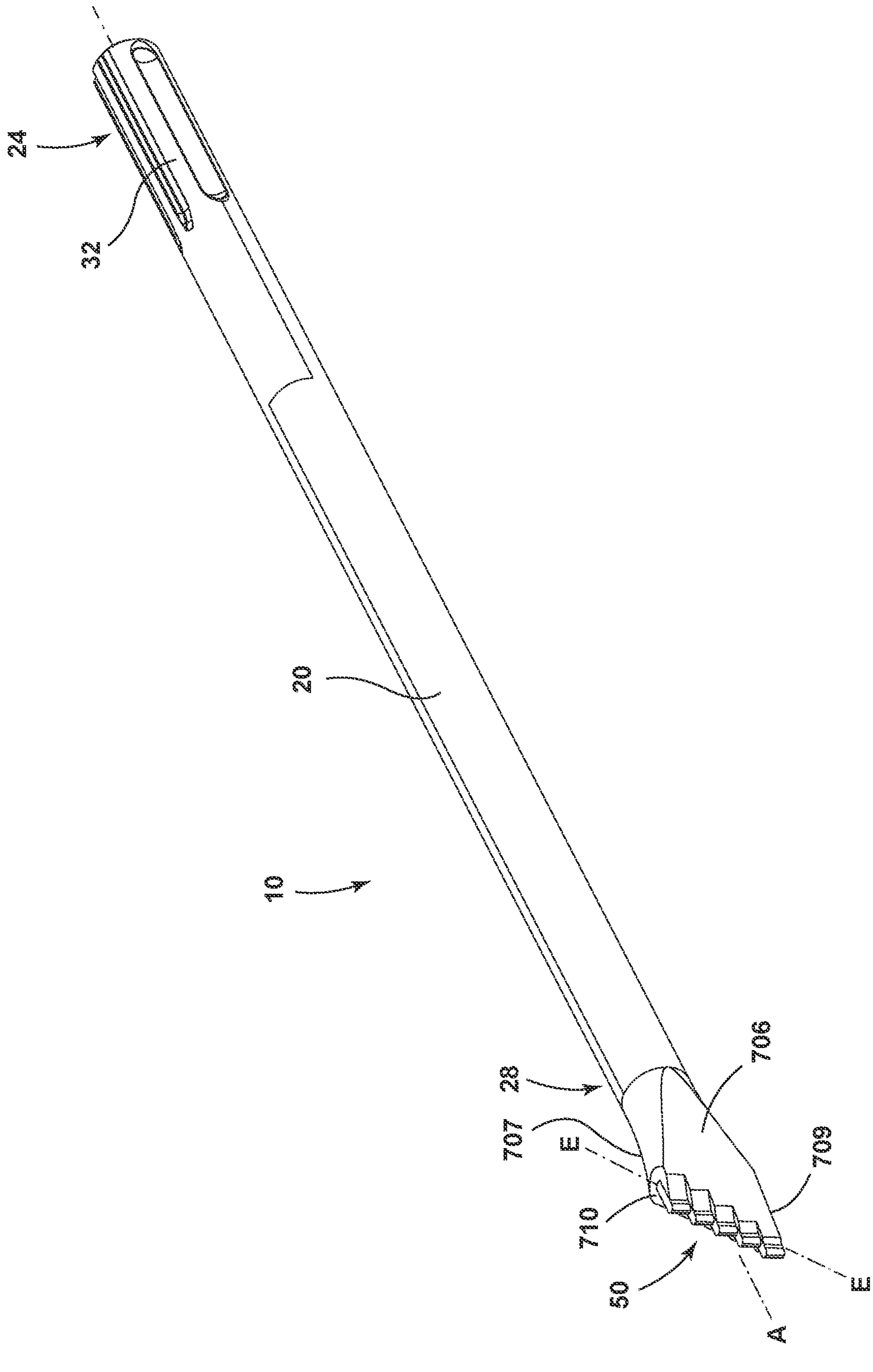
FIG. 94 is a perspective view of a chisel according to another embodiment, the chisel including a body and a head coupled to the body.
Figure 96:
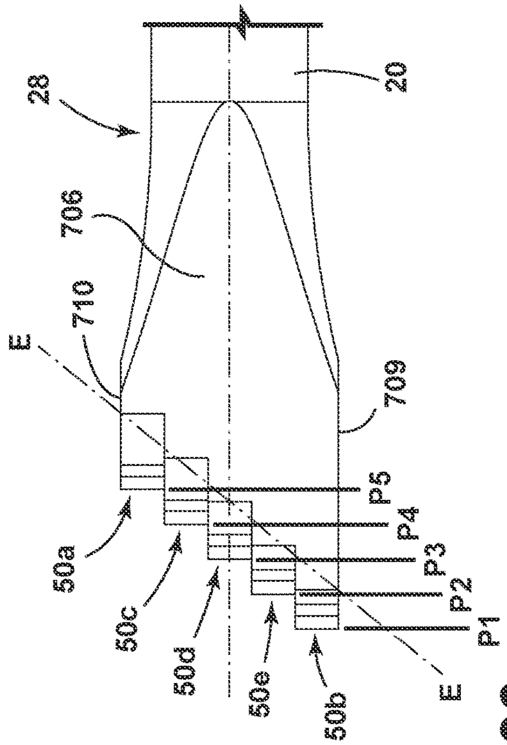
FIG. 96 is a side view of the chisel of FIG. 94.
Figure 95:
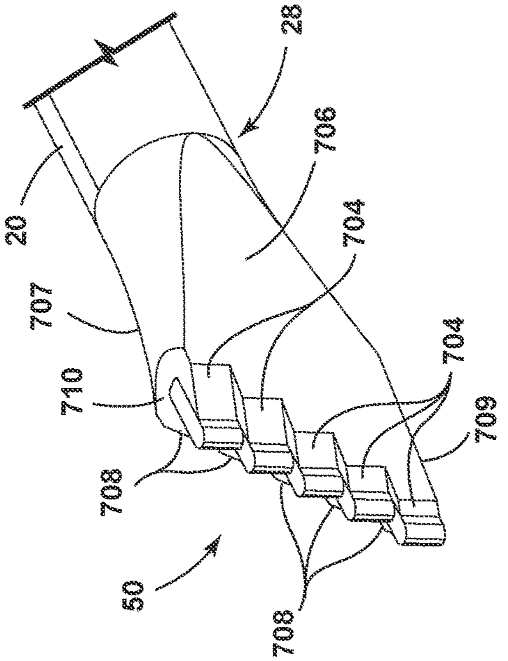
FIG. 95 is a detailed perspective view of the chisel of FIG. 94.
Figure 97:
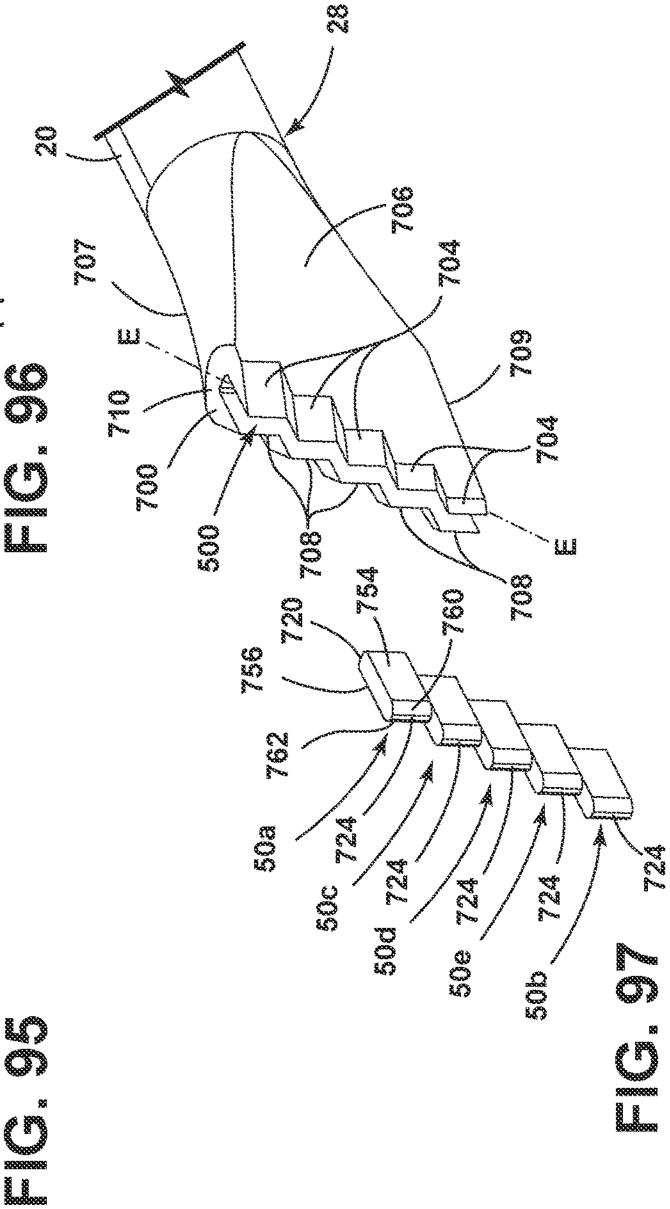
FIG. 97 is an exploded view of the chisel of FIG. 94.
Figure 98:
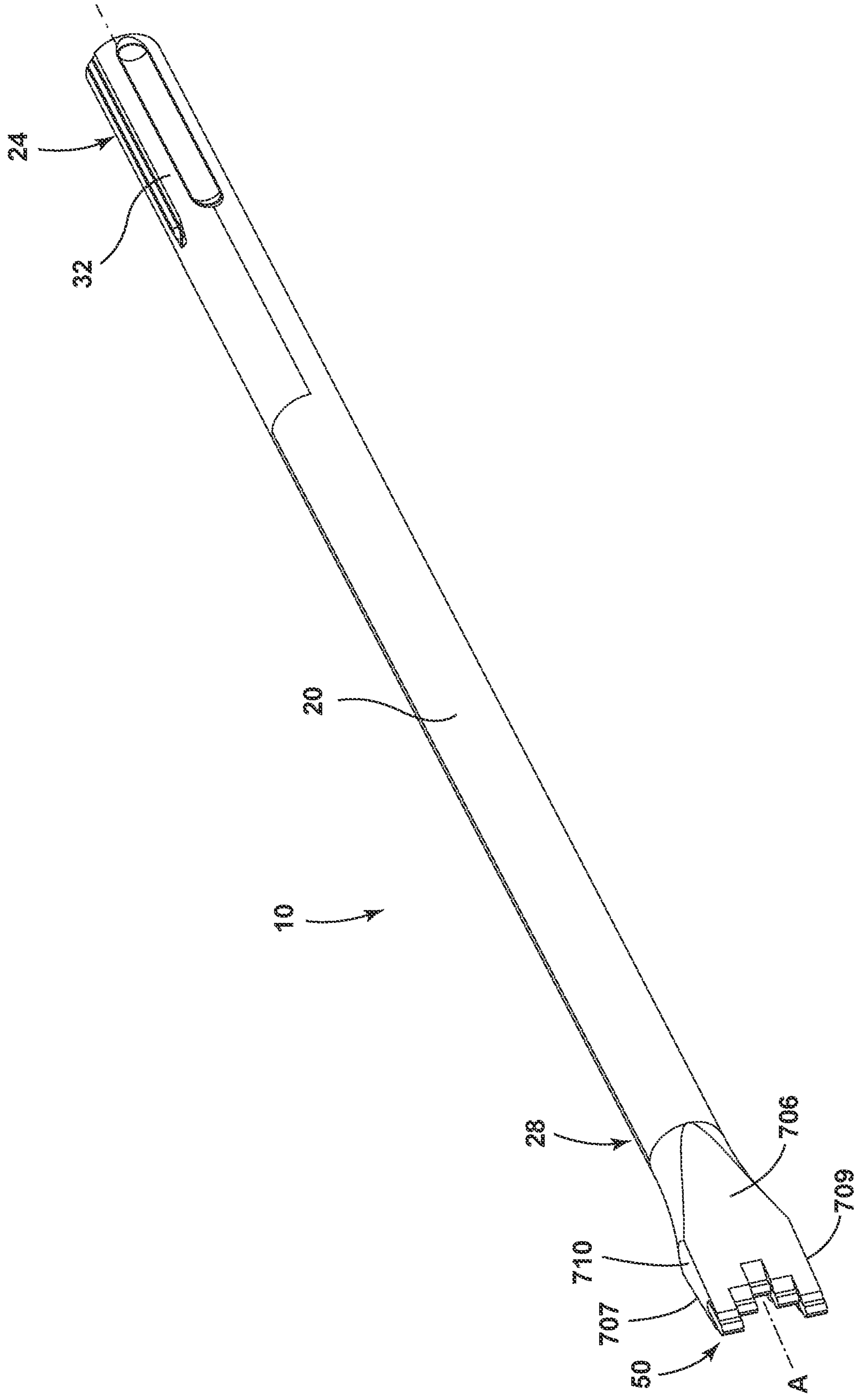
FIG. 98 is a perspective view of a chisel according to another embodiment, the chisel including a body and a head coupled to the body.
Figure 100:
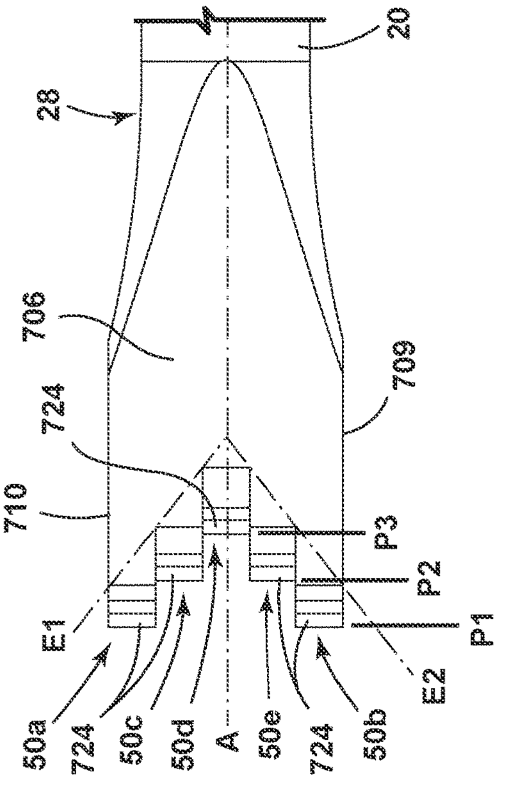
FIG. 100 is a side view of the chisel of FIG. 98.
Figure 99:
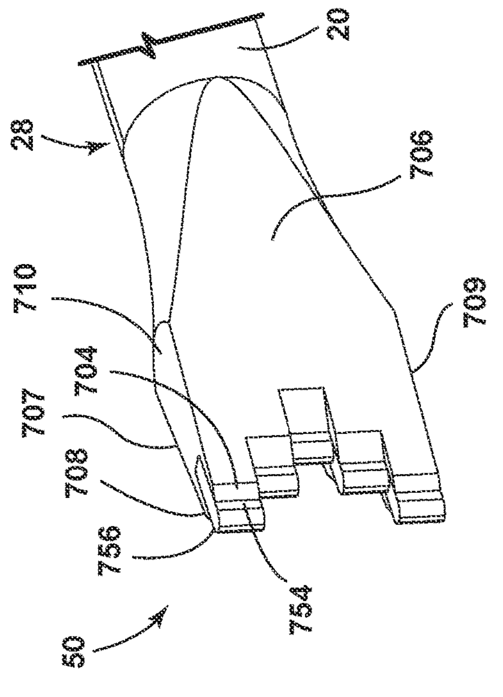
FIG. 99 is a detailed perspective view of the chisel of FIG. 98.
Figure 101:
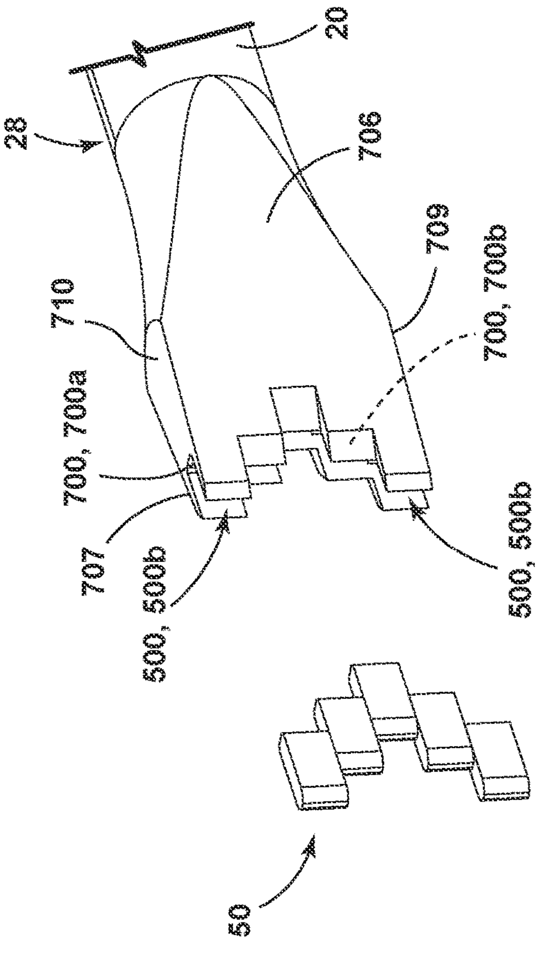
FIG. 101 is an exploded view of the chisel of FIG. 98.

With respect to FIGS. 30, 40, 48, 58, and 68, the X-shaped head 50 is positioned within the first and second channels 400, 404 of the second end 28 of the body 20. That is, each of the legs 438 is positioned within a respective portion of one of the first channel 400 and the second channel 404. Additionally, one of the prongs 408 is received within the corresponding gap 442 of the X-shaped head 50. As shown in FIGS. 31, 41, 49, 59, and 69, at least a portion of each of the legs 438 extends beyond (e.g., is positioned outwardly of) an outer surface of the body 20. As shown in FIGS. 31, 41, 49, 59, and 69, at least a portion of both surfaces 446, 450 of each leg 438 extends beyond the outer surface of the body 20. Moreover, as shown in FIGS. 31, 41, 49, 59, and 69, the pointed second end 434 of the respective X-shaped head 50 protrudes from the second end 28 of the body 20. In some of the embodiments (FIGS. 31, 41, and 49), the locations at which the respective first peripheral surface 446 and second peripheral surface 450 intersect is positioned at or adjacent to the second end 28 such that the entirety of each of the second peripheral surfaces 450 protrudes from the second end 28. In one of the embodiments (FIGS. 68 and 78), the locations at which the respective first peripheral surface 446 and second peripheral surface 450 intersect is positioned between the second end 28 and the first end 24 of the body 20 such that only a portion of each of the second peripheral surfaces 450 protrudes from the second end 28, while at least a portion of the one of the second peripheral surfaces 450 is positioned between adjacent prongs 408 of the second end 28. In some embodiments, therefore, at least a portion of each of the second peripheral surfaces 450 may be flush with or recessed relative to the angled surface 416 of the prongs 408.

With reference to FIGS. 75-124, the head 50 defines a portion of a flat chisel and is at least partially received within a channel 500 of the second end of the body 20.

With specific reference to the embodiment of FIGS. 75-81, the channel 500 is positioned at the second end 28 of the body 20. The channel 500 has a width that is smaller than the width of the second end 28 of the body 20. Therefore, a first portion 600 of the body 20 and a second portion 604 of the body 20 are positioned on opposite sides of the channel 500. A wall 608 of the channel 500 extends between the first portion 600 and the second portion 604. The wall 608 includes a substantially semicircular surface. In other embodiments, the wall 608 may have other shapes. Each of the first portion 600 and the second portion 604 defines a first surface 612, 616 on a first side of the body 20 and a second surface 620, 624 on a second side of the body 20. The first surfaces 612, 616 are discontinuous (i.e., separated by the channel 500), but coplanar with each other. Similarly, the second surfaces 620, 624 are discontinuous (i.e., separated by the channel), but coplanar with each other. The respective first and second surfaces 612, 616, 620, 624 are coupled to one another at the second end 28 of the body 20 and each extends towards the first end 24 of the body 20 at a non-parallel angle, thereby defining a straight edge portion 628, 632 at the second end 28 and an angled surface portions 612, 616, 620, 624 extending from the second end 28 on opposite sides of each of the portions 600, 604. In the illustrated embodiment, the angled surfaces 612, 616 and the second surface 620, 624 are positioned at an angle that measures 60 degrees relative to one another, although in other embodiments, this angle may range from 30 degrees to 90 degrees.

The head 50 of the embodiments of FIGS. 75-81 includes a first end 640 and a second end 644 opposite the first end 640. The first end 640 includes a recess 648 that that is complementary to the shape of the wall 608 of the channel 500. In this case, therefore, the recess 648 defines a substantially semicircular shape. The head 50 has a first surface 652*a*, 652*b* and a second surface 656*a*, 656*b*, each extending between the first end 640 and the second end 644. Respective first surfaces 652*a*, 656*a* are coupled to one another at the second end 644 of the head 50, and each extends toward the first end 640 of the body 20 at a non-parallel angle relative to the axis A. Accordingly, a straight edge portion 660 (i.e., a working edge) is defined at the second end 644 and the angled surfaces 652*a*, 656*a* extend from the second end 644 on opposite sides of the head 50. The head 50 extends between the first portion 600 to the second portion 604 of the body 20. In the illustrated embodiment, the angled surfaces 652*a*, 656*a* are positioned at a generally non-perpendicular angle relative to one another. In the illustrated embodiment, the angle between the angled surfaces measures 60 degrees, although in other embodiments, this angle may range from 30 degrees to 90 degrees. Respective second surfaces 652*b*, 656*b* extend from the first portions 625*a*, 656*a* towards the first end 640. The first surfaces 652*a*, 656*a* are each positioned at an oblique angle relative to the respective second portion 652*b*, 656*b*. In other embodiments, the first and second surfaces may have other configurations. For example, a single angled surface may extend from the second end 644 to the first end 640. Regardless of the configuration, however, the head 50 is received within and coupled to the channel 500 such that the recess 648 receives the wall 608 of the channel 500 and the straight edge portion 660 of the head 50 and the straight edge portions 628, 632 (i.e., a second working edge) of the body 20 are aligned with one another thereby collectively defining the worked edge. Moreover, the angled surfaces 625*a*, 656*a* of the head 50 are configured to be flush with the angled surfaces 612, 616, 620, 624 of the second end 28 of the body 20. In the illustrated embodiment, at least a portion of the head 50 projects from opposite sides of the body 20.

With specific reference to FIGS. 82-87, the body 20 defines a substantially rectangular channel 500. As shown, the channel 500 extends from the second end 28 of the body 20 towards the first end 24 of the body 20. The channel 500 is formed in an edge of the second end 28 between a first side 706 and a second side 707 and extends between a third side 709 and a fourth side 710. The channel 500 defines the axis E, which is perpendicular to the axis A. A width of the channel 500 is the same as a width of the body 20. A recessed surface 700 of the channel 500 is a coupling surface. The body 20 defines a first chamfered or angled surface 704 and a second chamfered or angled surface 708 at the second end 28.

The head 50 includes a plate that is received within channel 500 and projects from the second end 28 of the body 20. The plate includes a first end 720 and a second end 724 opposite the first end 720. The first end 720 has a coupling surface 726 that is complementary to the coupling surface 700 of the channel 500. In this case, the coupling surface 726 of the first end 720 has first and second angled surfaces 726*a*, 726*b*, which are positioned on opposite sides of a center surface 726*c*. In other embodiments, the recessed surface 700 and the coupling surface can have other shapes (e.g., flat, stepped, irregular, arcuate, etc.). The second end 724 defines a straight, working edge of the chisel 10. The head 50 further includes a first convex surface 728, a second convex surface 732, a first concave surface 734, a second concave surface 735, a first planar surface 736, and a second planar surface 740. The first convex surface 728 and the second convex surface 732 are coupled to one another at the working edge and extend from the working edge toward the first end 720. The first and second concave surfaces 734, 735 extend from the respective first and second convex surfaces 728, 732. The first and second planar surfaces 736, 740 extend from the respective first and second concave surfaces 734, 735 to the first end 720. In other embodiments, the convex surface 728, 732 and the concave surface 734, 735 one each side may be replaced with a single angled surface that extends from the working edge to the respective planar surface 736, 740.

The head 50 is positioned in the channel 500 such that the coupling surface of the first end 720 engages the coupling surface in the channel 500 and the first and second concave surface 734, 735 extend from the second end 28 of the body 20. In the illustrated embodiment, the second end 28 of the body 20 is positioned adjacent an intersection of the respective concave surface 734, 735 and the planar surface 736, 740. That is, the planar surfaces 736, 740 are entirely positioned within the channel 500. In other embodiments, relatively small sections of the planar surfaces 736, 740 may also extend out of the channel 500 beyond the second end 28 of the body 20. In such case, the first and second angled surfaces 704, 708 of the body 20 may be positioned adjacent to the respective planar surfaces 736, 740 of the head 50 at a location between the angled surfaces 728, 732 and the first end 720.

With specific reference to FIGS. 88-93, like the body 20 of FIGS. 82-87, the body 20 defines a substantially rectangular channel 500. As shown, the channel 500 extends from the second end 28 of the body 20 towards the first end 24 of the body 20. The channel 500 defines the axis E, which is perpendicular to the axis A. A width of the channel 500 is the same as a width of the body 20. A recessed surface 700 of channel 500 is a coupling surface. In the illustrated embodiment, the body 20 does not define a first chamfered or angled surface 704 and a second chamfered or angled surface 708 at the second end 28. The body 20 defines a first planar side 706 (i.e., a first side) of the second end 28, a second planar side 707 (i.e., a second side) of the second end 28, a third side 709 of the second end 28, and a fourth side 710 of the second end 28. The channel 500 is formed in an edge of the second end 28 between the first and second planar sides 706, 707 and extends between the third and fourth sides 709, 710.

The head 50 includes a plurality of plates 50*a*, 50*b*, 50*c*, rather than a single plate. In the illustrated embodiment, there are three plates 50*a*, 50*b*, 50*c* (e.g., a first side plate 750*a*, a center plate 50*b*, and a second side plate 50*c*), but in other embodiments, there may be more or fewer plates. As shown, each of the plates 50*a*, 50*b*, 50*c* is received within channel 500 and projects from the second end 28 of the body 20. Also, each of the plates 50*a*, 50*b*, 50*c* include a first end 720 and a second end 724 opposite the first end 720. The first end 720 has a coupling surface 726 that is complementary to a portion of the coupling surface 700 of the channel 500. In this case, the coupling surface 726 of the first end 720 is generally flat. In other embodiments, the recessed surface 700 and the coupling surface can have other shapes (e.g., stepped, irregular, arcuate, etc.). The second end 724 defines an angled, working edge of the chisel. That is, the second end 724 defines a first angled working edge 724*a* that is coupled to a second angled working edge 724*b* at an intersection point 724*c*. The head 50 further includes a first angled surface 750*a* coupled to a second angled surface 750*b*, and a third angled surface 752*b* coupled to a fourth angled surface 752*b*. A first planar surface 754 extends from the first and second angled surfaces 750*a*, 750*b* and a second planar surface 756 extends from the third and fourth angled surfaces 752*a*, 752*b*. The first and second angled surfaces 750*a*, 750*b* and the third and fourth angled surfaces 752*a*, 752*b* are respectively coupled to one another at the working edge and extend from the working edge toward the first end 720. The first and second planar surfaces 754, 756 extend from the respective surface 750*a*, 750*b*, 752*a*, 752*b* to the first end 720. Each of the first and second planar surfaces 754, 756 have a plurality of ribs 758.

The plates 50*a*, 50*b*, 50*c* are positioned in the channel 500 such that the coupling surface 726 of the first end 720 engages the coupling surface in the channel 500 and the first and second planar surfaces 754, 756 extend from the second end 28 of the body 20. The ribs 758 assist in coupling the plates 50*a*, 50*b*, 50*c* to the inner walls of the channel 500. Relatively small sections of the planar surfaces 754, 758 also extend out of the channel 500 beyond the second end 28 of the body 20. Therefore, opposite sides of the body 20 may be positioned adjacent to the respective planar surfaces 754, 756 of the head 50 at a location between the angled surfaces 750*a*, 750*b*, 752*a*, 752*b* and the first end 720. As shown, the intersection points 724*c* are spaced apart from one another along the width of the channel 500 and are positioned in the same plane P1, which perpendicular to the axis A. Accordingly, the working edges of the plates 50*a*, 50*b*, 50*c* are aligned. In the illustrated embodiment, the sides of the side plates 50*a*, 50*b*, 50*c* extend beyond a width of the body 20. In other embodiments, the plates 50*a*, 50*b*, 50*c* may be entirely contained within the width of the body 20. That is, the side plates 50*a*, 50*c* may be positioned to be flush with the respective side of the body 20.

With specific reference to FIGS. 94-97, like the body 20 of FIGS. 88-93, the body 20 defines a channel 500. However, whereas the axis E of the channel 500 of FIGS. 88-93 is perpendicular to the axis A, the axis E of the channel of FIGS. 94-97 is oriented at a non-perpendicular angle. In the illustrated embodiment, the angle between the axis E and the axis A is 129 degrees. In other embodiments, the angle between the axis E and the axis A may range from 114 degrees to 144 degrees. As shown, the body 20 has a first length on a first side and a second length on the second side. The channel 500 is formed in an edge of the second end 28 between the first and second planar sides 706, 707 and extends between the third and fourth sides 709, 710. As shown, the channel 500 extends from the second end 28 of the body 20 towards the first end 24 of the body 20. Because of the angle of the channel 500, the third side 709 is longer than the first side 710. A recessed surface 700 of channel 500 is a coupling surface. In the illustrated embodiment, the body 20 defines a plurality of first chamfered or angled surfaces 704 and a plurality of second chamfered or angled surface 708 at the second end 28.

The head 50 includes a plurality of plates 50*a*, 50*b*, 50*c*, 50*d*, 50*e* rather than a single plate. In the illustrated embodiment, there are five plates 50*a*, 50*b*, 50*c*, 50*d*, 50*e* (e.g., a first side plate 750*a*, three center plates 50*b*, 50*d*, 50*e*, and a second side plate 50*c*), but in other embodiments, there may be more or fewer plates. The plates 50*a*, 50*b*, 50*c*, 50*d*, 50*e* have similar features as the plates 50*a*, 50*b*, 50*c* of FIGS. 88-93, with noted exceptions. As shown, the coupling surface 726 is generally arcuate or chamfered (rather than flat). Also, the ribs 758 are omitted. In other embodiments, the ribs 758 may be included. Finally, the second end 724 defines a straight working edge. The head 50 also includes a first angled surface 760 and a second angled surface 762. Each of the first and second angled surfaces 760, 762 extends from the straight working edge towards the first end 720. The planar surfaces 754, 756 extend from the respective first and second angled surfaces 760, 762 towards the second end.

The plates 50*a*, 50*b*, 50*c*, 50*d*, 50*e* are positioned in the channel 500 such that the coupling surface 726 of the first end 720 is received in the coupling surface and the first and second planar surfaces 754, 756 extend from the second end 28 of the body 20. Relatively small sections of the planar surfaces 754, 756 also extend out of the channel 500 beyond the second end 28 of the body 20. Therefore, the angled surfaces 704, 708 of the body 20 may be positioned adjacent to the respective planar surfaces 736, 740 of the head 50 at a location between the angled surfaces 750*a*, 750*b*, 752*a*, 752*b* and the first end 720. As shown, the working edges are spaced apart from one another along the width of the channel 500 and along the length of the body 20. In this embodiment, the working edges are positioned in different planes P1-P5, which are perpendicular to the axis A. The second end 724 of the plates 50*a*, 50*b*, 50*c*, 50*d*, 50*e* define the planes P1-P5. Accordingly, the working edges and the planes P1-P5 of the plates 50*a*, 50*b*, 50*c*, 50*d*, 50*e* are staggered or stepped from each other along the longitudinal axis. In other embodiments, some of the planes P1-P5 are axially aligned with each other along the longitudinal axis. In the illustrated embodiment, the plates 50*a*, 50*b*, 50*c*, 50*d*, 50*e* are entirely contained within the width of the body 20. That is, the side plates 50*a*, 50*c* are positioned to be flush with the respective side of the body 20.

With specific reference to FIGS. 98-101, like the body 20 of FIGS. 88-97, the body 20 defines a channel 500. However, in this embodiment, the channel 500 is V-shaped and therefore defines a first axis E1 that intersects a second axis E2 at an angle. As shown, the angle between the axes E1, E2 is 40 degrees. In other embodiments, the angle between the axes E1, E2 may range between 20 degrees and 60 degrees. Each of the axes E1, E2 is oriented at a non-perpendicular angle. In the illustrated embodiment, the angle between the axes E1, E2 and the axis A is 20 degrees. In other embodiments, the angle between the axes E1, E2 and the axis A ranges between 10 degrees and 30 degrees. As shown, the body 20 has a first length at a center of the body 20 and a second length on the first and second sides the body 20. The channel 500 is formed in an edge of the second end 28 between the first and second planar sides 706, 707 and extends between the third and fourth sides 709, 710. The channel 500 includes a first portion 500*a* that extends from the first side of the body 20 to a center of the body 20 along the axis E1 and a second portion 500*b* that extends from the second side of the body 20 to the center of the body 20 along the axis E2. As shown, each of the first and second portions 500*a*, 500*b* of the channel 500 extends from the second end 28 of the body 20 towards the first end 24 of the body 20. Each of the first and second portions 500*a*, 500*b* includes a recessed surface 700*a*, 700*b* that is a coupling surface. In the illustrated embodiment, the body 20 defines a plurality of first chamfered or angled surfaces 704 and a plurality of second chamfered or angled surface 708 at the second end 28 adjacent both the first and second portions 500*a*, 500*b* of the channel 500.

The head 50 includes a plurality of plates 50*a*, 50*b*, 50*c*, 50*d*, 50*e* rather than a single plate. In the illustrated embodiment, there are five plates 50*a*, 50*b*, 50*c*, 50*d*, 50*e* (e.g., a first side plate 750*a*, three center plates 50*b*, 50*d*, 50*e*, and a second side plate 50*c*), but in other embodiments, there may be more or fewer plates. The plates 50*a*, 50*b*, 50*c*, 50*d*, 50*e* have the same features as the plates 50*a*, 50*b*, 50*c*, 50*d*, 50*e* of FIGS. 94-97.

The plates 50*a*, 50*b*, 50*c*, 50*d*, 50*e* are positioned in the channel 500 such that the coupling surface 726 of the first end 720 is received in the coupling surface and the first and second planar surfaces 754, 756 extend from the second end 28 of the body 20. In the illustrated embodiment, two plates 50*a*, 50*c* are positioned in the first portion 500*a* of the channel 500, two plates 50*b*, 50*e* are positioned in the second portion 500*b* of the channel 500, and one plate 50*d* is positioned at the intersection of the first portion 500*a* and the second portion 500*b* of the channel. Relatively small sections of the planar surfaces 754, 756 also extend out of the channel 500 beyond the second end 28 of the body 20. Therefore, the angled surfaces 704, 708 of the body 20 may be positioned adjacent to the respective planar surfaces 736, 740 of the head 50 at a location between the angled surfaces 750*a*, 750*b*, 752*a*, 752*b* and the first end 720. As shown, the working edges are spaced apart from one another along the width of the channel 500 and along the length of the body 20. In this embodiment, the working edges are positioned in different planes P1-P3, which are perpendicular to the axis A. Moreover, the working edges of the two plates 50*a*, 50*c* in the first portion 500*a* are positioned in respective P1, P2, and the working edges of the two plates 50*b*, 50*e* of the second portion are positioned in respective planes P1, P2. Accordingly, each of the working edges of the plates 50*a*, 50*c* of the first portion 500*a* is aligned with one of working edges of the plates 50*b*, 50*e* of the second portion 500*b*. The working edge of the plate 50*d* is positioned in the plate P3. Accordingly, some of the working edges of the plates 50*a*, 50*b*, 50*c*, 50*d*, 50*e* are staggered or stepped and some of the working edges of the plates 50*a*, 50*b*, 50*c*, 50*d*, 50*e* are aligned. In the illustrated embodiment, the plates 50*a*, 50*b*, 50*c*, 50*d*, 50*e* are entirely contained within the width of the body 20. That is, the side plates 50*a*, 50*c* are positioned to be flush with the respective side of the body 20.

Figure 102:
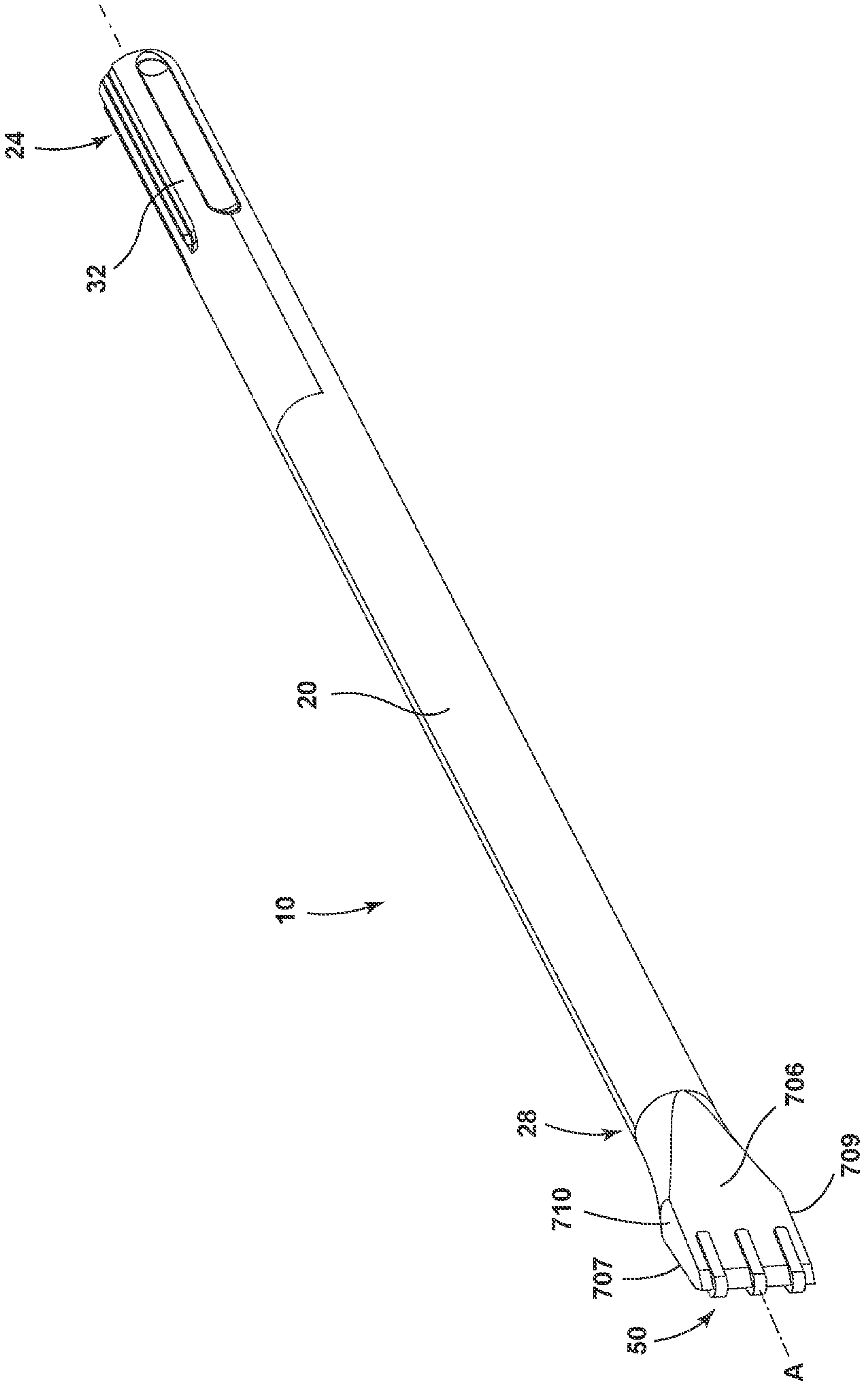
FIG. 102 is a perspective view of a chisel according to another embodiment, the chisel including a body and a head coupled to the body.
Figure 103:
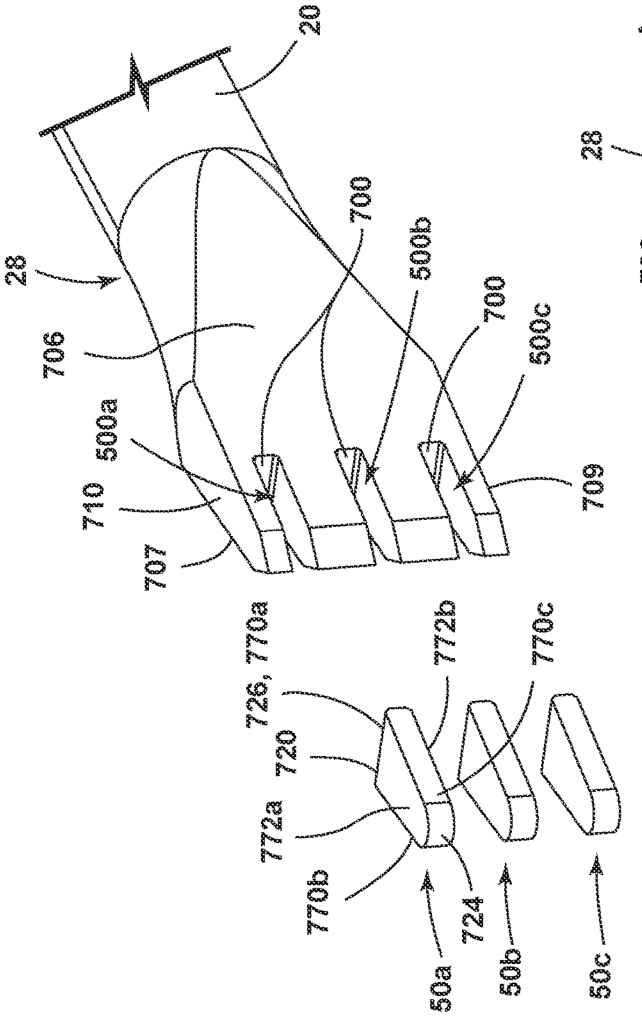
FIG. 103 is an exploded view of the chisel of FIG. 102.
Figure 104:
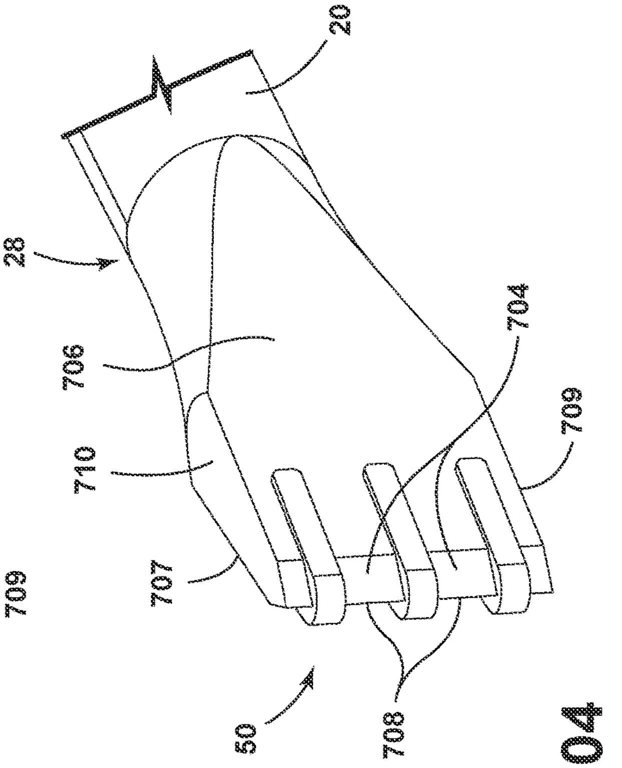
FIG. 104 is a detailed perspective view of the chisel of FIG. 102.
Figure 105:
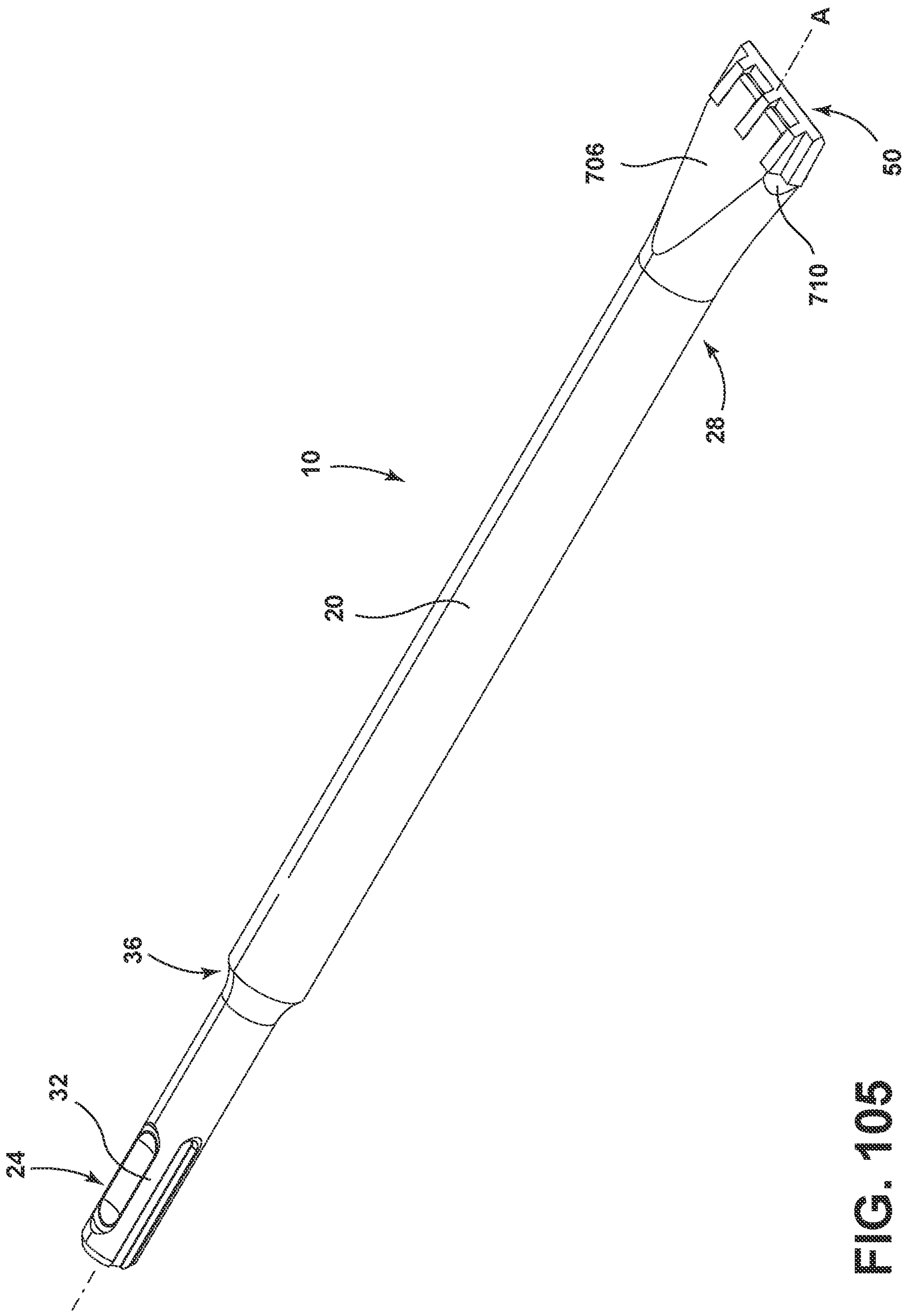
FIG. 105 is a perspective view of a chisel according to another embodiment, the chisel including a body and a head coupled to the body.
Figure 106:
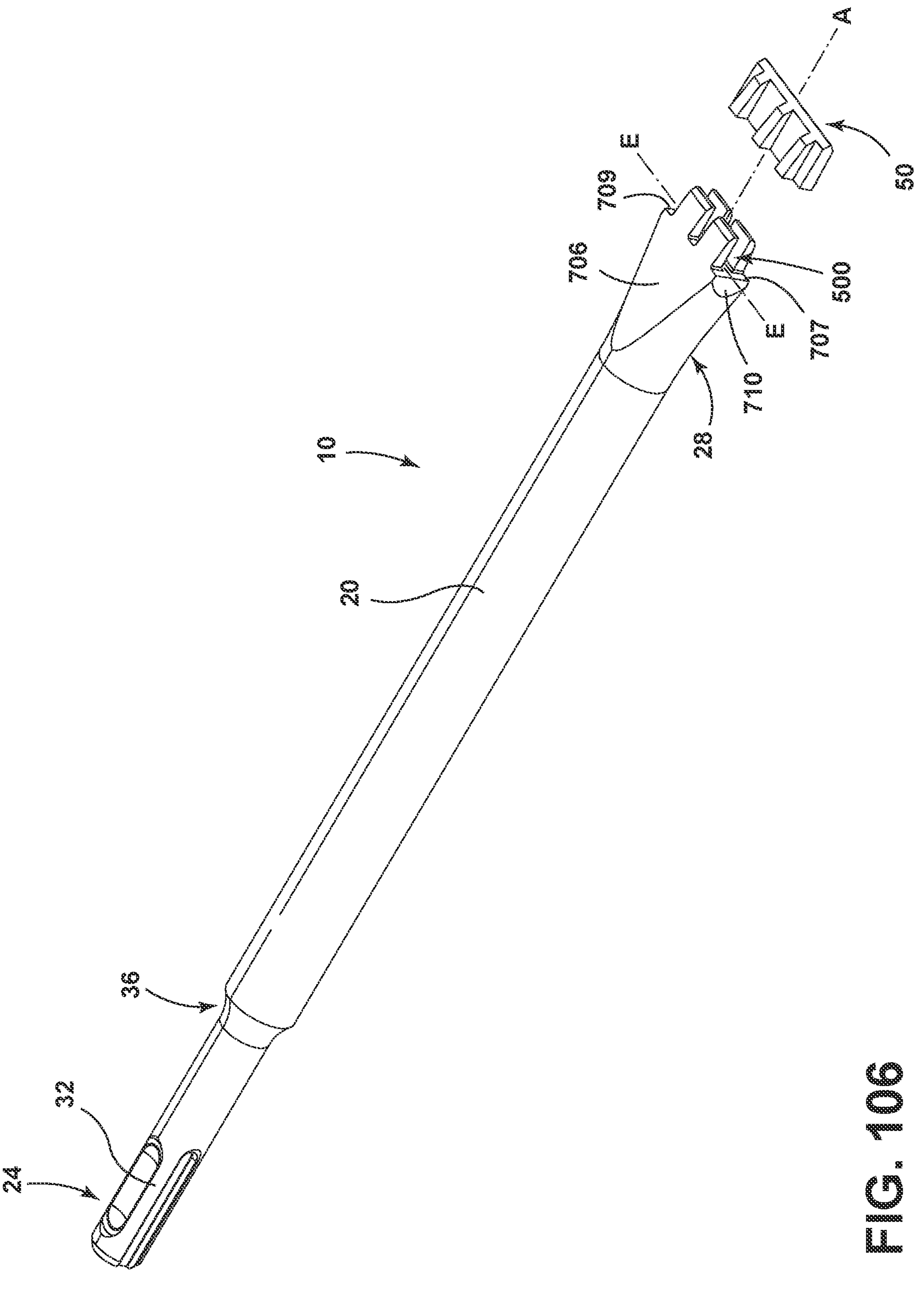
FIG. 106 is an exploded view of the chisel of FIG. 105.

With specific reference to FIGS. 102-104, the body 20 defines a plurality of channels 500*a*, 500*b*, 500*c*. As shown, each of the channels 500*a*, 500*b*, 500*c* extends from the second end 28 of the body 20 towards the first end 24 of the body 20. The plurality of channels 500*a*, 500*b*, 500*c* are formed in an edge of the second end 28 between the third and fourth sides 709, 710 and extend between the first and second planar sides 706, 707. The channels 500*a*, 500*b*, 500*c* are spaced apart from one another along a width of the body 20. The side channels 500*a*, 500*c* are spaced apart from the respective sides of the body 20. Also, each of the channels 500*a*, 500*b*, 500*c* includes a recessed surface 700 that is a coupling surface. The portions of the body 20 between adjacent channels 500*a*, 500*b*, 500*c* define prongs. Each of the prongs has a chamfered or angled surface, a first chamfered or angled surface 704, and a second chamfered or angled surface 708 at the second end 28. In other embodiments, the chamfered or angled surfaces 704, 708 may be omitted. The angled surfaces 704, 708 define a portion of the working edge or a second working surface at the second end 28.

The head 50 includes a plurality of plates 50*a*, 50*b*, 50*c*, each of which is received within a respective channel 500*a*, 500*b*, 500*c*. In the illustrated embodiments, there are three channels 500*a*, 500*b*, 500*c* and three plates 50*a*, 50*b*, 50*c*. The plurality of plates 50*a*, 50*b*, 50 extend between the first and second planar sides 706, 707. In other embodiments, there be more or fewer channels and plates. Each of the plates 50*a*, 50*b*, 50*c* has a generally triangular shape. Each of the plates includes a first side 770, a second side 770*b*, and a third side 770*c*. The sides 770*a*-770*c* are coupled by a first planar surface 772*a* and a second planar surface 772*b*, which is opposite the first planar surface 772. The first side 770*a* is positioned at the first end 720 and defines the coupling surface 726. The coupling surface 726 is substantially flat, but may have other configurations in other embodiments. The second and third sides 770*b*, 770*c* intersect at the second end 724 and collectively define a portion of the working edge or working surface. In the illustrated embodiment, the working edges of the plates 50*a*, 50*b*, 50*c* are rounded or arcuate but in other embodiments, the working edges may be straight or pointed. Also, the working edge projects from the second end 28 of the body 20. As shown, the second and third sides 770*b*, 770*c* extend from opposite sides of the body 20 and are positioned between adjacent angled surfaces 704, 708. Accordingly, a portion of the first side also extends from the respective side of the body 20.

With specific reference to FIGS. 105-123, the body 20 includes a channel 500 that extends substantially along a width of the second end 28. The channel 500 is formed in an edge of the second end 28 between the first and second planar sides 706, 707 and extends between the third and fourth sides 709, 710. That is, the axis E of the channel 500 is substantially perpendicular to the axis A of the body 20. Additionally, opposite walls 800, 804 of the channel 500 each include a plurality of recesses 808, 812. The plurality of recesses 808, 812 are formed in an edge of the second end 28 between the third and fourth sides 709, 710 and extend between the first and second planar sides 706, 707. In the illustrated embodiment, each of the walls 800, 804 includes three recesses 808, 812 that are aligned with a corresponding recess 808, 812 on the opposite wall 800, 804. In other embodiments, there may be greater or fewer recesses 808, 812 that may be aligned or staggered relative to one another. The portions of the walls 800, 804 of the body 20 between adjacent recesses define prongs. Each of the prongs has a chamfered or angled surface 816, 820. In other embodiments, the chamfered or angled surfaces 816, 812 may be omitted.

Additionally, the head 50 includes a central portion 830 that includes a first end 834, a second end 838 opposite the first end 834, a first angled surface 842, a second angled surface 846, a first planar surface 850, and a second planar surface 854. The second end 838 defines the straight working edge. The first and second angled surfaces 842, 846 are coupled to one another at the working edge and extend toward the first end 834. The first angled surface 842 and the second angled surface 846 define an angle therebetween. The first and second planar surfaces 850, 854 extend from the respective first and second angled surfaces 842, 846 to the first end 834. A plurality of ribs 860, 864 are coupled to and extends from each of the central portion 830. Specifically, each of the plurality of ribs 860, 864 extends from respective first and second planar surfaces 850, 854. Each of the first and second planar surfaces 850, 854 includes three ribs 860, and each is configured to correspond to one of the recesses 808, 812 in the respective walls of the channel 500. Therefore, there may be greater or fewer ribs 860, 864 on each of the first and second planar surfaces 850, 854. Each of the plurality of ribs 860, 864 includes a first portion and a second portion. The first portion of each of the ribs 860, 864 is positioned adjacent to the respective first and second angled surfaces 842, 846 and extend toward the first end 834. The first portions are generally coplanar and continuous with the corresponding angled surfaces 842, 846. The second portion of each of the ribs 860, 864 extends from the first portion to the first end 834. In the illustrated embodiment, each of the first portions extend from the central portion 830 at an oblique angle and each of the second portions extend from the first portion at an oblique angle. In some embodiments, the ribs 860, 864 are the same length (see FIGS. 107, 112, 122), and in some embodiments, the ribs 860, 864 are different lengths (see FIG. 117). In some embodiments, the second portions of the ribs 860, 864 are the same length (see FIGS. 107, 112, 122), and in some embodiments, the second portions of the ribs 860, 864 are different lengths (see FIG. 117). Moreover, in some embodiments (FIGS. 107, 112) the ribs 860, 864 extend to the first end 834, while in some embodiments (FIGS. 117, 122), the ribs 860, 864 extend to a location between the first end 834 and the second end 838. With specific reference to FIG. 123, the central portion 830 may have a narrowed portion 830*a* extending along a width thereof that may be received in a recess 870 in the body 820, which in communication with the channel 500.

Figure 107:
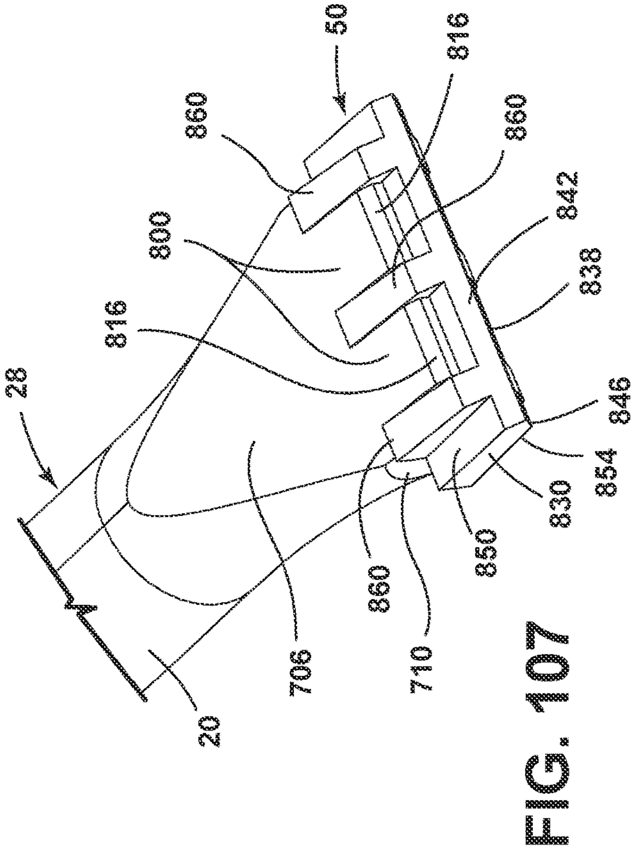
FIG. 107 is a detailed perspective view of the chisel of FIG. 105.
Figure 109:
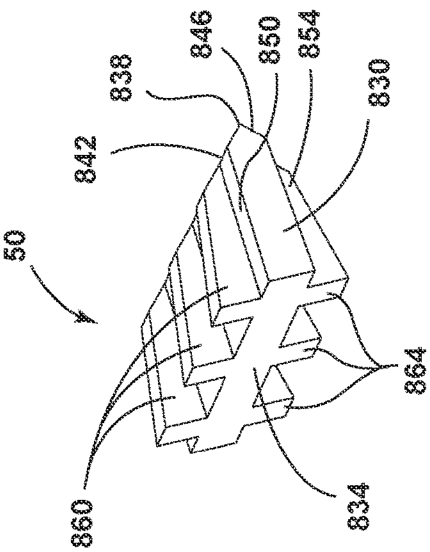
FIG. 109 is a perspective view of the head of FIG. 105.
Figure 108:
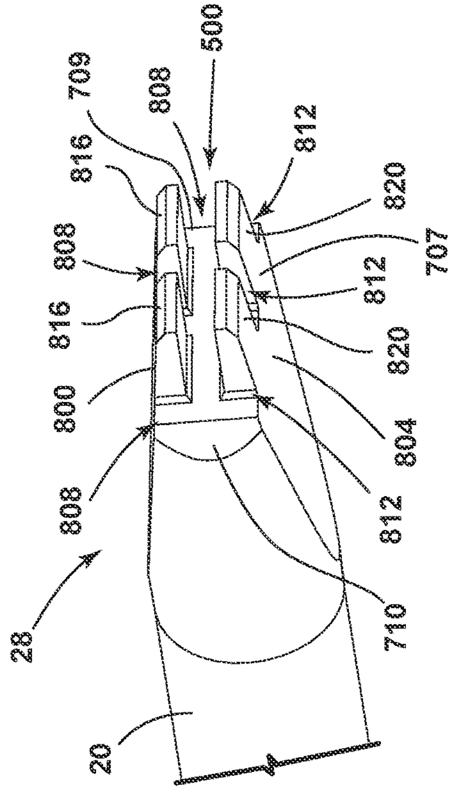
FIG. 108 is a detailed perspective view of the body of FIG. 105.
Figure 110:
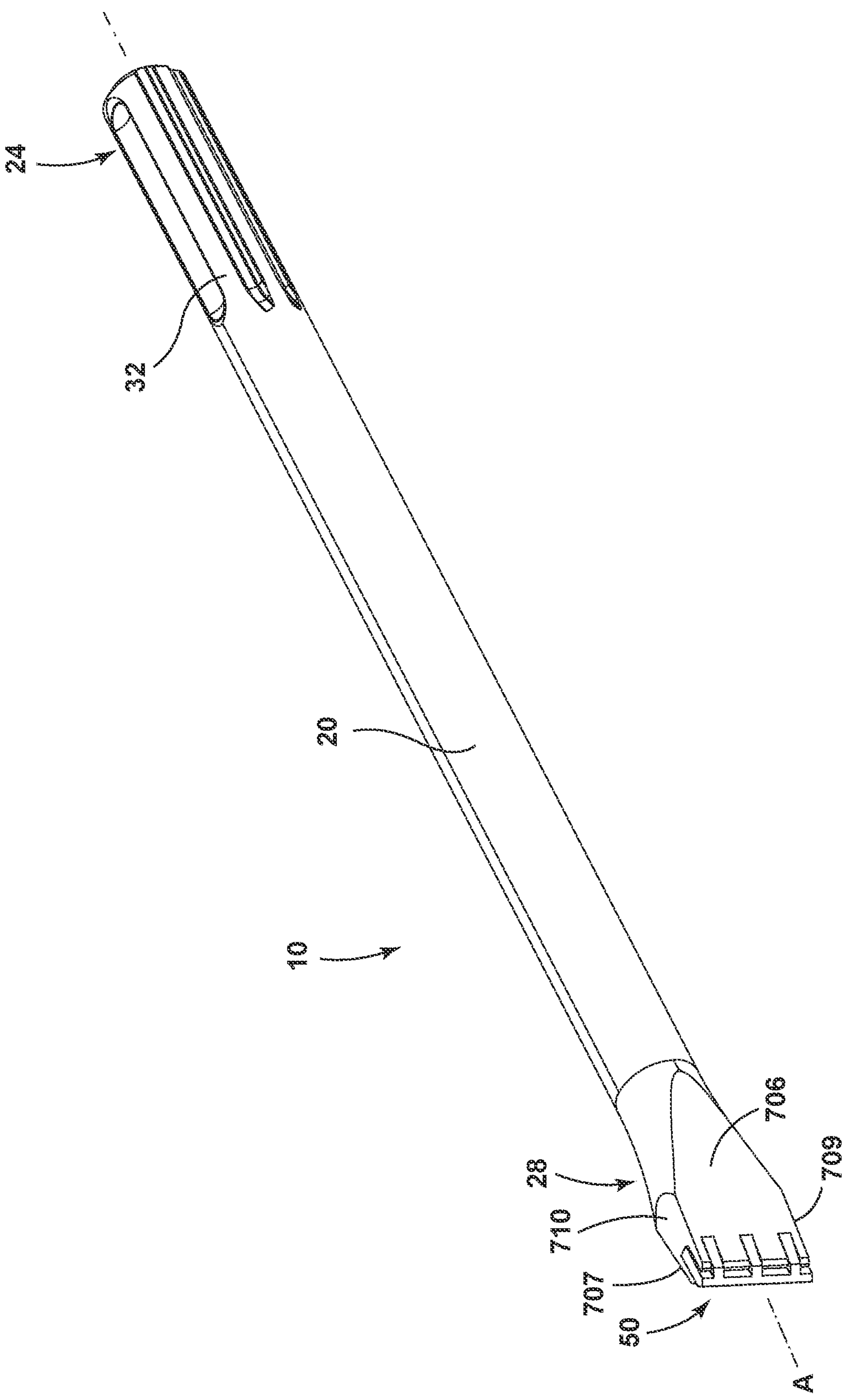
FIG. 110 is a perspective view of a chisel according to another embodiment, the chisel including a body and a head coupled to the body.
Figure 111:
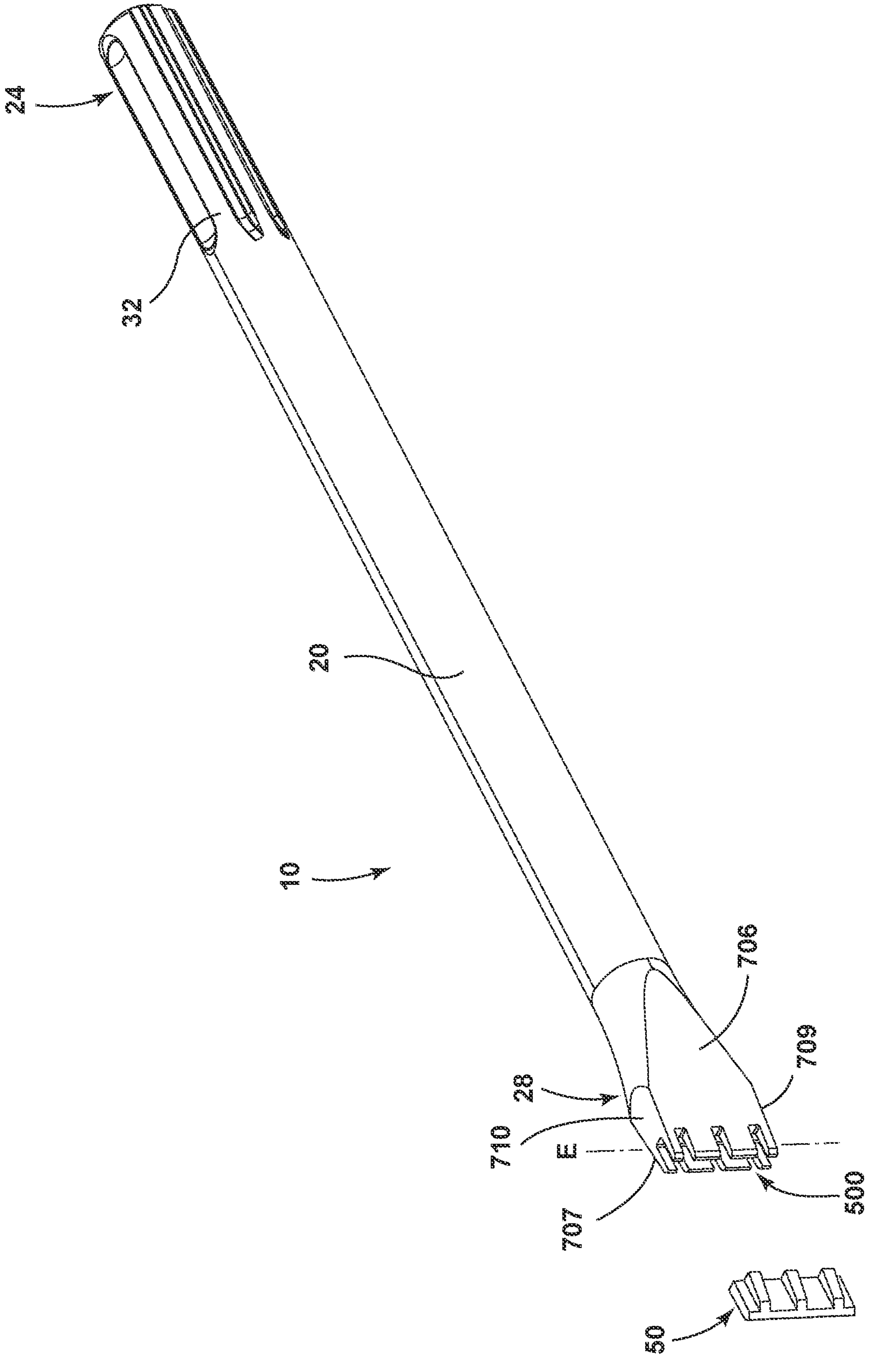
FIG. 111 is an exploded view of the chisel of FIG. 110.
Figure 112:
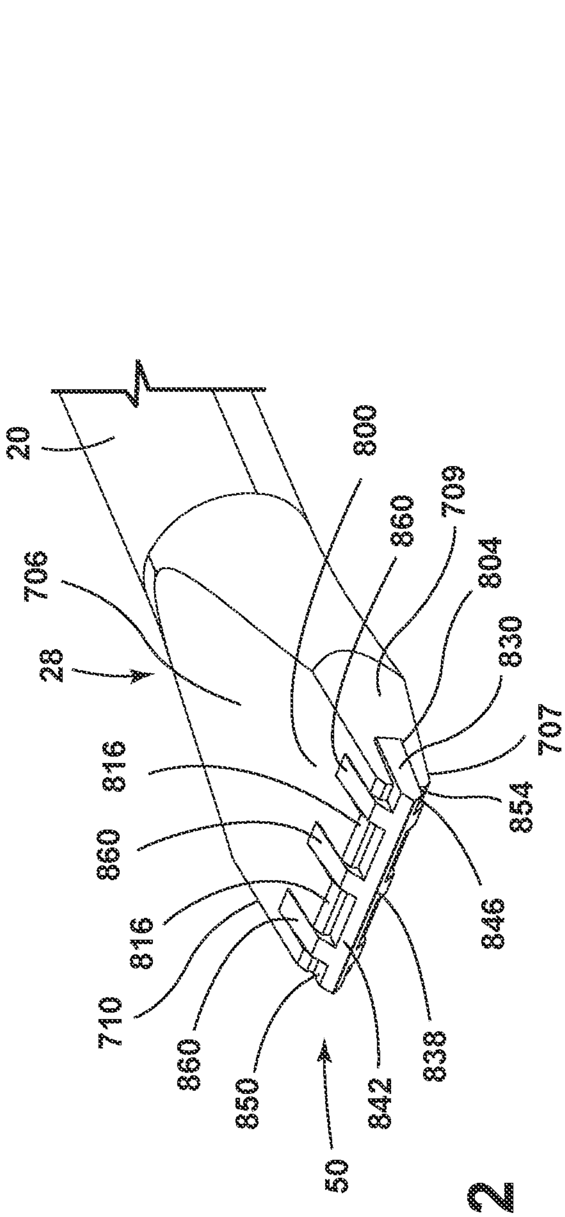
FIG. 112 is a detailed perspective view of the chisel of FIG. 110.
Figure 113:
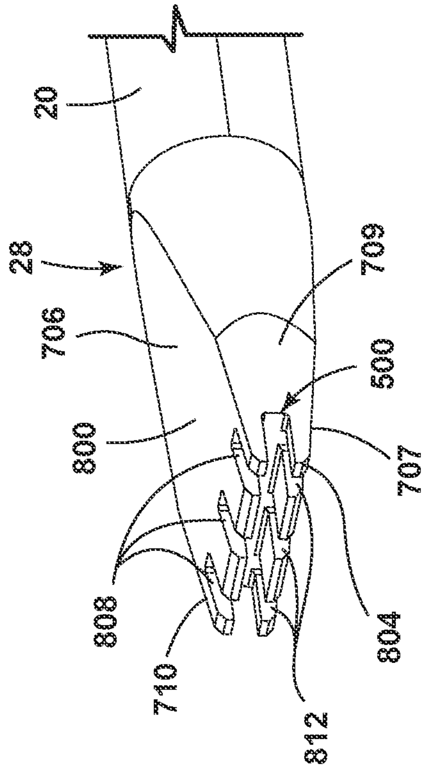
FIG. 113 is a detailed perspective view of the body of FIG. 110.
Figure 114:
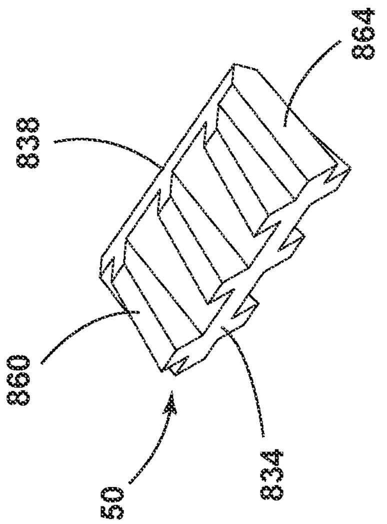
FIG. 114 is a perspective view of the head of FIG. 110.
Figure 115:
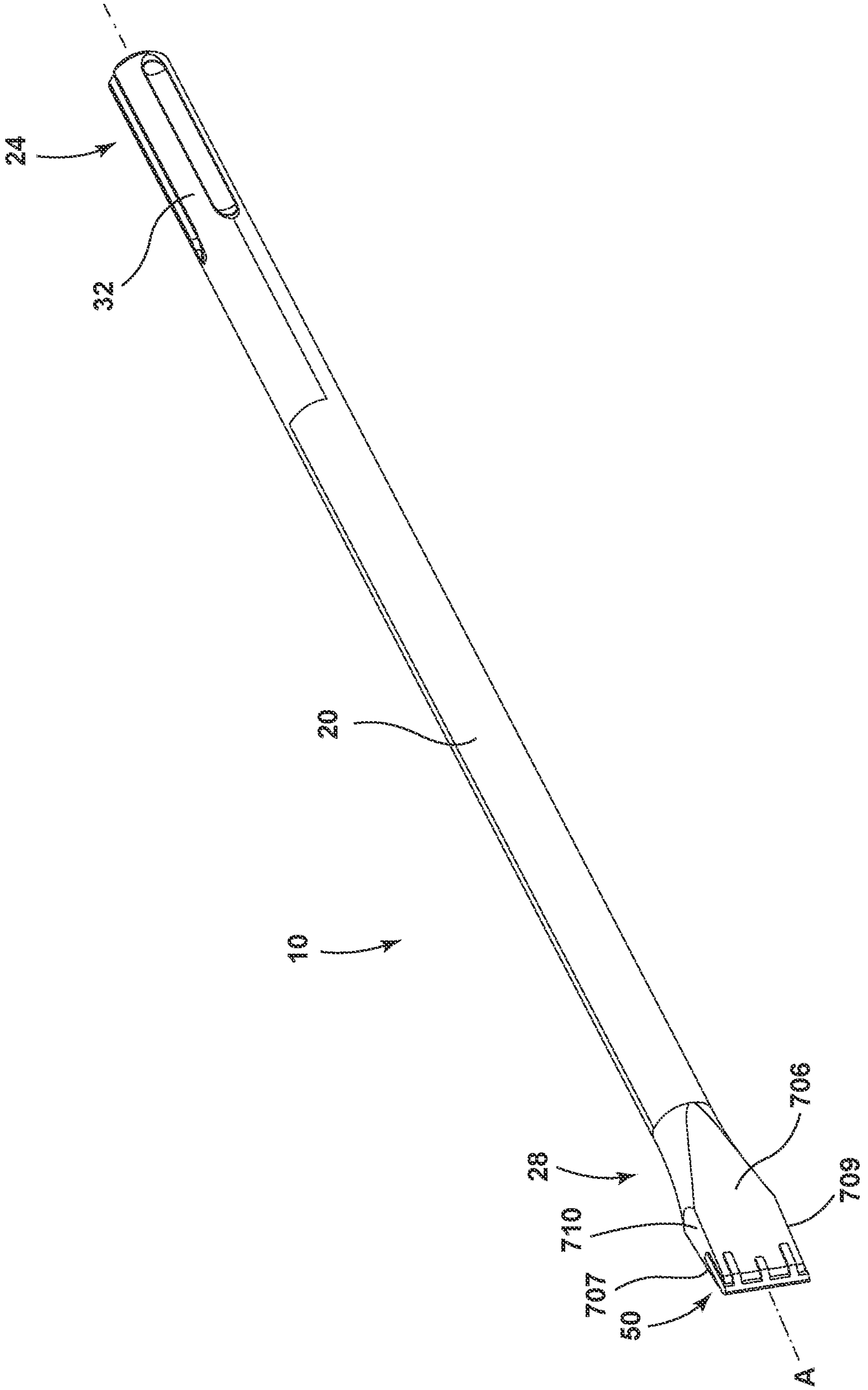
FIG. 115 is a perspective view of a chisel according to another embodiment, the chisel including a body and a head coupled to the body.
Figure 116:
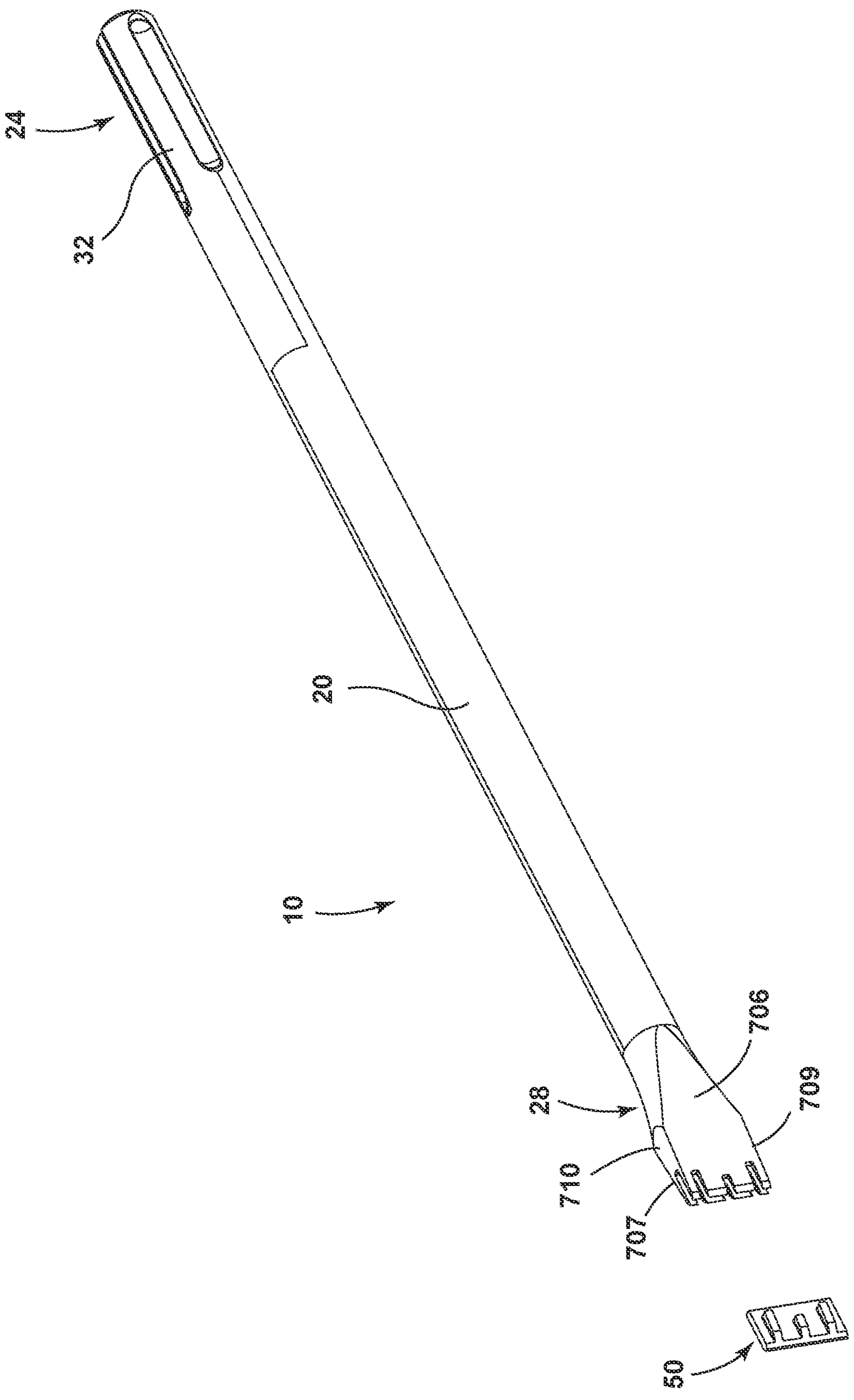
FIG. 116 is an exploded view of the chisel of FIG. 115.
Figure 117:
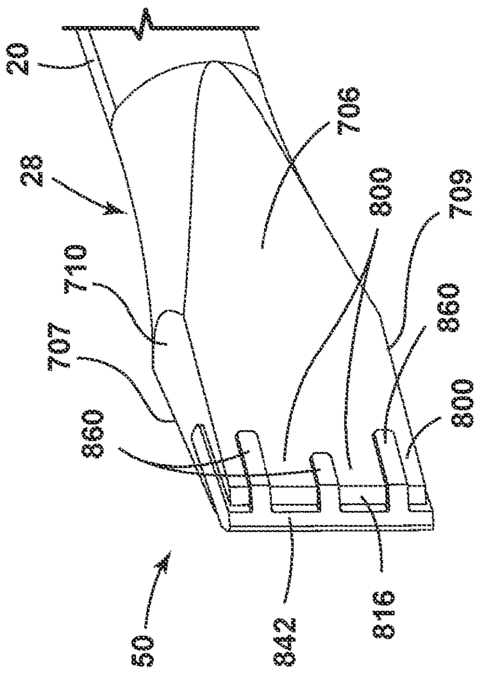
FIG. 117 is a detailed perspective view of the chisel of FIG. 115.
Figure 118:
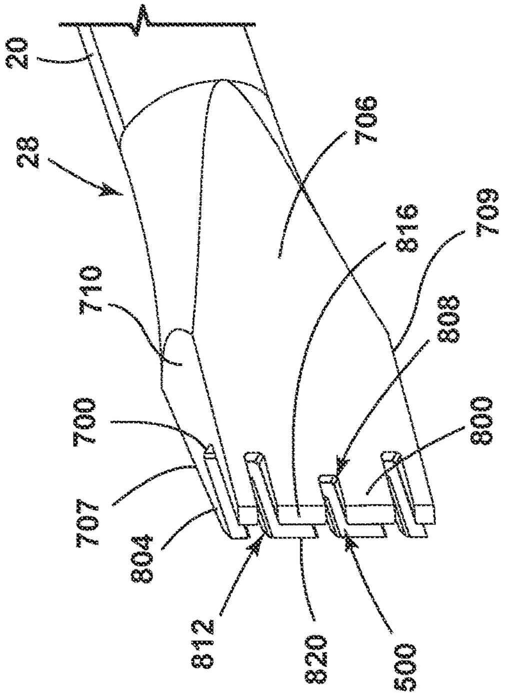
FIG. 118 is a detailed perspective view of the body of FIG. 115.
Figure 119:
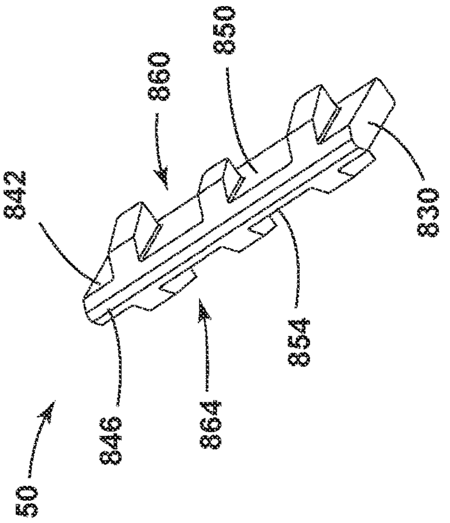
FIG. 119 is a perspective view of the head of FIG. 115.
Figure 120:
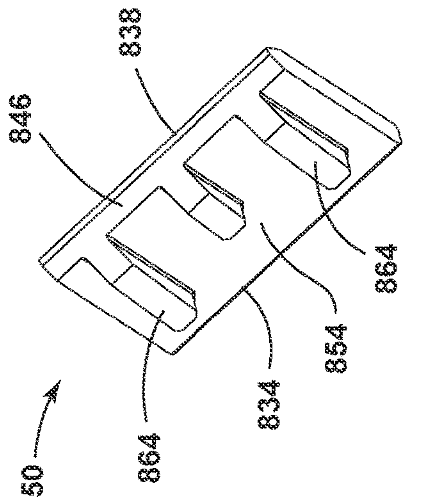
Figure 121:
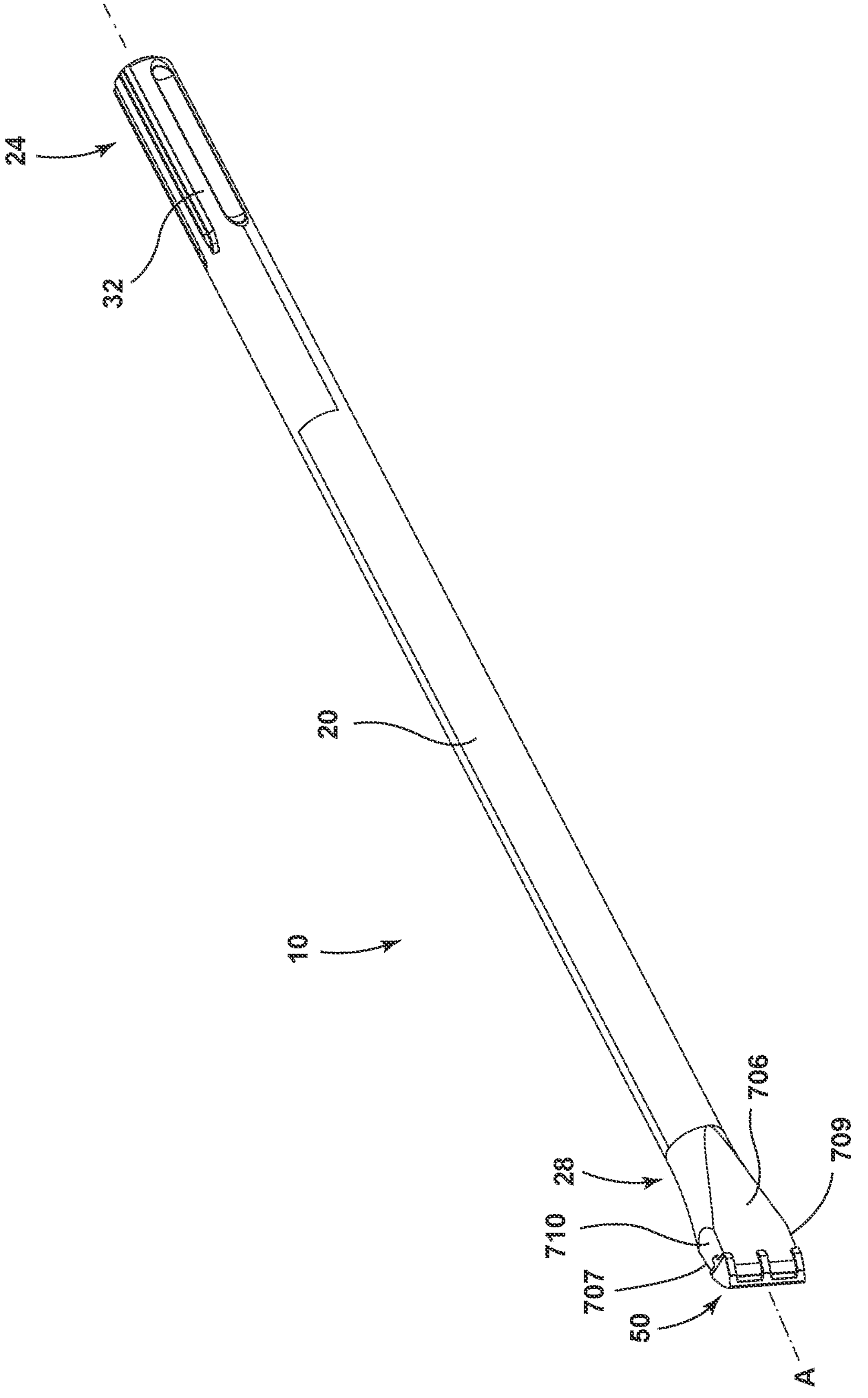
Figures 122, 123:
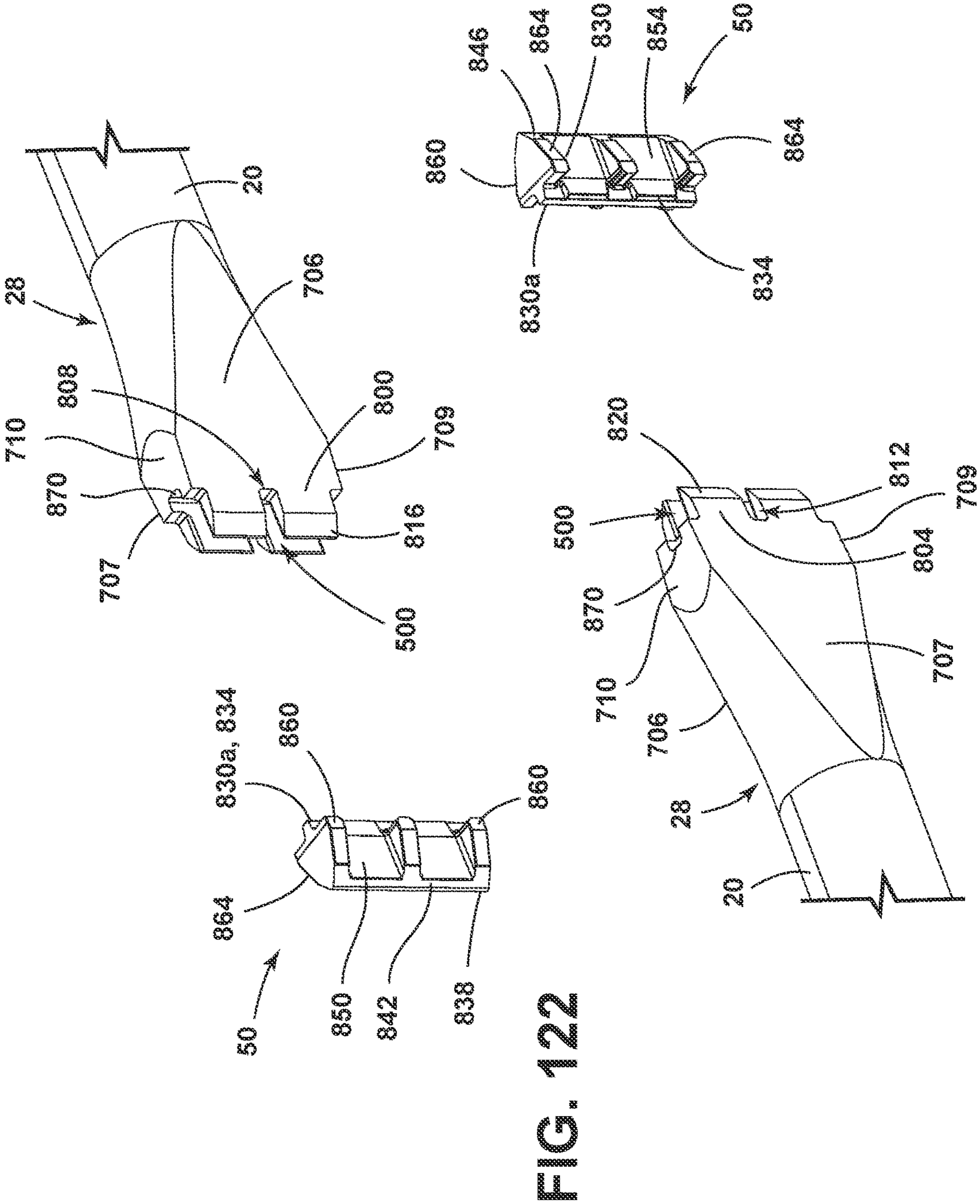
Figure 124:
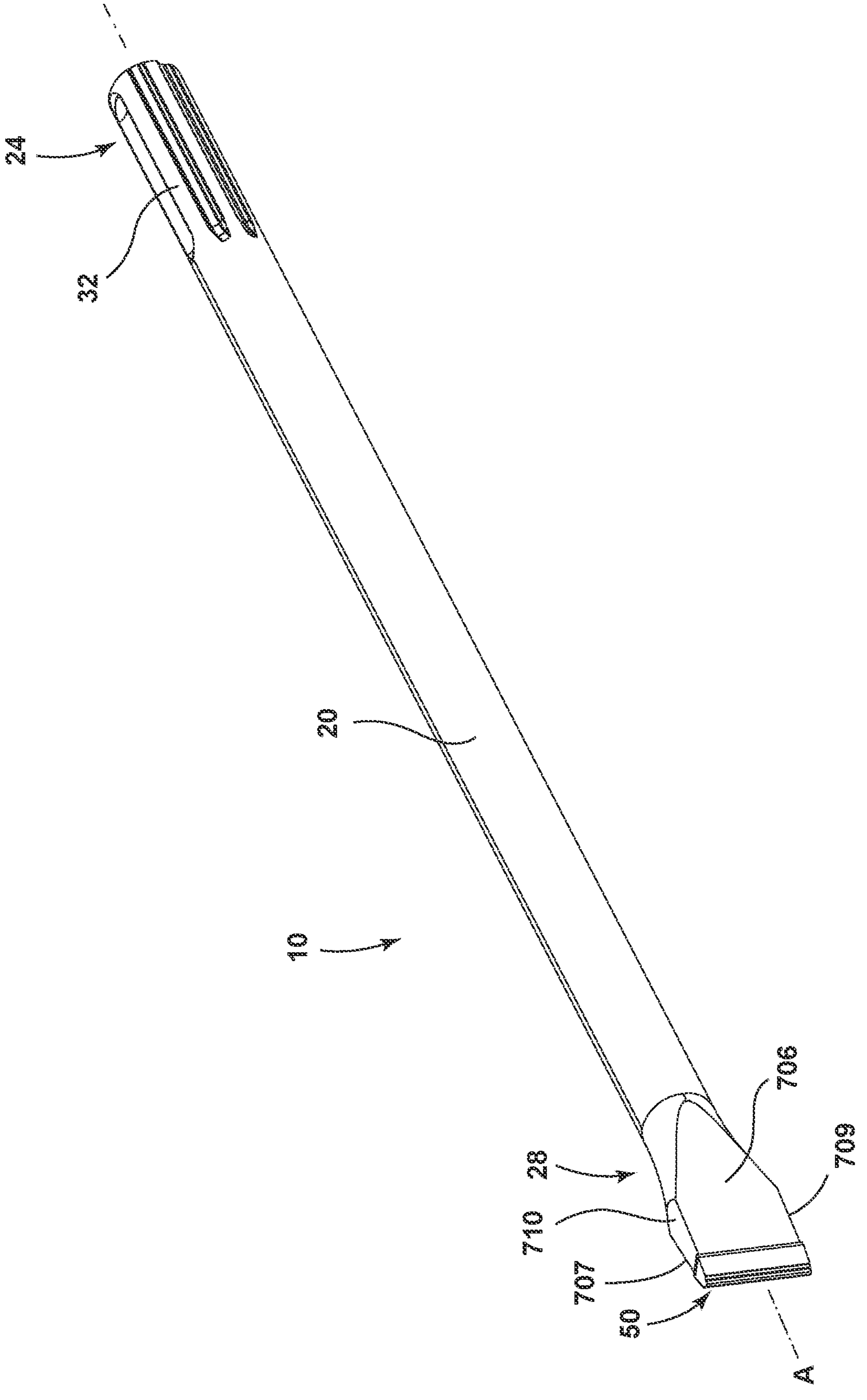
Figure 125:
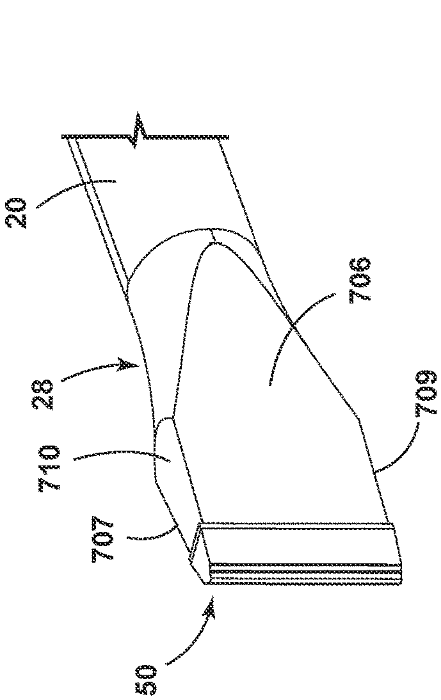

The head 50 is received in the channel 500 such that the central portion 830 is positioned in the channel 500 and each of the plurality of ribs 860, 864 is positioned in one of the corresponding recesses 808, 812 in the walls of the channel 500. Moreover, as shown, the first and second angled surfaces 842, 846 extend from the second end 28 of the body 20, such that the working edge is spaced apart from the second end 28 of the body 20, while prongs are positioned against the central portion 830. In the illustrated embodiments of FIGS. 107 and 112, the surfaces of the second portions of the ribs 860, 864 are substantially flush with surfaces 816, 820 of the adjacent prongs such that at least a portion of each of the ribs 860, 864 is flush with the body 20 of the chisel 10. In the illustrated embodiments of FIGS. 117 and 122, the surfaces of the second portions of the ribs 860, 864 extend outwardly from opposite sides of the body such that at least a portion of each of the ribs 860, 864 is projects beyond with the body 20 of the chisel 10 on both sides. In some embodiments, such as that of FIGS. 112 and 117, the planar surfaces 850, 854 are entirely or almost entirely positioned within the channel 500. In other embodiments, such as that of FIGS. 107 and 122, at least a portion of the planar surfaces 850, 854 are positioned outside the channel 500. In these embodiments, the two side ribs 860, 864 on both sides are on opposite sides of the body 20. In the embodiments of FIGS. 107, 112, and 117, the side ribs 860, 864 are spaced apart from respective side of the head 50. In the embodiment of FIG. 122, the side ribs 860, 864 define the respective side of the head 50.

Figure 126:
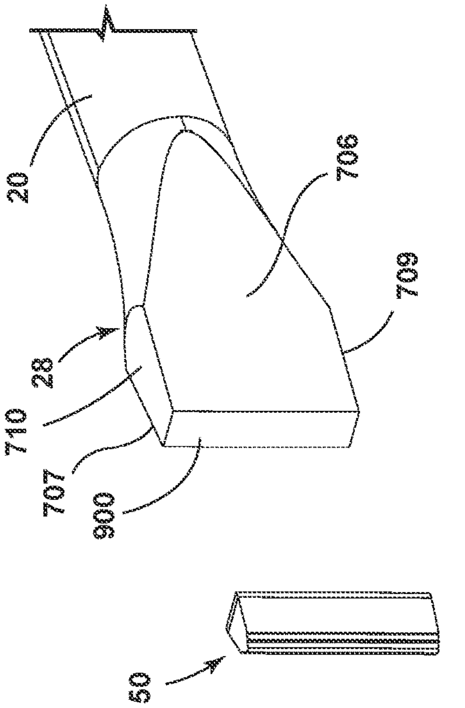
Figure 127:
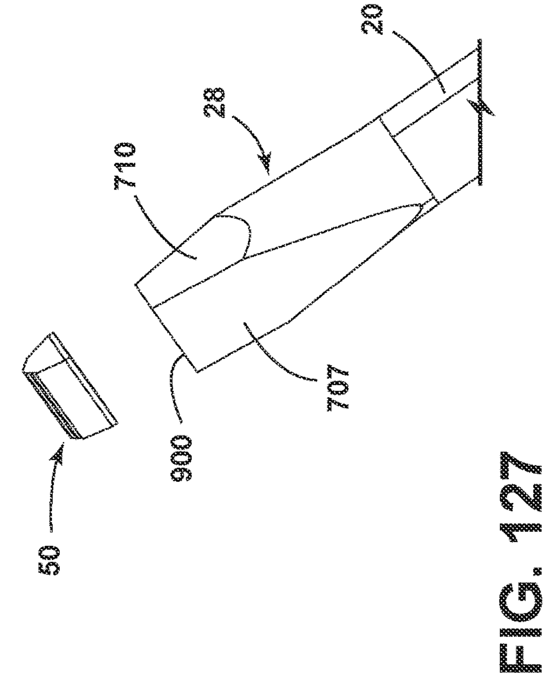
Figure 128:
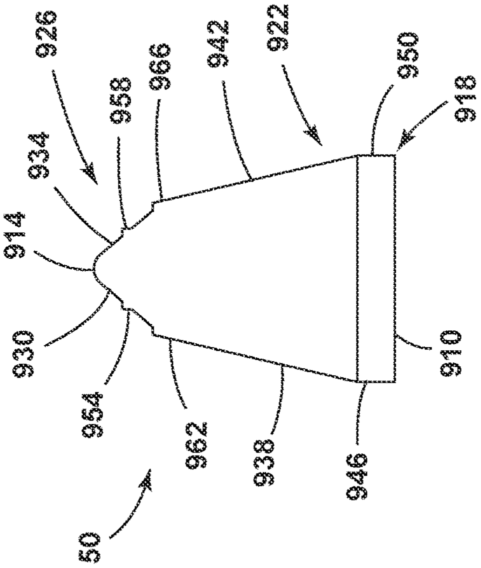

With specific reference to FIGS. 124-128, the body 20 defines a flat surface 900 at the second end 28 to which is coupled to the head 50 (e.g., by adhesives, brazing, welding, or other suitable method). The head 50 includes a first end 910 and a second end 914 opposite the first end 910. The head 50 also includes a first portion 918, a second portion 922, and a third portion 926. The first portion 918 extends from the first end 910 to the second portion 922. The second portion 922 extends from the first portion 918 to the third portion 926. The third portion 926 extends from the second portion 922 to the second end 914. As shown in FIGS. 126-128, the first portion 918 defines a substantially rectangular cross-section with a surface area that is greater than a surface are of the flat surface 900 of the body. Accordingly, a perimeter of the head 50 extends outwardly from the perimeter of the body 20 at the second end 28. The second portion 922 has a polygonal cross-section. In the illustrated embodiment, the second portion 922 has four sides and is trapezoidal. In the illustrated embodiment, the third portion 926 defines a polygonal cross-section as well. In the illustrated embodiment, the third portion 926 has three sides and is triangular. Angled surfaces 930, 934 on opposite sides of the third portion 926 are coupled to one another at the second end 914 and define the working edge. The angled surfaces 930, 934 extend from the second end 914 to the second portion 922. Also, angled surfaces 938, 942 of the second portion 922 extend from the respective angled surface 930, 934 of the third portion 926 to the first portion 918. Straight surfaces 946, 950 of the first portion 918 extend from respective angles surfaces 938, 942 of the second portion 922 to the first end 910. Moreover, a tooth 954, 958 extends from each angled surface 930, 934 and a tooth 962, 966 extends from a location where the angled surfaces 938, 942, 930, 934 of the second portion 922 and the third portion 926 intersect. The teeth 954, 958, 962, 966 extend along the width of the head 50. In other embodiments, there may be more or fewer teeth, and they may be positioned in other ways relative to the head and in other configurations.

Figure 129:
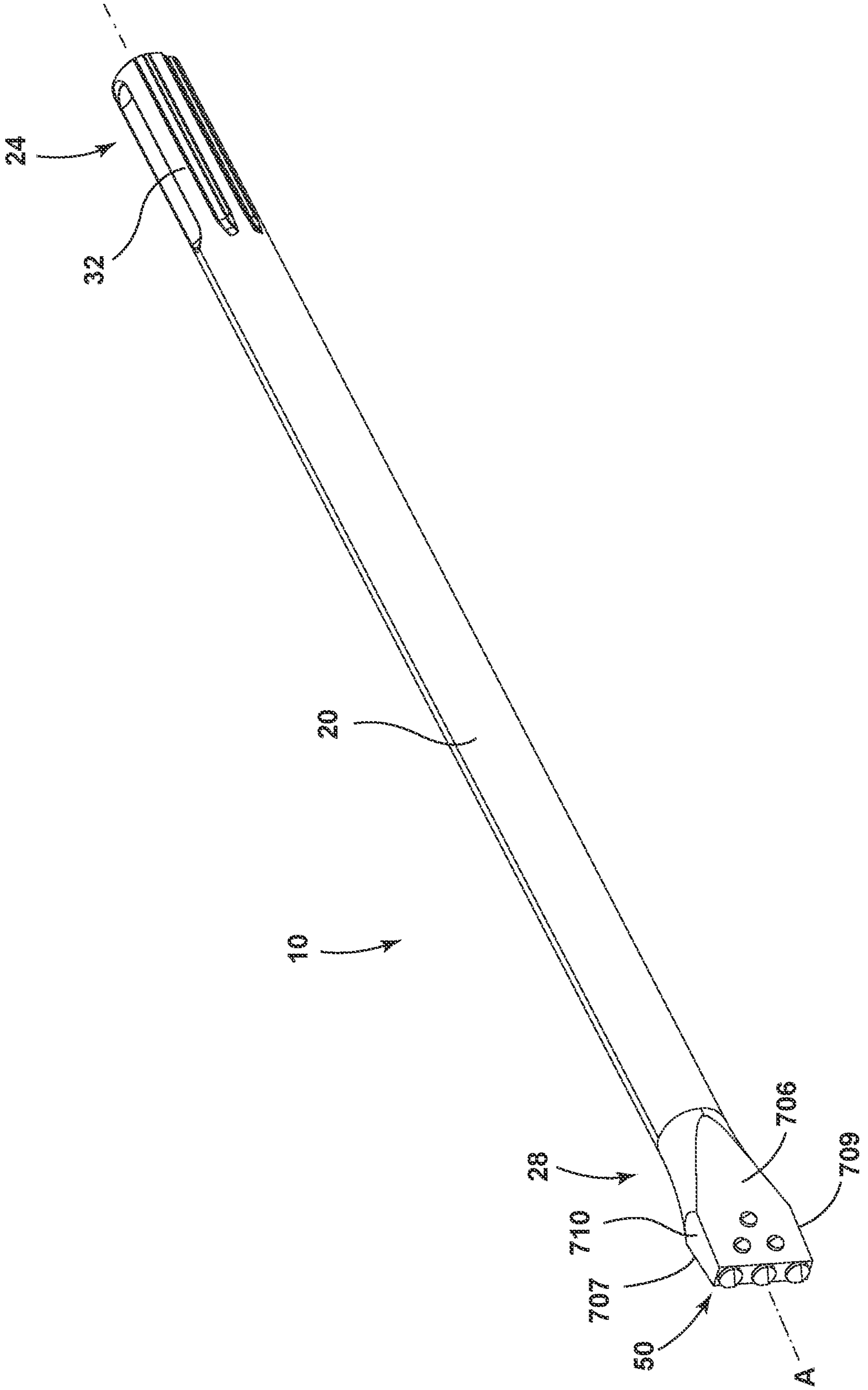
Figure 130:
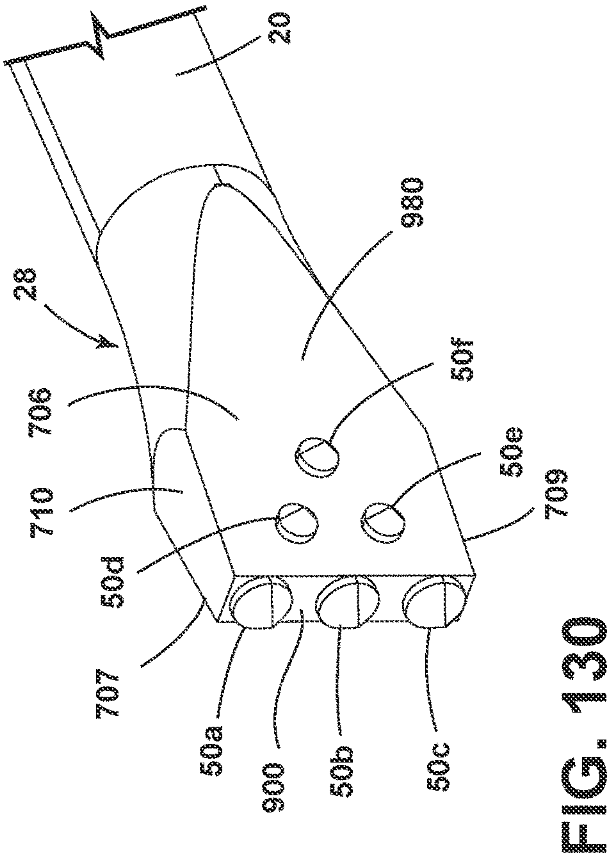
Figure 131:
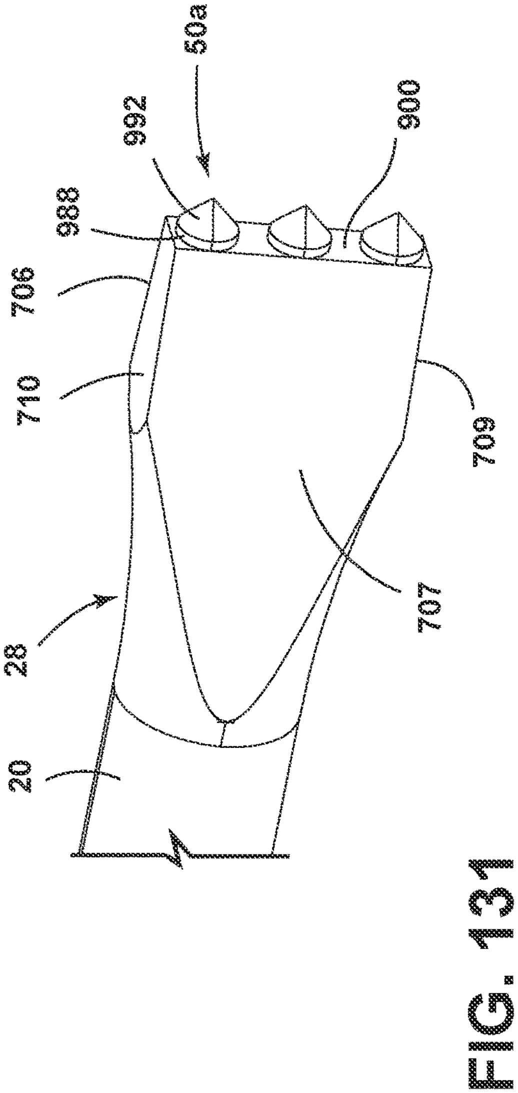

In the embodiment of FIGS. 129-131, the head 50 includes a plurality of projections 50*a*, 50*b*, 50*c*, 50*d*, 50*e*, 50*f*. Some of the projections 50*a*, 50*b*, 50*c* are coupled to the flat surface 900 (e.g., by adhesives, welding, brazing, or other suitable methods) and are spaced apart from one another along the width of the flat surface 900. Some of the projections 50*d*, 50*e*, 50*f* are coupled to (e.g., by adhesives, welding, brazing, or other suitable methods) one or both of the planar surfaces 980, 984 of the body 20. In the illustrated embodiment, there are three projections coupled to the flat surface 900, there are three projections coupled to one of the planar surfaces 980, 984, and no projections coupled to the other of the planar surfaces 980, 984. In other embodiments, there may be more or fewer projections coupled to the flat surface 900 and the respective planar surface 980. In other embodiments, there could also be projections coupled to both planar surfaces 980, 984 in any suitable number or neither planar surface 980, 984. The projections 50*a*, 50*b*, 50*c*, 50*d*, 50*e*, 50*f* each include a first portion 988 and a second portion 992. The first portion 988 extends from the first end 910 to the second portion 992 and is substantially cylindrical. The second portion 992 extends from the first portion 988 to the second end 914 and is substantially conular. In other embodiments, the projections may be coupled within bores of the body, similar to the embodiments discussed below relative to FIGS. 132-137.

With specific reference to the embodiments of FIGS. 132-137, the head 50 of the flat chisel 10 includes a plurality of projections 1010 coupled to the body 20. Each of the projections 1010 are positioned at or adjacent to the second end 28 and extend from the body 20.

In the embodiments illustrated in FIGS. 132-137, the body 20 defines a first angled surface 1014 and a second angled surface 1018 that intersect at the second end 28 to define all or a portion of the working edge. The working edge extends perpendicular to the axis A. The body 20 further includes a third angled surface 1022 (i.e., the first planar side) that extends from the first angled surface 1014 towards the first end 24, and a fourth angled surface 1026 (i.e., the second planar side) that extends from the second angled surface 1018 towards the first end 24. Each of the angled surfaces 1014, 1018 are generally planar. A first side surface 1030 (i.e., the fourth side) and a second side surface 1034 (i.e., the third side) connect the angle surfaces. Moreover, in the embodiment of FIGS. 132-137, the projections 1010 are pin-like projections. Accordingly, the pins 1010 each include a first end 1038 and a second end 1042 that is opposite the first end 1038. The second end 1042 of each pin defines a working edge. A pin axis F extends from the first end 1038 to the second end 1042.

In the embodiment of FIGS. 132-134, a plurality of bores 1050 extend through the working edge from the second end 28 in a direction toward the first end 24 along the axis A. Accordingly, a bore axis H through each of the bores 1050 is parallel to the axis A. The bores 1050 are spaced apart from one another along the width of the edge. Moreover, the first end 1038 of each pin 1010 is positioned within the respective bore 1050 and the second end 1042 is spaced apart from the body 20. The pin axis F of each of the pins 1010 is parallel to the axis A and coincident with the bore axis H. In the illustrated embodiment, there are five bores 1050 and five pins 1010, but in other embodiments, there may be more or fewer bores and pins.

In the embodiment of FIGS. 135-137, the bores 1050 extend through the third angled surface 1022 and the fourth angled surface 1026 in a direction toward the axis A. As shown, the bore axis H is oriented at an angle relative to the axis A. As shown, the bore axis H is oriented at an angle 22.5 degrees relative to the axis A. Accordingly, the pin axis F of each pin 1010 is coincident with the bore axis H and therefore also oriented at the angle 22.5 degrees relative to the axis A. In other embodiments, the angle may range from 7.5 degrees to 37.5 degrees. Accordingly, the pin axis F of each pin 1010 is coincident with the bore axis H and therefore also oriented at an angle relative to the axis A. As shown, in this embodiment, the second ends 1042 of the pins 1010 are spaced apart from the working edge at the second end 28. In the illustrated embodiment, the pins 1010 are oriented in rows on each of the angled surfaces 1022, 1026. Each of the rows of the first angled surface 1022 is aligned with one of the rows of the second angled surface 1026 and the working edges of the pins 1010 are positioned at the same distance from the respective angled surface 1022, 1026 in the illustrated embodiment. Accordingly, the working edges of the pins 1010 arranged in each row on one of the angled surfaces 1022, 1026 are aligned with (e.g., in the same plane as) the working edges of the pins 1010 arranged in respective row on the other of the angled surfaces 1022, 1026. Also, in other embodiments, the pins 1010 may have other configurations. For example, the rows of one angled surface 1022 may be staggered relative to the rows on the second angled surface 1018 and/or the working edges of the pins 1010 may be positioned at different distances from the respective angled surface 1022, 1026 in other embodiments.

Although the invention has been described in detail with reference to certain preferred embodiments, variations and modifications exist within the scope and spirit of one or more independent aspects of the invention as described.

What is claimed is:

1. A chisel comprising:
- a body formed of a first material, the body including
  - a first end having a shank,
  - a second end having a surface and a protrusion extending from the surface, and
  - a longitudinal axis extending through the first end and the second end; and
- a head formed of a second material that is harder than the first material, the head including
  - a first end coupled to the second end of the body, the first end including a surface and a recess defined therein, the surface of the first end of the head abutting the surface of the second end of the body while the recess receives the protrusion,
  - a second end that is opposite the first end of the head,
  - a cylindrical portion that defines the first end of the head, and
  - a conular portion that extends from the cylindrical portion and toward the second end of the head.

2. The chisel of claim 1, wherein the cylindrical portion defines a continuous surface with the body.

3. The chisel of claim 1, wherein the protrusion is semi-spherical.

4. The chisel of claim 1, wherein the surface of the second end is a planar surface between the protrusion and an outer surface of the body, and wherein the planar surface is annular.

5. The chisel of claim 1, wherein the protrusion is conular.

6. The chisel of claim 1, wherein the second end of the head includes a plurality of ribs extending toward the first end of the head.

7. The chisel of claim 4, wherein the surface of the head is a planar surface between the recess and the outer surface of the cylindrical portion.

8. A chisel comprising:
- a body formed of a first material, the body including
  - a first end having a shank,
  - a second end having a protrusion, and
  - a longitudinal axis extending through the first end and the second end; and
- a head formed of a second material that is harder than the first material, the head including a first end coupled to the second end of the body and defining a recess that receives the protrusion, a second end that is opposite the first end of the head, a cylindrical portion that defines the first end of the head and having an outer surface that is continuous with an outer surface of the body, and a conular portion that extends from the cylindrical portion and toward the second end of the head.

9. The chisel of claim 8, wherein the protrusion is semi-spherical.

10. The chisel of claim 8, wherein the second end of the body includes a surface between the protrusion and the outer surface of the body.

11. The chisel of claim 10, wherein the first end of the head includes a surface between the recess and the outer surface of the cylindrical portion.

12. The chisel of claim 11, wherein the surface of the head abuts the surface of body when the protrusion is received within the recess.

13. The chisel of claim 12, wherein the surface of the second end of the body is planar and annular, and wherein the surface of the first end of the head is planar and annular.

14. The chisel of claim 8, wherein the first end of the head abuts a surface at the second end from which the protrusion extends.

* * * * *